US007737829B2

(12) United States Patent  
Nishiyama

(10) Patent No.: US 7,737,829 B2  
(45) Date of Patent: Jun. 15, 2010

(54) COMMUNICATIONS SYSTEM, VEHICLE INFORMATION COMMUNICATING APPARATUS, AND INDOOR INFORMATION PROCESSING APPARATUS

(75) Inventor: Tamotsu Nishiyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 332 days.

(21) Appl. No.: 11/792,941

(22) PCT Filed: Mar. 3, 2006

(86) PCT No.: PCT/JP2006/304141

§ 371 (c)(1),  
(2), (4) Date: Jun. 13, 2007

(87) PCT Pub. No.: WO2006/112175

PCT Pub. Date: Oct. 26, 2006

(65) Prior Publication Data

US 2008/0055058 A1 Mar. 6, 2008

(30) Foreign Application Priority Data

Apr. 1, 2005 (JP) .............................. 2005-106194

(51) Int. Cl.  
*B60Q 1/00* (2006.01)  
*B60R 25/10* (2006.01)

(52) U.S. Cl. .............................. 340/425.5; 340/426.13; 340/426.16; 340/426.18; 340/426.36

(58) Field of Classification Search ............... 340/425.5  
See application file for complete search history.

(56) References Cited

U.S. PATENT DOCUMENTS 6,408,232 B1 * 6/2002 Cannon et al. ................ 701/29

(Continued)

FOREIGN PATENT DOCUMENTS

JP 06-245325 9/1994

(Continued)

OTHER PUBLICATIONS

Japanese Notification of Reasons for Refusal, with English Translation, issued in Japanese Patent Application No. JP 2005-106194, dispatched on Apr. 30, 2008.

(Continued)

*Primary Examiner*—Donnie L Crosland  
(74) *Attorney, Agent, or Firm*—McDermott Will & Emery LLP

(57) ABSTRACT

There are provided a communications system between a vehicle, a home and a center, a vehicle information communicating apparatus and an indoor information processing apparatus which imposes no limitation on communicating time enables bulk communication. The communications system comprises an on-board server and DSRC on-board equipment which are installed on the vehicle 10 and includes a DSRC base station 23 residing outside the vehicle which can communicate with the DSRC on-board equipment and a PC or a home server 22 residing indoors which is connected to the DSRC base station 23, the communication system having a detection apparatus installed on the vehicle and/or an indoor detection apparatus for detecting the state of the vehicle 10 and a communication activating apparatus for activating the communication of information between the on-board server and the PC or the home server 22 using the detection result of either or both of the detection apparatus.

39 Claims, 27 Drawing Sheets

U.S. PATENT DOCUMENTS

| | | | |
|---|---|---|---|
| 6,711,495 B1 * | 3/2004 | Ukai et al. | 701/207 |
| 6,856,820 B1 * | 2/2005 | Kolls | 455/575.9 |
| 7,177,738 B2 * | 2/2007 | Diaz | 701/29 |
| 7,257,426 B1 * | 8/2007 | Witkowski et al. | 455/569.2 |
| 7,502,674 B2 * | 3/2009 | Okude et al. | 701/36 |
| 2001/0033225 A1 * | 10/2001 | Razavi et al. | 340/425.5 |
| 2004/0181326 A1 * | 9/2004 | Adams et al. | 701/35 |

FOREIGN PATENT DOCUMENTS

| | | |
|---|---|---|
| JP | 2002-330469 | 11/2002 |
| JP | 2003-252176 | 9/2003 |
| JP | 2003-348130 | 12/2003 |
| JP | 2004-104270 | 4/2004 |
| JP | 2004-248051 | 9/2004 |
| JP | 2004-259150 | 9/2004 |
| JP | 2004-297537 | 10/2004 |
| JP | 2005-049938 | 2/2005 |

OTHER PUBLICATIONS

Japanese Notification of Reasons for Refusal, w/ English translation thereof, issued in Japanese Patent Application No. JP 2005-106194 dated on Oct. 22, 2008.

* cited by examiner

COMMUNICATIONS SYSTEM, VEHICLE INFORMATION COMMUNICATING APPARATUS, AND INDOOR INFORMATION PROCESSING APPARATUS

This application is the U.S. National Phase under 35 U.S.C. §371 of International Application No. PCT/JP2006/304141, filed on Mar. 3, 2006, which in turn claims the benefit of Japanese Application No. 2005-106194, filed on Apr. 1, 2005 the disclosures of which Applications are incorporated by reference herein.

TECHNICAL FIELD

The present invention relates to a communications system between a vehicle, home and center, a vehicle information communicating apparatus and an indoor information processing apparatus.

BACKGROUND ART

FIG. 26 shows a conventional communications system between a vehicle 10 and a service center 40 which is provided in a car dealer or the like. The conventional communications system is implemented by a mobile phone or a data communication module 58 via a mobile communication network 57. There also exists a system in which the inspection, failure diagnosis and maintenance of the vehicle 10 are implemented in a remote controlled fashion by means of communications systems including a wireless LAN at hot spots.

In addition, as shown in FIG. 27, there also exists a case in which communication between pieces of on-board equipment 61, 62, 63 of the vehicle 10 and the center 40 is configured by a network utilizing an internet 46 by way of continuous communication (roaming) by a mobile telephone network or DSRC (Dedicated Short-Range Communication) (refer to, for example, Patent Document No. 1).

Patent Document No. 1: JP-A-2003-348130
Patent Document No. 2: JP-A-2002-330469

DISCLOSURE OF THE INVENTION

Problem that the Invention is to Solve

In a case where the inspection, failure diagnosis and maintenance of the vehicle is implemented or communication of the running condition of the vehicle, maps/images is implemented in the conventional communications system, however, there may occur a case where the volume of data to be communicated is limited, and there exist problematic concerns about slow communication speed and high communication charge.

In addition, it is difficult to strengthen the security for communication at a hot spot, and furthermore, since the location of hot spots is limited, there also exists a problematic concern about the necessity of driving a vehicle to the locations of hot spots. In addition, in a case where a vehicle is brought in a car dealer for inspection, there is caused an inconvenience in which the vehicle cannot be available while the vehicle is being at the car dealer.

In addition, in order to implement two-way or bi-directional communication between the individual pieces of on-board equipment and the center, IP addresses are necessary to be imparted to the pieces of on-board equipment individually, extensive IP address such as $IP_{V6}$ becomes necessary, and the administration thereof becomes troublesome. Additionally, there is caused a necessity of implementing the two-way communication between the individual pieces of on-board equipment during office hours or of running the center 24 hours.

An object of the invention is to provide a communications system, a vehicle information communicating apparatus and an indoor information processing apparatus which enable the bulk communication with no limitation on communicating hours.

In addition, another object of the invention is to provide a communications system, a vehicle information communicating apparatus and an indoor information processing apparatus which can make use of existing infrastructures to thereby require less initial cost and running cost.

Additionally, a further object of the invention is to provide a communications system, a vehicle information communicating apparatus and an indoor information processing apparatus which can eliminate the wasteful movement of a vehicle for inspection thereof and secure the confidentiality of communication.

Furthermore, an object of the invention is to provide a communications system, a vehicle information communicating apparatus and an indoor information processing apparatus which constrain no user in terms of time when he or she receives services provided.

Means for Solving the Problem

A communications system of the invention is a communications system which comprises a primary information processing unit (an on-board server or the like) installed on a vehicle, a primary communications unit (DSRC on-board equipment) connected to the primary information processing unit, a secondary communications unit (a DSRC base station or the like) outside the vehicle which can communicate with the primary communications unit and a secondary information processing unit (a PC or a home server or the like) residing indoors which is connected to the secondary communications unit, the communications system having a detection means installed on the vehicle and/or detection means outside the vehicle for detecting a state of the vehicle and a communication activating means for starting up the communication of information between the primary information processing unit and the secondary information processing unit by utilizing a communicating means between the primary communications unit and the secondary communications unit according to a detection result of at least one of both the detection means.

In addition, a communications system of the invention is a communication system which comprises a primary information processing unit (an on-board server or the like) installed on a vehicle, a primary communications unit (DSRC on-board equipment) connected to the primary information processing unit, a secondary communications unit (a DSRC base station) outside the vehicle which can communicate with the primary communications unit and a secondary information processing unit (a PC or a home server or the like) residing indoors which is connected to the secondary communications unit and includes a tertiary information processing unit (a center server or the like) residing inside an information center which can communicate with the secondary information processing unit by utilizing a fixed communication network, the communications system having a detection means installed on the vehicle and/or detection means outside the vehicle for detecting a state of the vehicle, and a communication activating means for starting up the communication of information between the primary information processing unit and the secondary information processing unit by utilizing a communicating means between the primary communications unit and the secondary communications unit according to a detection result of at least one of both the detection means, whereby the communication of information between the primary information processing unit or the secondary information processing unit and the tertiary information processing unit is implemented.

In addition, a communications system of the invention is a communication system which comprises a primary information processing unit (an on-board server or the like) installed on a vehicle, a primary communications unit (DSRC on-board equipment) connected to the primary information processing unit, a secondary communications unit (a DSRC base station or the like) outside the vehicle which can communicate with the primary communications unit and a secondary information processing unit (a PC or a home server or the like) residing indoors which is connected to the secondary communications unit and includes a receiver unit residing indoors which is connected to the secondary information processing unit, a transmitter unit which can distribute information to the receiver unit and a tertiary information processing unit (a center server or the like) residing inside an information center which can communicate with the transmitter unit, the communications system having a detection means installed on the vehicle and/or detection means outside the vehicle for detecting a state of the vehicle, and a communication activating means for starting up the communication of information between the primary information processing unit and the secondary information processing unit by utilizing communicating means between the primary communications unit and the secondary communications unit according to a detection result of at least one of both the detection means, whereby the distribution of information from the tertiary information processing unit to the primary information processing unit or the secondary information processing unit by utilizing a distribution means between the transmitter unit and the receiver unit.

Additionally, a communications system of the invention is a communications system which comprises a primary information processing unit (an on-board server or the like) installed on a vehicle, a primary communications unit (DSRC on-board equipment) connected to the primary information processing unit, a secondary communications unit (a DSRC base station) outside the vehicle which can communicate with the primary communications unit and a secondary information processing unit (a PC or a home server or the like) residing indoors which is connected to the secondary communications unit and includes on-board equipment installed on the vehicle which is connected to the primary information processing unit, a tertiary information processing unit (a center server or the like) residing inside an information center which can communicate with the secondary information processing unit by utilizing a fixed communications network and one or a plurality of quaternary information processing units (PC's or the like of a dealer/manufacturer) which can communicate with the tertiary information processing unit, the communications system comprising a primary to quaternary storage units for storing information collected, processed or distributed by the primary to quaternary information processing units, respectively, and having a detection means installed on the vehicle and/or detection means outside the vehicle for detecting a state of the vehicle and a communication activating means for starting up the communication of information between the primary information processing unit and the secondary information processing unit by utilizing a communicating means between the primary communications unit and the secondary communications unit according to a detection result of at least one of both the detection means, whereby the communication of information between the primary information processing unit and the secondary information processing unit by way of the primary storage unit, the communication of information between the secondary information processing unit and the tertiary information processing unit by way of the secondary storage unit and the communication of information between the tertiary information processing unit and the quaternary information processing unit by way of the tertiary storage means are implemented sequentially, and a one-way or two-way communication and processing of information between the on-board equipment and the quaternary information processing unit is implemented.

A vehicle information communicating apparatus of the invention comprises a primary information processing unit (an on-board server or the like) installed on a vehicle and a primary communications unit (DSRC on-board equipment or the like) which can communicate with a secondary communications unit (a DSRC base station) outside the vehicle and which is connected to the primary information processing unit, the vehicle information communicating apparatus having a detection means for detecting a predetermined state of the vehicle and a communication activating means for starting up the communication of information between the primary information processing unit and equipment residing outside the vehicle by utilizing a communicating means between the primary communications unit and the secondary communications unit according to a detection result of the detection means.

An indoor information processing apparatus of the invention is an indoor information processing apparatus which comprises a secondary information processing unit (a PC or a home server or the like) residing indoors for controlling a secondary communications unit outside a vehicle which can communicate with a primary communications unit connected to on-board equipment, the indoor information processing apparatus having a detection means for detecting a predetermined state of the vehicle and a control means for controlling the secondary communications unit such that a communication between the primary communications unit and the secondary communications unit is started up according to a detection result of the detection means by utilizing a communicating means between the primary communications unit and the secondary communications unit.

ADVANTAGE OF THE INVENTION

According to the invention, since communication is implemented in a garage at the residential home of a user or the like where his or her vehicle is parked for a long period of time, there is no limitation on communication time, and bulk communication can be implemented. In addition, since a communications system can be configured using existing infrastructures, the initial cost and running cost can be reduced, and not only the wasteful movement of the vehicle for inspection or the like can be eliminated, but also the confidentiality of communication can be secured.

DESCRIPTION OF REFERENCE NUMERALS

10 vehicle; 11 electric vehicle; 12 DSRC on-board equipment; 13 on-board server; 14, 24, 43, 45 storage unit; 15, 16, 61, 62, 63 on-board equipment; 17 in-vehicle LAN, 20 home; 21 home network; 22 PC or home server; 23 DSRC base station; 25 garage; 30 power line; 31, 33 PLC bridge; 32 charging line; 34 switchboard (filter); 35 pole; 40 center; 41 fixed communications network; 42 home gateway; 44 PC of dealer/manufacturer; 46 internet; 47 center server; 50 broadcasting station; 51 radio wave tower; 52 broadcasting satellite; 53, 54 antenna; 55 CATV; 56 DTV/STB; 57 mobile communication network; 58 mobile phone; 59 communication base station; 60 on-board communications equipment; 61, 62, 63 on-board equipment

BEST MODE FOR CARRYING OUT THE INVENTION

Figure 1:
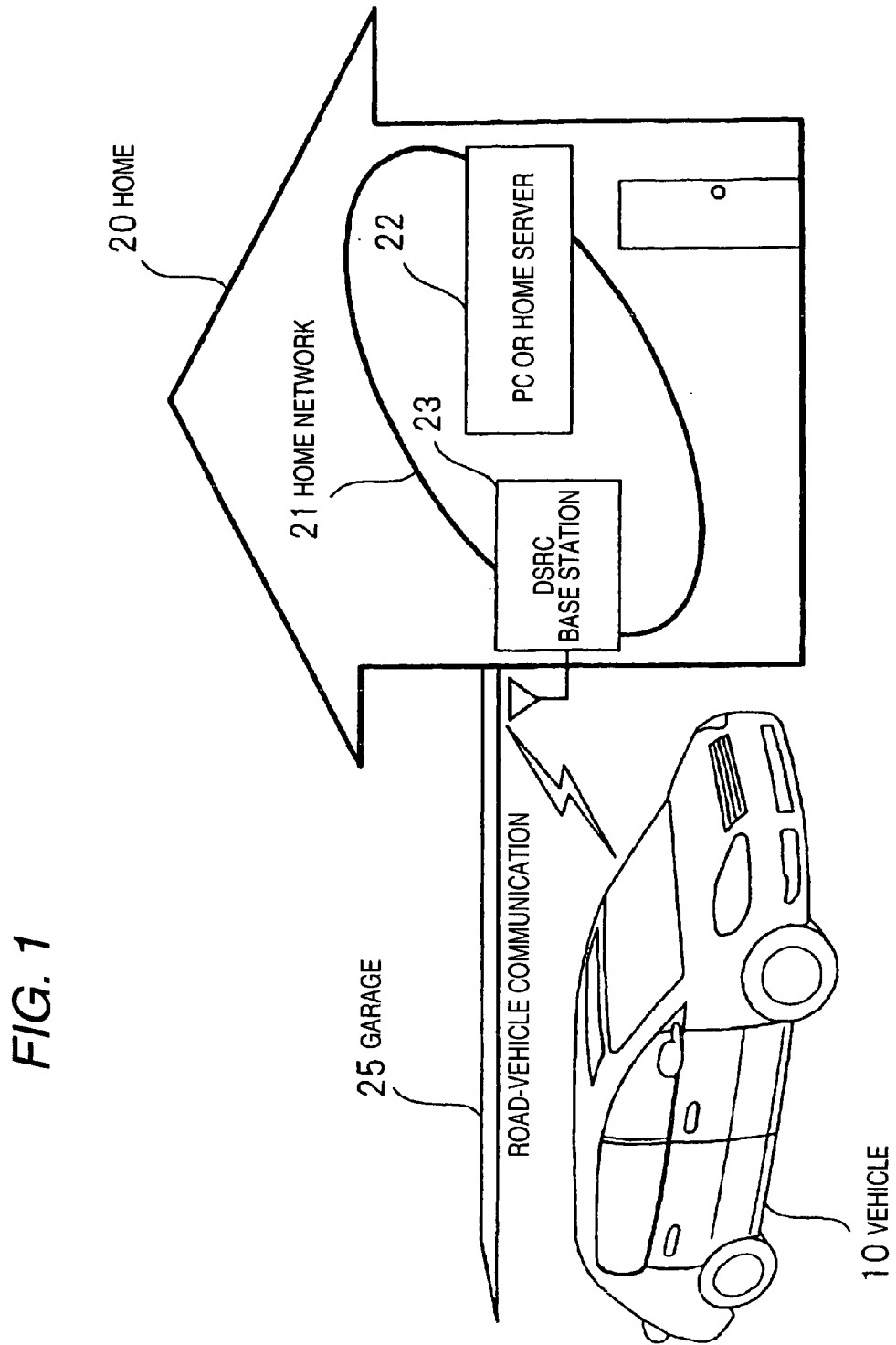
FIG. 1 is a diagram showing a schematic configuration of a communications system between a vehicle and a home, which explains a first embodiment of the invention.

FIG. 1 is a diagram showing a schematic configuration of a communications system between a vehicle and a home, which explains a first embodiment of the invention. This embodiment constitutes a communications system which has an on-board server installed on a vehicle 10 parked in a garage 25 and DSRC on-board equipment connected to the on-board server and includes a DSRC base station 23 residing outside the vehicle and a PC or a home server 22 residing indoors which is connected to the DSRC base station 23 via a home network 21 within a home 20. In this embodiment, however, while a communicating means between the vehicle and the home is the DSRC, the vehicle 10 and the home 20 can be connected to each other by means of a wireless LAN (exclusive for use between the home 20 and the vehicle 10) or Bluetooth or the like. Furthermore, it can easily be surmised that the PC or the home server 22 and the DSRC base station are connected by means of serial communications without being connected by way of the home network 21.

Figure 2:
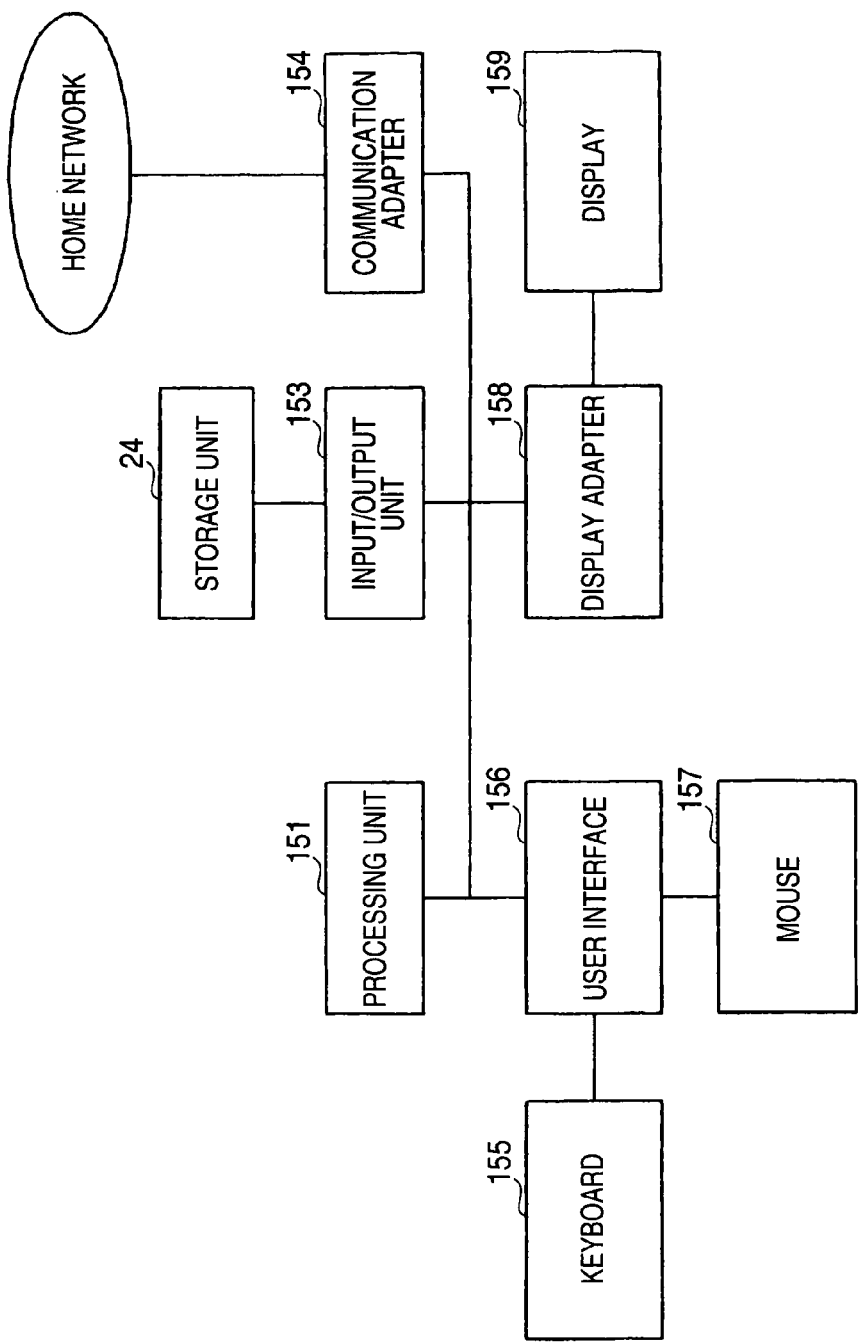
FIG. 2 is a block diagram illustrating an example of a schematic configuration of a PC or a home server, which explains the embodiment of the invention.

FIG. 2 is a block diagram illustrating an example of a configuration of the PC or the home server 22 which is connected to the home network 21 of the embodiment. The example in FIG. 2 constitutes a case where a PC (personal computer) is used as the PC or the home server 22, and the PC is made up of a processing unit 151, a storage (memory) unit 24, an input/output unit 153, a communications adapter 154, a keyboard 155, a user interface 156, a mouse 157, a display adapter 158, a display 159 and the like. In the example in FIG. 2, however, while the storage (memory) unit 24 is incorporated in the PC, a case where the storage (memory) unit 24 is attached to the PC externally still resides with the scope of the invention claimed for patent under the subject patent application.

Figure 3:
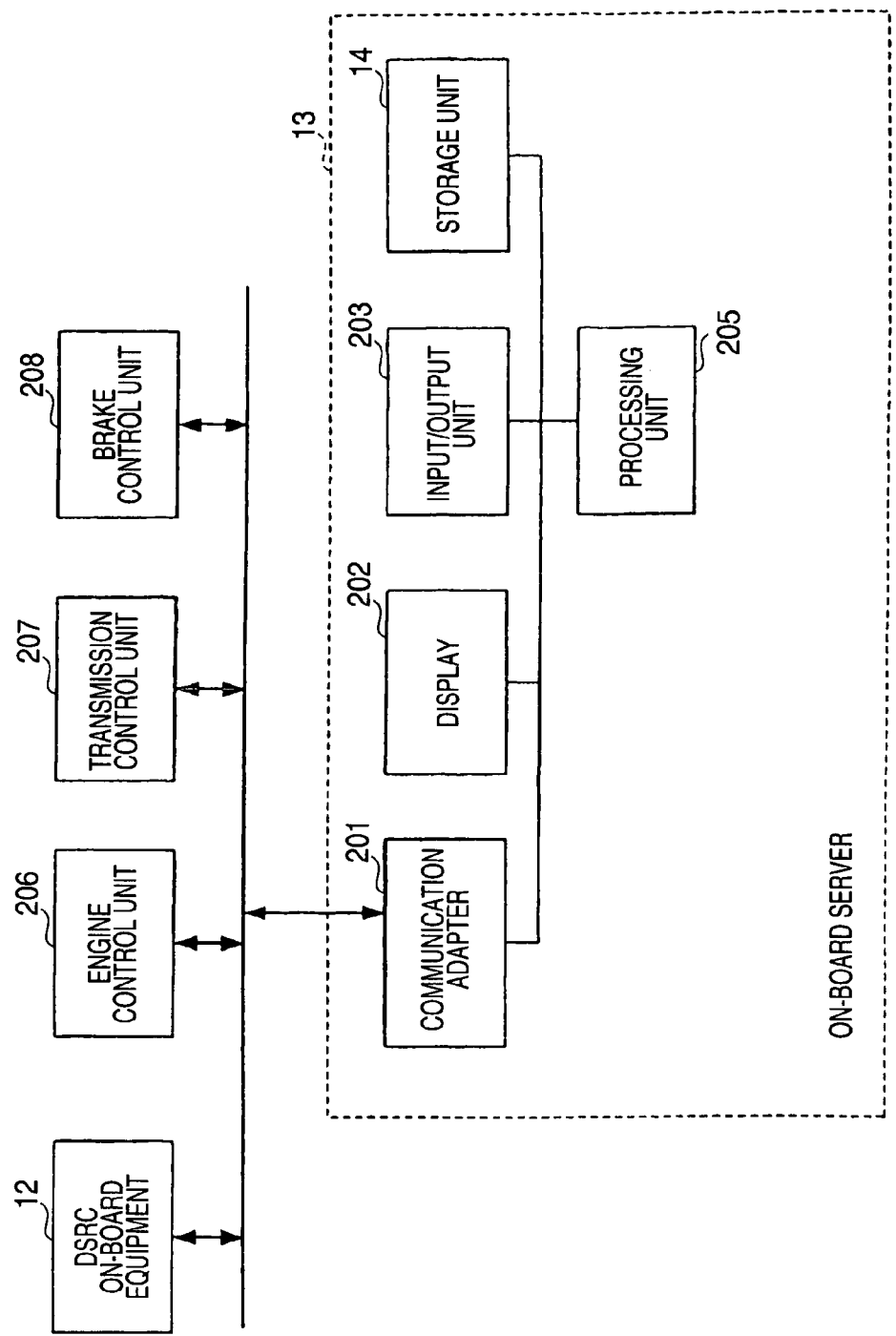
FIG. 3 is a block diagram illustrating an example of a schematic configuration of an on-board server within the vehicle, which explains the first embodiment of the invention.

FIG. 3 is a block diagram illustrating an example of a configuration of main equipment within the vehicle 10 in this embodiment. In FIG. 3, the pieces of on-board equipment such as the DSRC on-board equipment 12 and the on-board server 13 and various control units such as an engine control unit 206, a transmission control unit 207, a brake control unit 208 and the like are connected to one another by means of an in-vehicle LAN 17. In FIG. 3, the on-board server 13 is a car navigation system or an on-board information terminal (an IT terminal), an on-board AV server, a car PC or the like and is such as to include a communications adapter 201, a display 202, an input unit 203, a storage (memory) unit 14, a processing unit 205 and the like, so that the on-board server 13 obtains, processes and provides to the outside by way of the DSRC on-board equipment 12 information on the vehicle in cooperation with the individual control units 206, 207, 208 which are connected to the in-vehicle LAN 17 in response to a request from inside the vehicle 10 or the outside thereof. In the example shown in FIG. 3, however, while the storage (memory) unit 14 is incorporated within the on-board server 13, a case where the storage (memory) unit 14 is attached to the on-board server 13 externally still resides with the scope of the invention which is claimed for patent under the subject patent application. In addition, in FIG. 3, while the pieces of on-board equipment such as the on-board server 13, the DSRC on-board equipment 12 and the like are connected to one another by means of the in-vehicle LAN 17, other connecting means may be used such as a wired connection which utilizes a dedicated adapter or a wireless connection which utilizes infrared communication, Bluetooth and the like.

Next, a case will be described where information or contents are downloaded from the equipment (the PC or the home server) connected to the home network 21 to the equipment installed on the vehicle 10. As a communicating means between the home 20 and the vehicle 10, the DSRC base station 23 is placed dedicatedly on the home 20 side, and the DSRC on-board equipment is placed on the vehicle 10 side. When information or contents are downloaded, operations are possible from the on-board equipment side and the in-home equipment side.

[When Downloading is Implemented in Response to a Request from the Vehicle Side]

Information, software, contents, maintenance software and the like that are to be downloaded are designated by the PC or the home server 22 and are captured from a medium such as a DVD and the internet by the equipment connected to the home network 21 so as to be stored in the storage unit 24 of the PC or the home server 22, and the information and the like so stored are then downloaded in response to a request from the vehicle 10 side when the vehicle 10 is parked in the garage 25 (a specific parking position).

[When Information is Downloaded by being Retrieved/Selected from the Vehicle Side]

When the vehicle 10 is parked in the garage 25 (a specific parking position), the information, software, contents and the like which are stored in the equipment on the home network 21 are retrieved/selected from the on-board equipment on the vehicle 10 side, so that they are downloaded on the on-board equipment.

In these cases, a downloading timing will be described in detail using FIG. 5.

Figure 5:
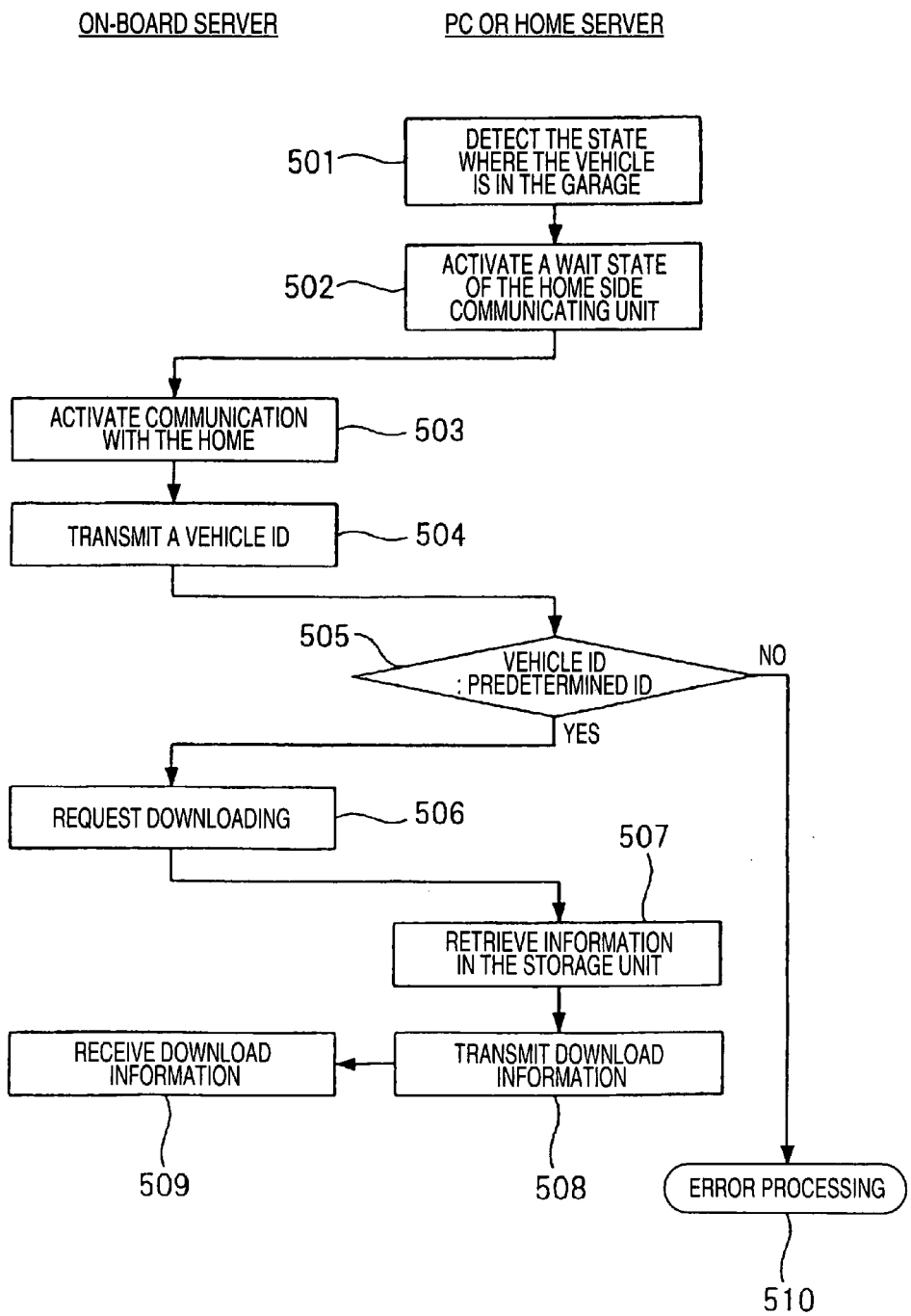
FIG. 5 is a flowchart showing an example of downloading from the vehicle side in the wireless communication, which explains the first embodiment of the invention.

FIG. 5 is a flowchart illustrating an example of a communication timing in a case where a communicating means between the home and the vehicle is wireless communication (DSRC), in particular, when a request (for, mainly, downloading) is made from the vehicle side. Firstly, whether or not the vehicle is parked in the garage is detected (step S501). Following this, if the parking of the vehicle in the garage has been detected, the communications base station (the communicating unit) on the home side enters the wait state, enabling communication (step S502). In this state, the initiation of communication is triggered by the detection of a manual operation within the vehicle, or start of the engine or insertion of the key or stop of the engine or removal of the key. When communication is started up (step S503), the on-board server 13 transmits a vehicle ID (step S504), and after the vehicle ID so transmitted is confirmed to coincide with a predetermined ID in the PC or the home server 22 (step S505), downloading is requested (step S506), and information in the storage unit 24 is retrieved (step S507), a communication process (a downloading process) being executed (steps S508, S509). Note that when the ID of the vehicle does not coincide with the predetermined ID, an error processing follows (step S510).

In this example, while the authentication of the ID in step S505 is made to constitute part of the flow, it is considered that there is no authentication. In addition, an infrared sensor, a warning communicating unit or a weighing scale for the vehicle can be considered to be used to detect the entrance of the vehicle into the garage. In addition, it is possible to adopt a method in which after the entrance of the vehicle is confirmed once, the state of the vehicle is supervised in the PC or the home server 22, so that the state of the garage is confirmed using the supervisory information. Furthermore, although it is presumed that the communications base station (the communicating unit) on the home side doubles as the warning communicating unit (namely, it is still within the scope of the invention which is claimed for patent under the subject patent application even in the event that the communications base station (the communicating unit) on the home side is in the wait state at all times. In this case, steps S501, S502 become unnecessary).

In addition, although this example is an example in which steps S501, 502 are handled on the home side, those steps can be handled on the vehicle side. Namely, it is also possible to adopt a method in which whether or not the vehicle is in the garage is detected by the vehicle side (step S501), and next, if the entrance of the vehicle into the garage is detected, a signal (an infrared ray) is transmitted from the vehicle side, so as to cause the communications base station (the communicating unit) on the home side to enter the wait state, whereby communication is enabled (step S502). In this case, the detection of the entrance of the vehicle into the garage can also be implemented by virtue of the confirmation of the position of the vehicle by means of GPS or confirmation by the driver.

In addition, in this example, while the on-board server 13 transmits the vehicle ID in step S504, and the request for downloading is made in step S506 after the vehicle ID has been authenticated in step S505, a case can be easily anticipated from this example in which the transmission of the vehicle ID and the request for downloading are made in step S504, and the vehicle ID is authenticated in step S505. (However, in this case, step S506 is deleted.)

[When Downloading is Implemented in Response to a Request from the Home Side]

Information, software, contents, maintenance software and the like that are to be downloaded are designated by the PC or the home server 22 and are captured from a medium such as a DVD and the internet by the equipment connected to the home network 21 so as to be stored in the storage unit 24 of the PC or the home server 22, and the information and the like so stored are then downloaded from the PC or the home server 22 to the on-board equipment in response to a request from the home 20 side when the vehicle 10 is parked in the garage 25 (a specific parking position).

In this case, a downloading timing will be described in detail using FIG. 7.

Figure 7:
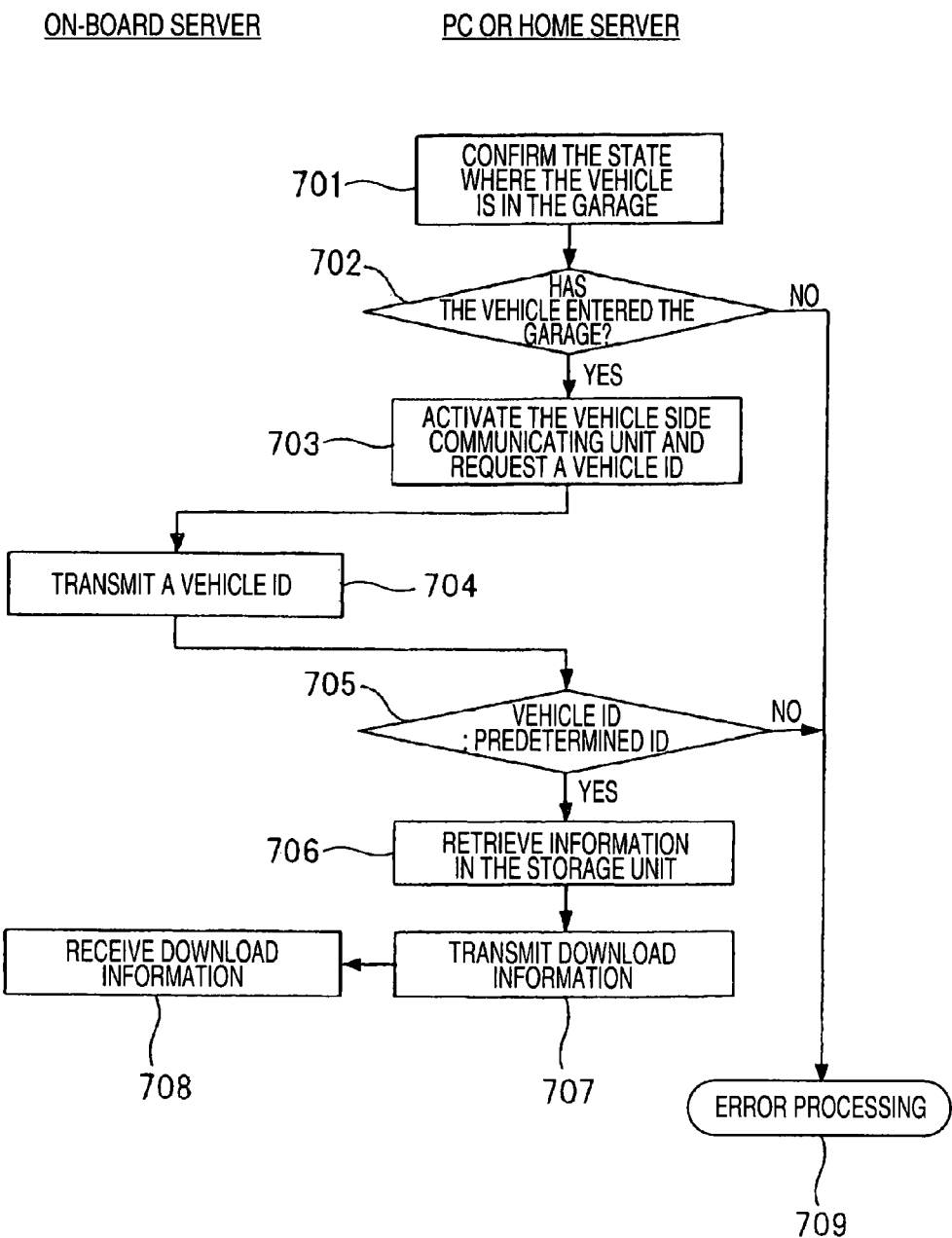
FIG. 7 is a flowchart illustrating an example of downloading from the home side in the wireless communication, which explains the first embodiment of the invention.

FIG. 7 is a flowchart illustrating an example of a communication timing in a case where a communicating means between the home and the vehicle is wireless communication (DSRC), in particular, when a request (for, mainly, downloading) is made from the home side. Firstly, whether or not the vehicle is parked in the garage is detected (step S701). Following this, if the parking of the vehicle in the garage has been detected (step S702), the communications base station (the communicating unit) on the home side enters the wait state, and the communicating unit on the vehicle side is activated and a request for a vehicle ID is made (step S703). In this state, the initiation of communication is triggered by a manual operation from the PC or the home server 22 or a reserved time for communication set in the PC or the home server 22 (the reserved time may be set as desired or periodically). When communication is started up, a vehicle ID is transmitted (step S704), and after the vehicle ID so transmitted is confirmed to coincide with a predetermined ID in the PC or the home server 22 (step S705), information in the storage unit 24 is retrieved (step S706), a communication process (a downloading process) being executed (steps S707, S708).

In this example, while the authentication of the ID in step S704 is made to constitute part of the flow, it is considered that there is no authentication. In addition, an infrared sensor or a weighing scale for the vehicle can be considered to be used to detect the entrance of the vehicle into the garage. In addition, it is possible to adopt a method in which after the entrance of the vehicle into the garage is confirmed once, the state of the vehicle is supervised in the PC or the home server 22, so that the state of the garage is confirmed using the supervisory information. In addition, as the periodical setting of the reservation for communication, there are also methods in which (1) communication is started up at a set time every day, (2) communication is started up at a set time on a set day of the week every week, and (3) communication is started up at a set time on a set day every month.

Next, a case will be described where various information or contents are uploaded from the equipment installed on the vehicle 10 to the equipment (the PC or the home server or the like) connected to the home network 21. In this case, too, there are operations that are carried out from the on-board equipment side and the in-home equipment side.

[When Uploading is Implemented from the Vehicle Side]

Information while the vehicle is running, information from various sensors for a body system, an engine system and the like of the vehicle and information from the various pieces of equipment installed on the vehicle are collected by the on-board equipment on the vehicle 10 side so as to be stored in the storage unit 14, and when the vehicle 10 is parked in the garage 25 (the specific parking position), the information stored in the storage unit 14 of the on-board equipment is uploaded to the equipment (the PC or the home server 22 or the like) on the home network 21 from the vehicle 10 side, so as to be stored in the storage unit 24 on the home 20 side. Then, as an application of the various information on the vehicle 10 stored in the storage unit 24, the information is used to execute vehicle inspection software on the PC or the home server 22 so as to inspect the vehicle 10.

In addition, there may occur a case where the result of the inspection is confirmed further from the on-board equipment side in response to a request from the vehicle 10 parked in the garage 25 (the specific parking position).

In these cases, an uploading timing will be described in detail below using FIG. 4.

Figure 4:
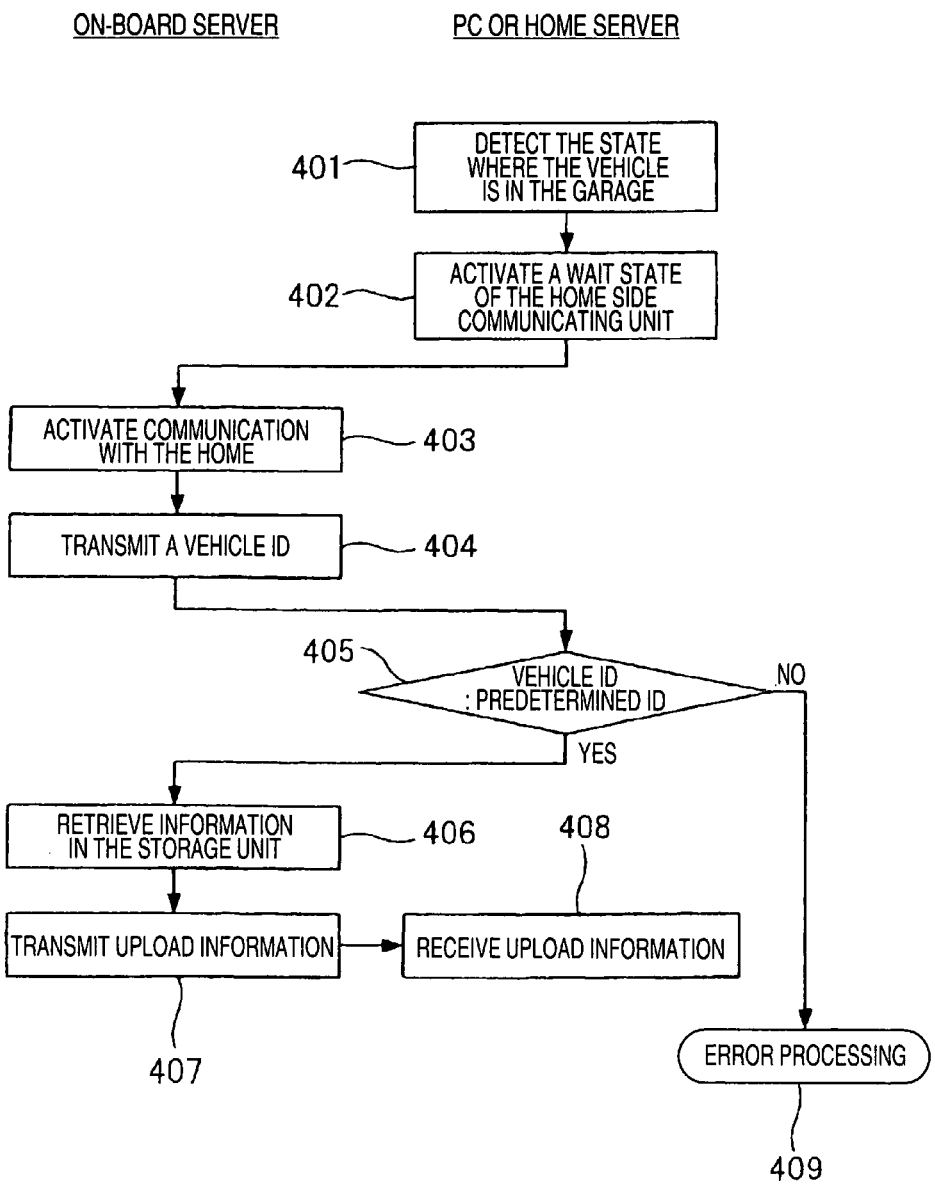
FIG. 4 is a flowchart showing an example of uploading from the vehicle side in wireless communication, which explains the first embodiment of the invention.

FIG. 4 is a flowchart illustrating an example of a communication timing in a case where a communicating means between the home and the vehicle is wireless communication (DSRC), in particular, when a request (for, mainly, uploading) is made from the vehicle side. Firstly, whether or not the vehicle is parked in the garage is detected (step S401). Following this, if the parking of the vehicle in the garage has been detected, the communications base station (the communicating unit) on the home side enters the wait state, enabling communication (step S402). In this state, the initiation of communication is triggered by the detection of a manual operation within the vehicle, or stop of the engine or removal of the key. When communication is started up (step S403), the on-board server 13 transmits a vehicle ID (step S404), and after the vehicle ID so transmitted is confirmed to coincide with a predetermined ID in the PC or the home server 22 (step S405), information in the storage unit 14 is retrieved (step S406), a communication process (an uploading process) being executed (steps S407, 408). Note that when the ID of the vehicle does not coincide with the predetermined ID, an error processing follows (step S409).

In this example, while the authentication of the ID in step S405 is made to constitute part of the flow, it is considered that there is no authentication. In addition, an infrared sensor, a warning communicating unit or a weighing scale for the vehicle can be considered to be used to detect the entrance of the vehicle into the garage. Furthermore, although it is presumed that the communications base station (the communicating unit) on the home side doubles as the warning communicating unit (namely, it is still within the scope of the invention which is claimed for patent under the subject patent application even in the event that the communications base station (the communicating unit) on the home side is in the wait state at all times. In this case, steps S401, S402 become unnecessary).

In addition, although this example is an example in which steps S401, 402 are handled on the home side, those steps can be handled on the vehicle side. Namely, it is also possible to adopt a method in which whether or not the vehicle is in the garage is detected by the vehicle side (step S401), and next, if the entrance of the vehicle into the garage is detected, a signal (an infrared ray) is transmitted from the vehicle side, so as to cause the communications base station (the communicating unit) on the home side to enter the wait state, whereby communication is enabled (step S402). In this case, the detection of the entrance of the vehicle into the garage can also be implemented by virtue of the confirmation of the position of the vehicle by means of GPS or confirmation by the driver.

[When Uploading is Implemented in Response to a Request from the Home Side]

Information while the vehicle is running, information from various sensors for a body system, an engine system and the like and information from the various pieces of equipment installed on the vehicle are collected by the on-board equipment on the vehicle 10 side so as to be stored in the storage unit 14, and when the vehicle 10 is parked in the garage 25 (the specific parking position), the information stored in the storage unit 14 of the on-board equipment is uploaded to the equipment (the PC or the home server) on the home network 21 at the request of the home side 20, so as to be stored in the storage unit 24 on the home 20 side. Then, vehicle inspection software on the PC or the home server 22 is executed from the various information on the vehicle 10 that is stored in the storage unit 24, so as to inspect the vehicle 10.

In this case, an uploading timing will be described in detail below using FIG. 6.

Figure 6:
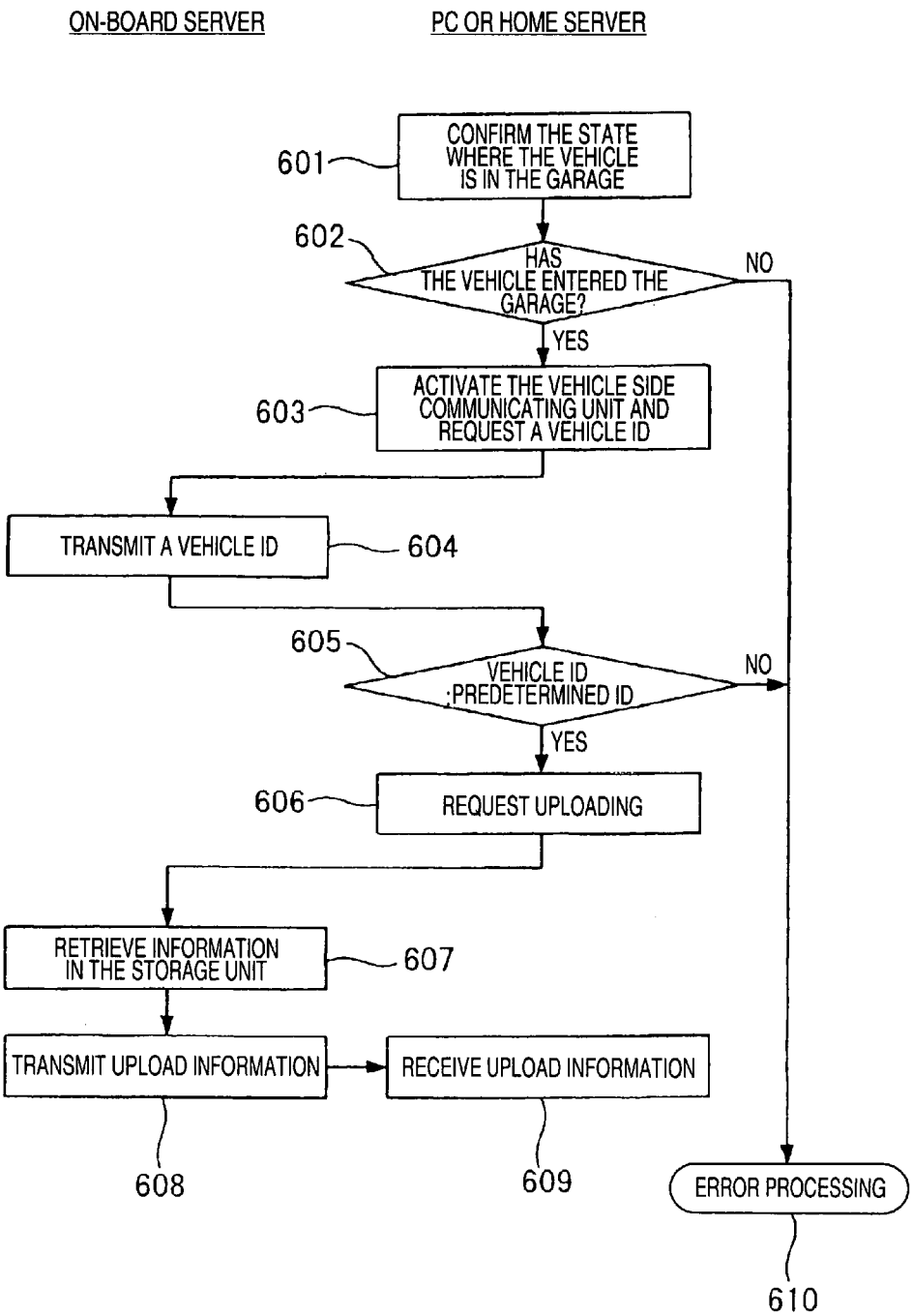
FIG. 6 is a flowchart illustrating an example of uploading from the home side in the wireless communication, which explains the first embodiment of the invention.

FIG. 6 is a flowchart illustrating an example of a communication timing, in particular, an example of a request (mainly for uploading) from the home side in a case where a communicating means between the home and the vehicle is wireless communication (DSRC). Firstly, whether or not the vehicle is parked in the garage is detected (step S601). Following this, if the parking of the vehicle in the garage has been detected (step S602), the communications base station (the communicating unit) on the home side enters the wait state, and the communicating unit on the vehicle side is activated and a request for a vehicle ID is made (step S603). In this state, the initiation of communication is triggered by a manual operation from the PC or the home server 22 or a reserved time for communication set in the PC or the home server 22 (the reserved time may be set as desired or periodically). When communication is started up, the on-board server 13 transmits a vehicle ID (step S604), and after the vehicle ID so transmitted is confirmed to coincide with a predetermined ID in the PC or the home server 22 (step S605), a request for uploading is made (step S606) and information in the storage unit 14 is retrieved (step S607), a communication process (an uploading process) being executed (steps S608, 609). Note that in the event that the ID of the vehicle does not coincide with the predetermined ID, an error processing follows (step S610).

In this example, while the authentication of the ID in step S605 is made to constitute part of the flow, it is considered that there is no authentication. In addition, an infrared sensor or a weighing scale for the vehicle can be considered to be used to detect the entrance of the vehicle into the garage. In addition, it is possible to adopt a method in which after the entrance of the vehicle into the garage is confirmed once, the state of the vehicle is supervised in the PC or the home server 22, so that the state of the garage is confirmed using the supervisory information. In addition, as the periodical setting of the reservation for communication, there are also methods in which (1) communication is started up at a set time every day, (2) communication is started up at a set time on a set day of the week every week, and (3) communication is started up at a set time on a set day every month.

According to this embodiment, since the communication is implemented at the specific parking position such as the garage 25 of the residential place of the user where the vehicle is parked for a long period of time, there is no limitation on communication time, and bulk communication becomes possible. In addition, since the communication is implemented within a specifically limited range such as inside the garage by means of the DSRC communication or the communication is initiated when the ID of the vehicle is detected to coincide with the predetermined ID, the confidentiality of communication can be secured. In addition, the communications system can be configured by utilizing the existing infrastructure such as the home network 21, the initial cost and the running cost can be reduced, and the wasteful movement of the vehicle for inspection or the like can be eliminated.

Figure 8:
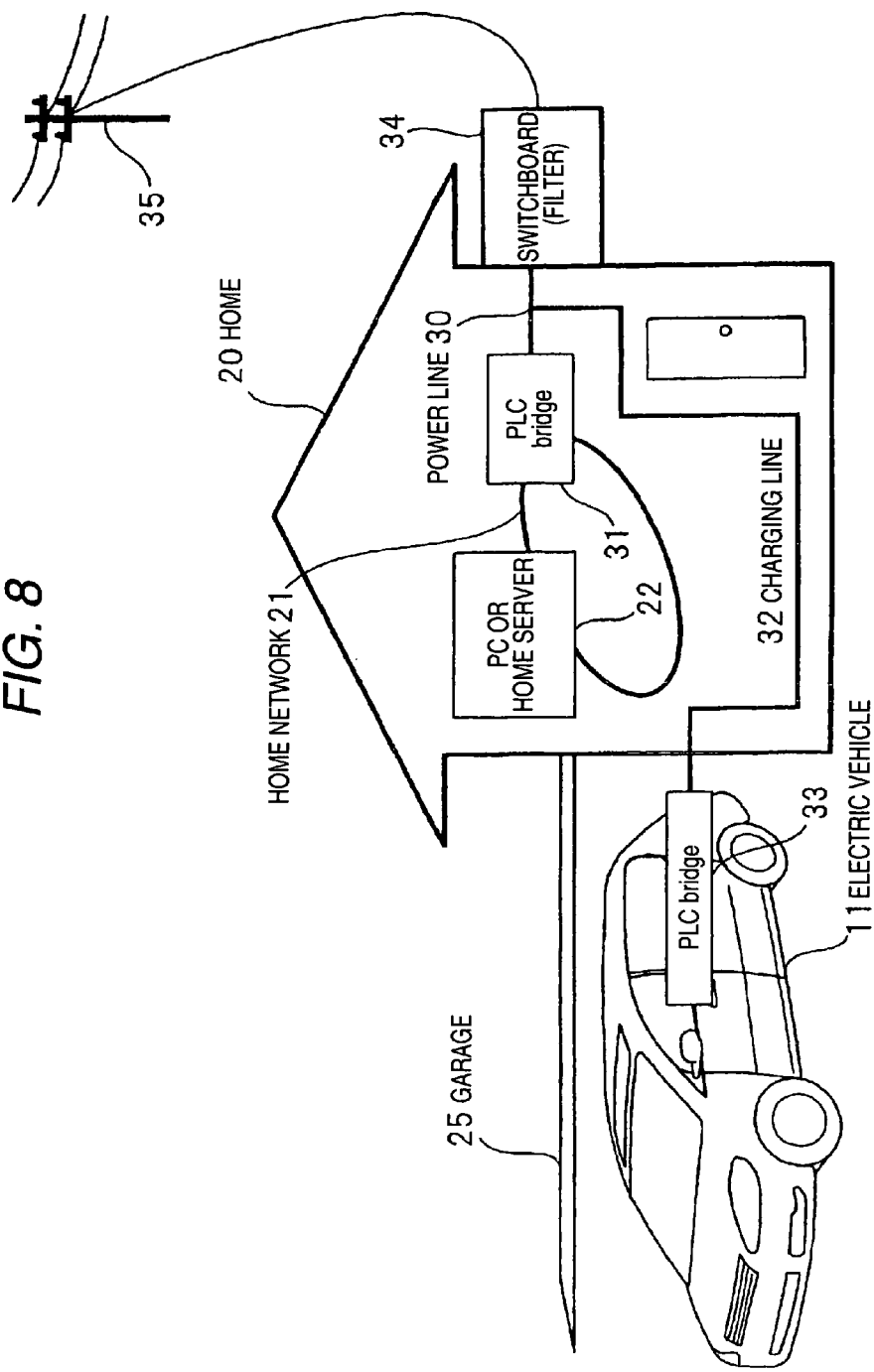
FIG. 8 is a diagram showing a schematic configuration of a communications system between a vehicle and a home, which explains a second embodiment of the invention.

FIG. 8 is a diagram showing a schematic configuration of a communications system between a vehicle and a home, which explains a second embodiment of the invention. This embodiment constitutes a communications system in which a home network 21 including a PC or a home server 22 and an electric vehicle 11 parked in a garage 25 are connected together via PLC bridges 31, 33 by a power supply line (a power line 30, a charging line 32) connected to a commercial power supply 35 via a switchboard (filter) 34. Note that the configuration of the home network 21 is not limited to what is shown in FIG. 8, and hence, there may be a case where the home network 21 is configured by power lines. Firstly, a case will be described where information or contents are downloaded to on-board equipment from the equipment (the PC or the home server 22) connected to the home network 21.

A communicating means between a home 20 and the electric vehicle 11 is made up of a PLC (Power Line Communication control) bridge 31 which is provided at a home 20 end of the charging line 32 and a PCL bridge 33 which is provided at an electric vehicle 11 end thereof. When downloading information or contents, there are operations that are carried out from the on-board equipment side and the in-home equipment side.

[When Downloading is Implemented in Response to a Request from the Vehicle Side]

Information, software, contents, maintenance software and the like that are to be downloaded are designated by the PC or the home server 22 and are captured from a medium such as a DVD and the internet by the equipment connected to the home network 21 so as to be stored in a storage unit 24 of the PC or the home server 22, and the information and the like so stored are then downloaded in response to a request from the electric vehicle 11 side when the electric vehicle 11 is parked in the garage 25 (a specific parking position) and a plug of the charging line is inserted.

[When Information is Downloaded by being Retrieved/Selected from the Vehicle Side]

When the electric vehicle 11 is parked in the garage 25 (the specific parking position), the information, software, contents, maintenance software and the like which are stored in the equipment on the home network 21 are retrieved/selected from the on-board equipment on the electric vehicle 11 side, so that they are downloaded on the on-board equipment.

In these cases, a downloading timing will be described in detail using FIG. 10.

Figure 10:
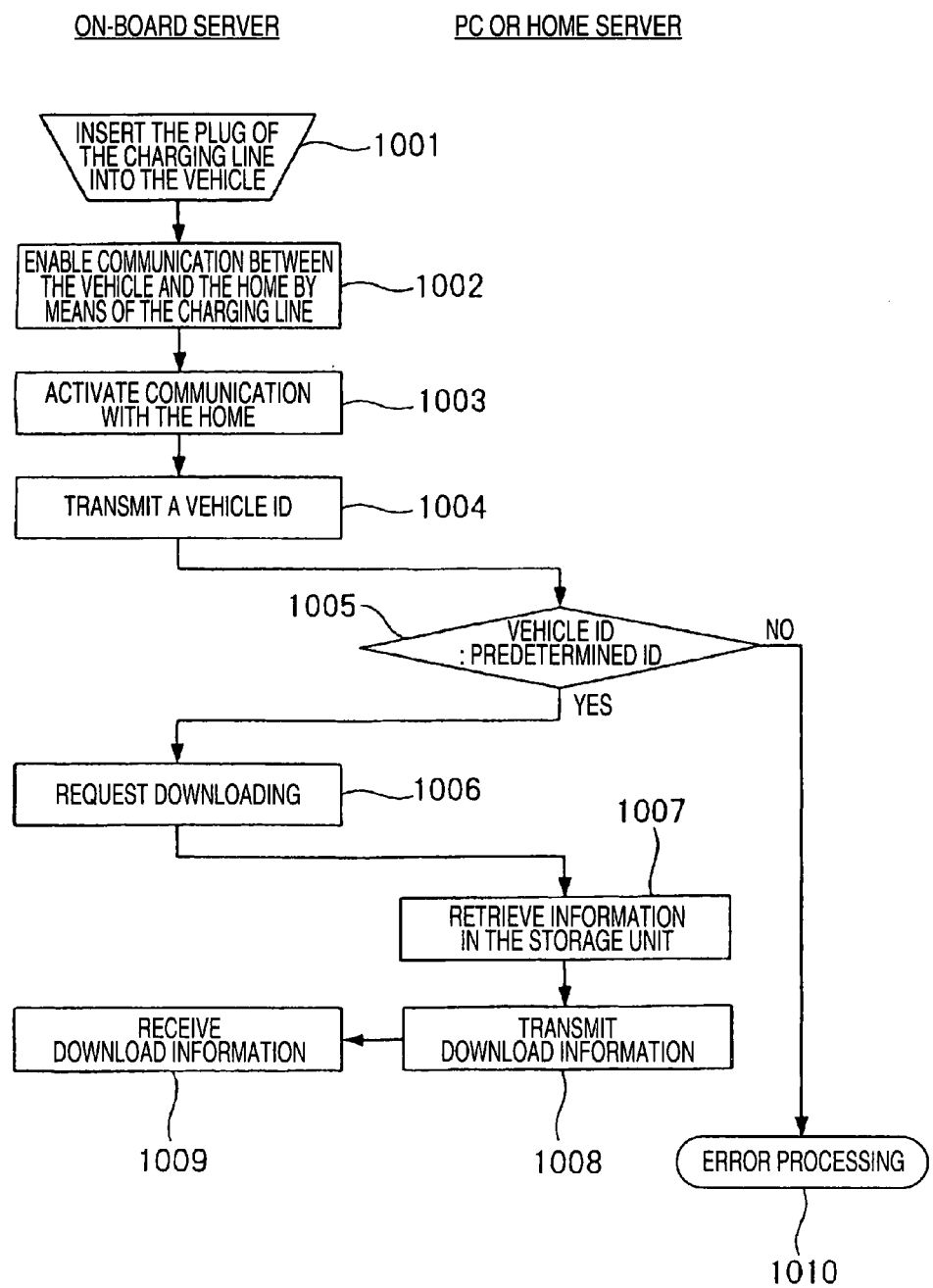
FIG. 10 is a flowchart illustrating an example of downloading from the vehicle side in the charging line, which explains the second embodiment of the invention.

FIG. 10 is a flowchart illustrating, in particular, an example of a request (mainly for downloading) from the vehicle side where a communicating means between the home and the vehicle is a charging line. Firstly, when the vehicle enters the garage and the plug of the charging line is inserted (step S1001), a state results where communication is enabled (step S1002). In this state, the initiation of communication is triggered by the detection of a manual operation within the vehicle, or start of the engine or insertion of the key or stop of the engine or removal of the key. When communication is started up (step S1003), a vehicle ID is transmitted (step S1004), and after the vehicle ID so transmitted is confirmed to coincide with a predetermined ID in the PC or the home server 22 (step S1005), downloading is requested (step S1006), and information in the storage unit 24 is retrieved (step S1007), a communication process (a downloading process) being executed (steps S1008, 1009). Note that in the event that the ID of the vehicle does not coincide with the predetermined ID, an error processing follows (step S1010). In this example, while the authentication of the ID in step S1005 is made to constitute part of the flow, it is considered that there is no authentication. In addition, although there may be a case where the manual operation within the vehicle is executed before the plug of the charging line is inserted, this can easily be anticipated.

In addition, in this example, while an on-board server 13 transmits the vehicle ID in step S1004, and the request for downloading is made in step S1006 after the vehicle ID has been authenticated in step S1005, a case can be easily anticipated from this example in which the transmission of the vehicle ID and the request for downloading are made in step S1004, and the vehicle ID is authenticated in step S1005. (However, in this case, step S1006 is deleted.)

[When Downloading is Implemented in Response to a Request from the Home Side]

Information, software, contents, maintenance software and the like that are to be downloaded are designated by the PC or the home server and are captured from a medium such as a DVD and the internet by the equipment connected to the home network 21 so as to be stored in the storage unit 24 of the PC or the home server 22, and the information and the like so stored are then downloaded from the PC or the home server 22 to the on-board equipment (in response to a request from the home 20 side) when the electric vehicle 11 is parked in the garage 25 (the specific parking position).

In this case, a downloading timing will be described in detail using FIG. 12.

Figure 12:
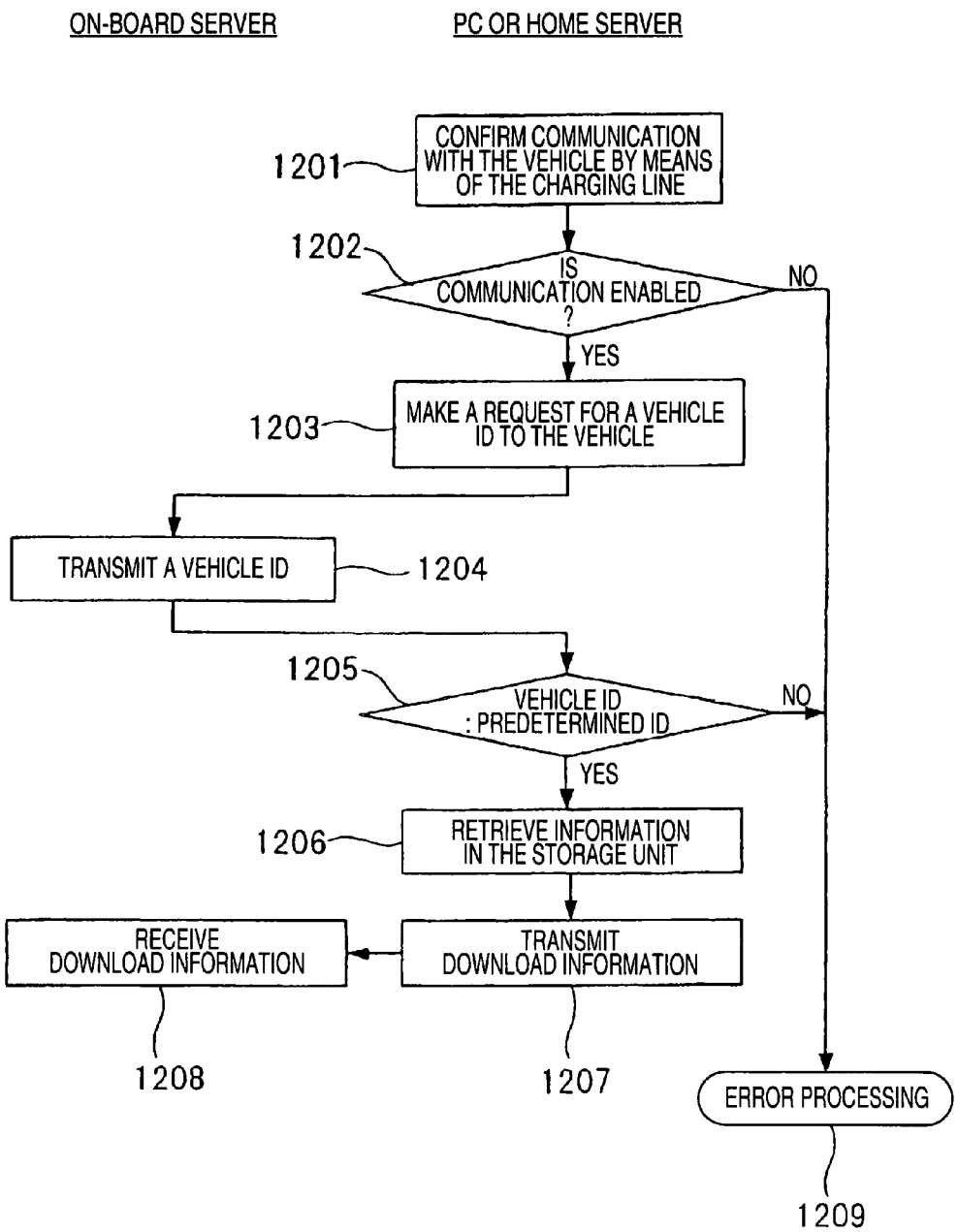
FIG. 12 is a flowchart illustrating an example of downloading from the home side in the charging line, which explains the second embodiment of the invention.

FIG. 12 is a flowchart illustrating, in particular, an example of a request (mainly for downloading) from the vehicle side where a communicating means between the home and the vehicle is a charging line. Firstly, it is confirmed that the vehicle has entered the garage, the plug of the charging line has been inserted and the communication with the vehicle is enabled by means of the charging line (step S1202). In this state, the initiation of communication is triggered by a manual operation from the PC or the home server 22 or a reserved time for communication set in the PC or the home server 22 (the reserved time may be set as desired or periodically). When communication is started up, a request for an ID is made to the vehicle (step S1203), and the on-board server 13 transmits a vehicle ID (step S1204), and after the vehicle ID so transmitted is confirmed to coincide with a predetermined ID in the PC or the home server 22 (step S1205), information in the storage unit 24 is retrieved (step S1206), a communication process (a downloading process) being executed (steps S1207, 1208). Note that in the event that the ID of the vehicle does not coincide with the predetermined ID, an error processing follows (step S1209).

In this example, while the authentication of the ID in step S1205 is made to constitute part of the flow, it is considered that there is no authentication. In addition, as the periodical setting of the reservation for communication, there are also methods in which (1) communication is started up at a set time every day, (2) communication is started up at a set time on a set day of the week every week, and (3) communication is started up at a set time on a set day every month.

Next, a case will be described where various information or contents are uploaded from the on-board equipment to the equipment (the PC or the home server or the like) connected to the home network 21. In this case, too, there are operations that are carried out from the on-board equipment side and the in-home equipment side.

[When Uploading is Implemented from the Vehicle Side]

Information while the electric vehicle is running, information from various sensors for a body system, an engine system and the like of the vehicle and information from the various pieces of equipment installed on the vehicle are collected by the on-board equipment on the electric vehicle 11 side so as to be stored in the storage unit 14, and when the electric vehicle 11 is parked in the garage 25 (the specific parking position) and the plug of the charging line is inserted, the information stored in the storage unit 14 of the on-board equipment is uploaded to the various pieces of equipment (the PC or the home server 22 or the like) on the home network 21 from the electric vehicle 11 side, so as to be stored in the storage unit 24 on the home 20 side, and vehicle inspection software on the PC or the home server 22 is executed from the various pieces of information stored in the storage unit 24, whereby the electric vehicle 11 is inspected.

In addition, the result of the inspection is confirmed further from the on-board equipment side at the request of the electric vehicle 11 parked in the garage 25 (the specific parking position).

In these cases, an uploading timing will be described in detail below using FIG. 9.

Figure 9:
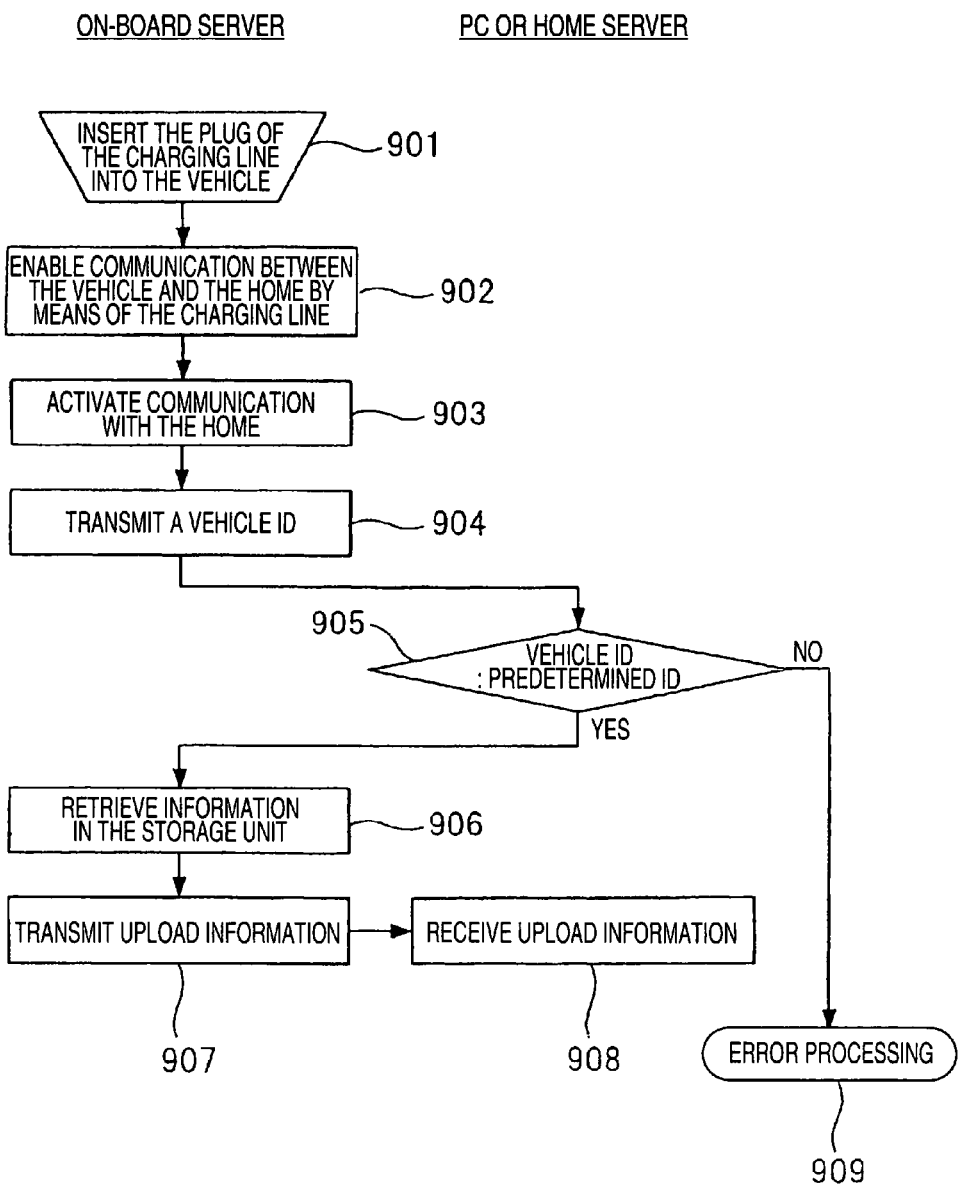
FIG. 9 is a flowchart illustrating an example of uploading from the vehicle side in a charging line, which explains the second embodiment of the invention.

FIG. 9 is a flowchart illustrating, in particular, an example of a request (mainly for uploading) from the vehicle side where a communicating means between the home and the vehicle is a charging line. Firstly, the vehicle enters the garage, and the plug of the charging line is inserted (step S901), a state resulting where communication is enabled (step S902). In this state, the initiation of communication is triggered by the detection of a manual operation within the vehicle, or stop of the engine or removal of the key. When communication is started up (step S903), a vehicle ID is transmitted (step S903), and after the vehicle ID so transmitted is confirmed to coincide with a predetermined ID in the PC or the home server 22 (step S905), information in the storage unit 14 is retrieved (step S906), a communication process (an uploading process) being executed (steps S907, 908). Note that when the ID of the vehicle does not coincide with the predetermined ID, an error processing follows (step S909). In this example, while the authentication of the ID in step S905 is made to constitute part of the flow, it is considered that there is no authentication. In addition, although there may be a case where the manual operation within the vehicle is executed before the plug of the charging line is inserted, this can easily be anticipated.

[When Uploading is Implemented in Response to a Request from the Home Side]

Information while the electric vehicle is running, information from various sensors for a body system, an engine system and the like of the vehicle and information from the various pieces of equipment installed on the vehicle are collected by the on-board equipment on the electric vehicle 11 side so as to be stored in the storage unit 14, and when the electric vehicle 11 is parked in the garage 25 (the specific parking position) and the plug of the charging line is inserted, the information stored in the storage unit 14 of the on-board equipment is uploaded to the various pieces of equipment (the PC or the home server 22 or the like) on the home network 21 in response to a request from the home 20 side, so as to be stored in the storage unit 24 on the home 20 side, and the vehicle inspection software on the PC or the home server 22 is executed from the various pieces of information stored in the storage unit 24, whereby the electric vehicle 11 is inspected.

In this case, an uploading timing will be described in detail below using FIG. 11.

Figure 11:
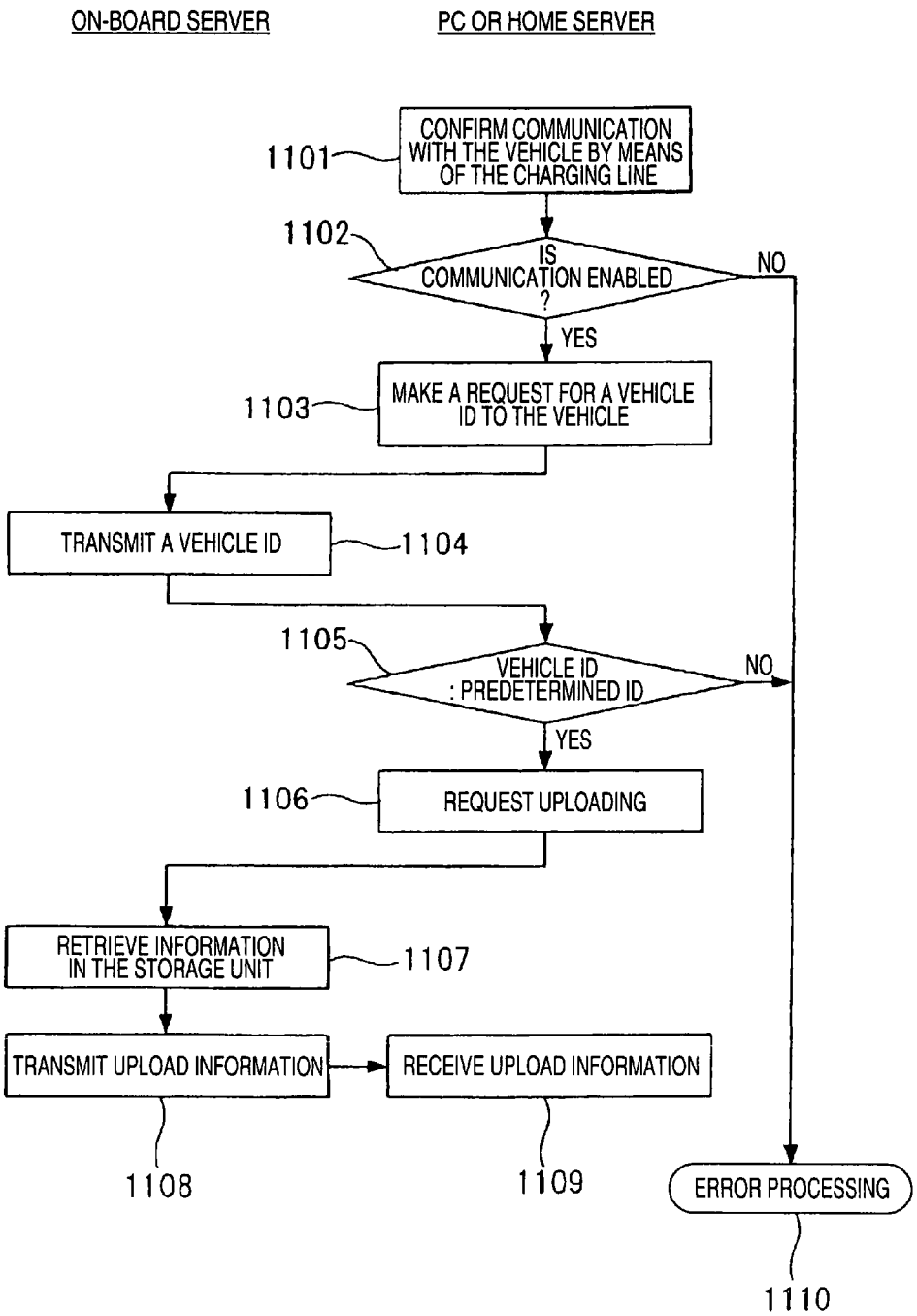
FIG. 11 is a flowchart illustrating an example of uploading from the home side in the charging line, which explains the second embodiment of the invention.

FIG. 11 is a flowchart illustrating, in particular, an example a request (mainly for uploading) from the home side where a communicating means between the home and the vehicle is a charging line. Firstly, it is confirmed that the vehicle has entered the garage, the plug of the charging line has been inserted and the communication with the vehicle is enabled by means of the charging line (step S1101), and whether or not communication is enabled is determined (step S1102). In this state, the initiation of communication is triggered by a manual operation from the PC or the home server 22 or a reserved time for communication set in the PC or the home server 22 (the reserved time may be set as desired or periodically). When communication is started up, a request for a vehicle ID is made to the vehicle (step S1103), whereby the on-board server 13 transmits a vehicle ID (step S1104), and after the vehicle ID so transmitted is confirmed to coincide with a predetermined ID in the PC or the home server 22 (step S1105), a request for uploading is made (step S1106). Then, information in the storage unit 14 is retrieved (step S1107), and a communication process (an uploading process) is executed (steps S1108, 1109). Note that in the event that the ID of the vehicle does not coincide with the predetermined ID, an error processing follows (step S1110).

In this example, while the authentication of the ID in step S1105 is made to constitute part of the flow, it is considered that there is no authentication. In addition, as the periodical setting of the reservation for communication, there are also methods in which (1) communication is started up at a set time every day, (2) communication is started up at a set time on a set day of the week every week, and (3) communication is started up at a set time on a set day every month.

According to this embodiment, since the communication is implemented at the specific parking position such as the garage 25 of the residential place of the user where the vehicle is parked for a long period of time, there is no limitation on communication time, and bulk communication becomes possible. In addition, since the wired communication is implemented in the specific position by means of the charging line or the communication is initiated when the ID of the vehicle is detected to coincide with the predetermined ID, the confidentiality of communication can be secured. In addition, the communications system can be configured by utilizing the existing infrastructure such as the home network 21, the initial cost and the running cost can be reduced, and the wasteful movement of the vehicle for inspection or the like can be eliminated.

Figure 13:
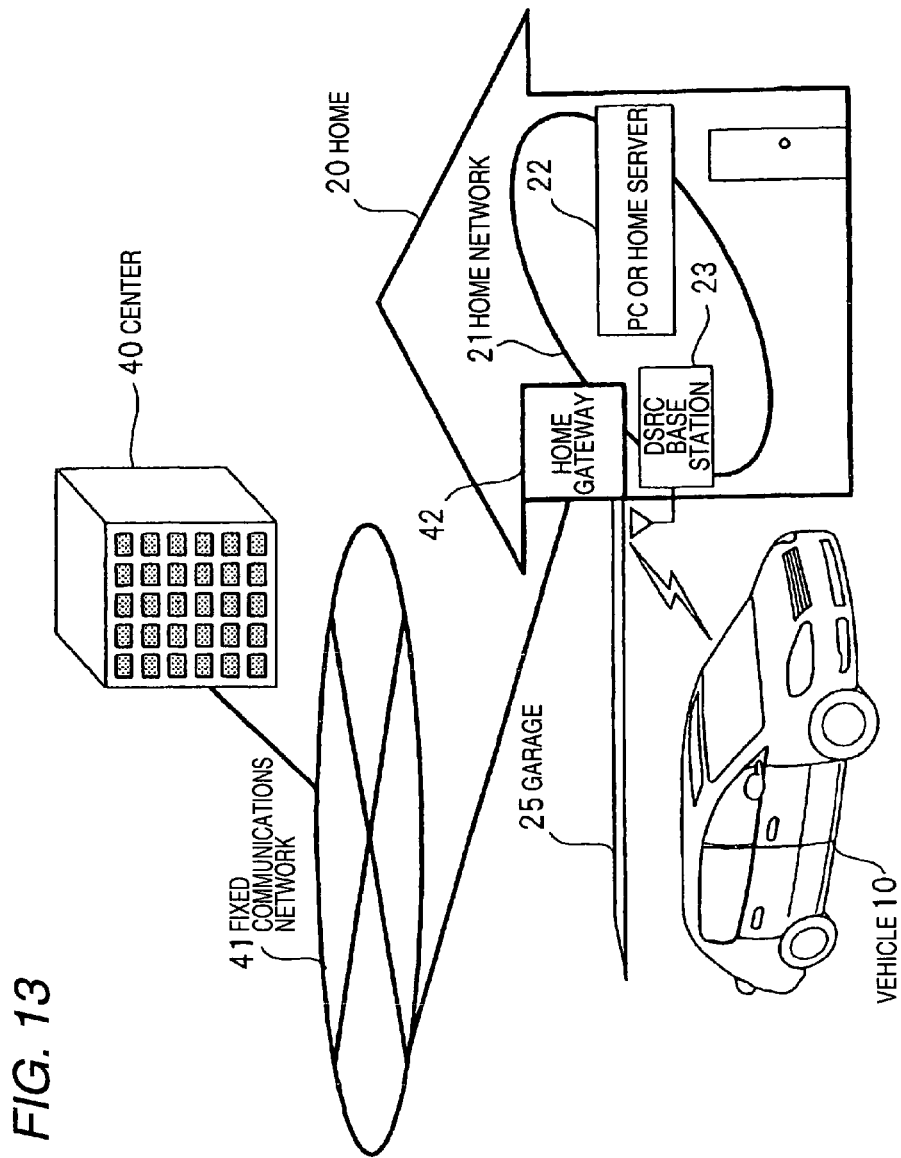
FIG. 13 is a diagram showing a schematic configuration of a communications system between a vehicle and a home, which explains a third embodiment of the invention.

FIG. 13 is a diagram showing a schematic configuration of a communications system between a vehicle, a home and a center, which explains a third embodiment of the invention. This embodiment constitutes a communications system in which a home network 21 linked to a plurality of pieces of equipment and a vehicle 10 parked in a garage 25 (a parking place) are connected to each other by means of a DSRC, and the home network 21 is connected to a third party's center 40 through a gateway 42 and by way of a communications line (a fixed communications network 41). In addition, as the fixed communications network 41, there are a telephone network, a power network, a cable TV network, a governmental or municipal network (a private line), a satellite communications network and the like. In this embodiment, however, while a communicating means between the vehicle and the home is the DSRC, a connection by means of a wireless LAN (for exclusive use between a home 20 and the vehicle 10) or Bluetooth or the like is possible. In addition, it can easily be surmised that the PC or the home server 22 and a DSRC base station are connected by means of serial communications without being connected by way of the home network 21. Furthermore, it is also considered that the PC or the home server 22 is connected directly to a public line (the fixed communications line 41) without the home network 21 and the gateway 42 being interposed therebetween.

Firstly, a case will be described where a map, various information on sightseeing or service and maintenance of equipment of the vehicle and software or contents on the maintenance of the vehicle are downloaded to on-board equipment or various pieces of equipment (an on-board server 13 and the like) of the vehicle 10 from the third party's center 40 (a car manufacturer, a car dealer, an on-board equipment manufacturer, a security center and the like) by way of the home network 21 or equipment (the PC or the home server 22) connected thereto. A communicating means between the home 20 and the vehicle is made up of a dedicated DSRC base station 23 which is placed on the home 20 side and a DSRC on-board equipment 12 which is placed on the vehicle 10 side. In this case, there are operations that are carried out from the on-board equipment side and the in-home equipment side.

[When Information Distributed to the Home Side is Downloaded in Response to a Request from the Vehicle Side]

Firstly, information (various information, software, contents, maintenance software and the like) that is to be downloaded from the third party's center 40 is distributed in advance to a storage unit 24 of the PC or the home server 22 which is connected to the home network 21 having the gateway 42 within the home 20 by way of the fixed communications network 41, and when the vehicle 10 is parked in the garage 25 (a specific parking position), the information so distributed is downloaded via the DSRC base station 23 in response to a request from the vehicle 10 side. In this case, the information that is to be downloaded from the third party's center 40 has information on a final distribution destination (the equipment on the home side 20, the equipment on the vehicle 10 side or the like).

In addition, there may be a case where the information (various information, software, contents, maintenance software and the like) that is to be downloaded from the third party's center 40 is downloaded to the storage unit 24 of the PC or the home server 22 on the home side in response to a request therefrom, instead of distributing the information to the storage unit 24 of the PC or the home server 22.

[When Downloading from the Center is Implemented Directly to the Vehicle Side]

When the vehicle 10 is parked in the garage 25 (the specific parking position), information (various information, software, contents, maintenance software and the like) that is to be downloaded to the vehicle 10 from the third party's center 40 is downloaded to the on-board equipment by way of the fixed communications network 41, the home network 21 (to which the PC or the home server and the home gateway 42 are connected) and the DSRC base station 23.

In these cases, a downloading timing is similar to the downloading timing described in the first embodiment by reference to FIG. 5.

[When Information that is Distributed to the Home Side is Downloaded in Response to a Request from the Home Side]

Information (various information, software, contents, maintenance software and the like) that is to be downloaded from the third party's center 40 is distributed in advance to a storage unit 24 of the PC or the home server 22 which is connected to the home network 21 having the gateway 42 within the home 20 by way of the fixed communications network 41, and when the vehicle 10 is parked in the garage 25 (the specific parking position), the information so distributed is downloaded from the PC or the home server 22 or the like to the on-board equipment via the DSRC base station 23 (in response to a request from the home 20 side). In this case, too, the information that is to be downloaded from the third party's center 40 has information on the final distribution destination (the equipment on the home side 20, the equipment on the vehicle 10 side or the like).

In addition, there may be a case where the information (various information, software, contents, maintenance software and the like) that is to be downloaded from the third party's center 40 is downloaded to the storage unit 24 of the PC or the home server 22 on the home side in response to a request therefrom, instead of distributing the information to the storage unit 24 of the PC or the home server 22.

[When Downloading is Implemented from the Center Directly to the Vehicle Side]

When the vehicle 10 is parked in the garage 25 (the specific parking position), information (various information, software, contents, maintenance software and the like) that is to be downloaded from the third party's center 40 is distributed to the equipment on the vehicle 10 side via the DSRC base station 23 by way of the fixed communications network 41 and by way of the home network 21 (to which the PC or the home server 22 or the like is connected and) which is connected to the home network 21 having the home gateway 42 within the home 20. In this case, too, the information that is to be downloaded from the third party's center 40 has information having a final distribution destination (the equipment on the home side 20, the equipment on the vehicle 10 side, or the like).

In these cases, a downloading timing is similar to the download timing described in the first embodiment by reference to FIG. 7.

Next, a case will be described where various information such as information on the running condition, fuel, failure, warning of the vehicle, or failure/in-use condition of equipment, and information from various sensors is uploaded from the on-board equipment or various pieces of equipment (the on-board server 13 or the lie) of the vehicle 10 to the third party's center 40 (a car manufacturer, a car dealer, an on-board equipment manufacturer, a security center or the like) by way of the home network 21 and the equipment (the PC or the home server 22 or the like) connected thereto, so that the vehicle is inspected. In this case, too, there are operations that are carried out from the on-board equipment side and the in-home equipment side.

[When Information is Uploaded Temporarily from the Vehicle Side to the Home Side and is then Uploaded to the Center in Response to a Request from the Center Side for Inspection of the Vehicle]

Firstly, information when the vehicle is running, information from various sensors of a body system, an engine system and the like of the vehicle, information on various pieces of equipment installed on the vehicle and the like are collected by the on-board equipment on the vehicle 10 side so as to be stored in a storage unit, and when the vehicle 10 is parked in the garage 25 (the specific parking position), the information stored in the storage unit 14 of the on-board equipment is uploaded to the various pieces of equipment (the PC or the home server 22 or the like) on the home network 21 within the home 20 via the DSRC base station 23 from the vehicle 10 side, so as to store the information so uploaded in the storage unit 24 on the home side. Then, the information stored in the storage unit 24 on the home side is uploaded to the third party's center 40 by way of the home gateway 42 and the fixed communications network 41 in response to a request from the third party's center 40. Then, vehicle inspection software is executed in a processing unit of the third party's center 40 from the various information of the vehicle 10 which is stored in a storage unit of the third party's center 40 for inspection of the vehicle 10.

[When Information is Uploaded Temporarily from the Vehicle Side to the Home Side and a Vehicle Inspection is Carried Out on the Center Side in Response to a Request from the Home Side]

Information when the vehicle is running, information from the various sensors of the body system, the engine system and the like of the vehicle, information on the various pieces of equipment installed on the vehicle and the like are collected by the on-board equipment on the vehicle 10 side so as to be stored in the storage unit 14, and when the vehicle 10 is parked in the garage 25 (the specific parking position), the information stored in the storage unit 14 of the on-board equipment of the vehicle 10 is uploaded to the various pieces of equipment (the PC or the home server 22 or the like) on the home network 21 within the home 20 via the DSRC base station 23 from the vehicle 10 side, so as to store the information so uploaded in the storage unit 24 on the home side. Then, the information stored in the storage unit 24 on the home side 20 is uploaded from the various pieces of equipment (the PC or the home server 22 or the like) on the home network 21 to the third party's center 40 by way of the home gateway 42 and the fixed communications network 41. Then, the vehicle inspection software in the processing unit of the third party's center 40 is executed from the various information of the vehicle 10 which is stored in the storage unit of the third party's center 40 for inspection of the vehicle 10.

[When the Result of the Vehicle Inspection Carried Out by Uploading the Information from the Vehicle Side to the Home Side is Uploaded to the Center Side]

Information when the vehicle is running, information from the various sensors of the body system, the engine system and the like of the vehicle, information on the various pieces of equipment installed on the vehicle and the like are collected by the on-board equipment on the vehicle 10 side so as to be stored in the storage unit 14, and when the vehicle 10 is parked in the garage 25 (the specific parking position), the information stored in the storage unit 14 of the on-board equipment of the vehicle 10 is uploaded to the various pieces of equipment (the PC or the home server 22 or the like) on the home network 21 within the home 20 via the DSRC base station 23 from the vehicle 10 side, so as to store the information so uploaded in the storage unit 24 on the home side. Then, vehicle inspection software on the PC or the home server 22 is executed from the various information on the vehicle 10 which is stored in the storage unit 24 for inspection of the vehicle 10, and the result of the inspection is then uploaded to the third party's center 40 by way of the home gateway 42 and the fixed communications network 41.

[When Direct Uploading to the Center is Implemented from the Vehicle Side for Inspection of the Vehicle]

When the vehicle 10 is parked in the garage 25 (the specific parking position), information when the vehicle is running, information from the various sensors of the body system, the engine system and the like of the vehicle, information on the various pieces of equipment installed on the vehicle and the like are uploaded to the third party's center 40 from the on-board equipment of the vehicle 10 side via the DSRC base station 23 by way of the home network 21 (the PC or the home server 22 or the like) within the home 20, the home gateway 42 and the fixed communications network 41. Then, the vehicle inspection software in the processing unit of the third party's center 40 is executed from the various information on the vehicle 10 which is stored in the storage unit of the third party's center 40 for inspection of the vehicle 10.

In addition, there may occur a case where the result of the inspection is confirmed further from the on-board equipment side in response to a request from the vehicle 10 parked in the garage 25 (the specific parking position).

In these cases, an upload timing is similar to the upload timing described in the first embodiment by reference to FIG. 4.

[When the Information Temporarily Uploaded in Response to the Request from the Home Side is Uploaded in Response to a Request from the Center Side for Inspection of the Vehicle]

Information when the vehicle is running, information from the various sensors of the body system, the engine system and the like of the vehicle, information on the various pieces of equipment installed on the vehicle and the like are collected by the on-board equipment on the vehicle 10 side so as to be stored in the storage unit 14, and when the vehicle 10 is parked in the garage 25 (the specific parking position), the information stored in the storage unit 14 of the on-board equipment of the vehicle 10 is uploaded to the various pieces of equipment (the PC or the home server 22 or the like) on the home network 21 within the home 20 via the DSRC base station 23 in response to a request from the home 20 side, so as to store the information so uploaded in the storage unit 24 on the home side 20. Then, the information stored in the storage unit 24 on the home side 20 is uploaded to the third party's center 40 by way of the home gateway 42 and the fixed communications network 41 in response to a request from the third party's center 40. Then, the vehicle inspection software in the processing unit of the third party's center 40 is executed from the various information on the vehicle 10 which is stored in the storage unit of the third party's center 40 for inspection of the vehicle 10.

[When Information is Uploaded in Response to a Request from the Home Side for Inspection of the Vehicle on the Center Side]

Information when the vehicle is running, information from the various sensors of the body system, the engine system and the like of the vehicle, information on the various pieces of equipment installed on the vehicle and the like are collected by the on-board equipment on the vehicle 10 side so as to be stored in the storage unit 14, and when the vehicle 10 is parked in the garage 25 (the specific parking position), the information stored in the storage unit 14 of the on-board equipment of the vehicle 10 is uploaded to the various pieces of equipment (the PC or the home server 22 or the like) on the home network 21 within the home 20 via the DSRC base station 23 in response to a request from the home 21 side, so as to store the information so uploaded in the storage unit 24 on the home side 20. Then, the information stored in the storage unit 24 on the home side 20 is uploaded from the various pieces of equipment (the PC or the home server 22 or the like) on the home network 21 to the third party's center 40 by way of the home gateway 42 and the fixed communications network 41. Then, the vehicle inspection software in the processing unit of the third party's center 40 is executed from the various information on the vehicle 10 which is stored in the storage unit of the third party's center 40 for inspection of the vehicle 10.

[When the Result of the Vehicle Inspection Carried Out by Uploading the Information from the Vehicle Side in Response to the Request from the Home Side is Uploaded to the Center Side]

Information when the vehicle is running, information from the various sensors of the body system, the engine system and the like of the vehicle, information on the various pieces of equipment installed on the vehicle and the like are collected by the on-board equipment on the vehicle 10 side so as to be stored in the storage unit 14, and when the vehicle 10 is parked in the garage 25 (the specific parking position), the information stored in the storage unit 14 of the on-board equipment of the vehicle 10 is uploaded to the various pieces of equipment (the PC or the home server 22 or the like) on the home network 21 within the home 20 via the DSRC base station 23 in response to a request from the home 21 side, so as to store the information so uploaded in the storage unit 24 on the home side 20. Then, the vehicle inspection software on the PC or the home server 22 is executed from the various information on the vehicle 10 stored in the storage unit 24 for inspection of the vehicle 10, and the result of the inspection is uploaded to the third party's center 40 from the PC or the home server 22 on the home network 21 by way of the home gateway 42 and the fixed communications network 41.

[When Direct Uploading is Implemented in Response to a Request from the Center Side for Inspection of the Vehicle 10]

When the vehicle 10 is parked in the garage 25 (the specific parking position), information when the vehicle 10 is running, information from the various sensors of the body system, the engine system and the like of the vehicle, information on the various pieces of equipment installed on the vehicle and the like are uploaded to the third party's center 40 via the DSRC base station 23 by way of the home network 21 (to which the PC or the home server 22 is connected), the home gateway 42 and the fixed communications network 41 in response to a request from the third party's center 40. Then, the vehicle inspection software in the processing unit of the third party's center 40 is executed from the various information on the vehicle 10 which is stored in the storage unit of the third party's center 40 for inspection of the vehicle 10.

In these cases, an upload timing is similar to the uploading timing described in the first embodiment by reference to FIG. 6.

Next, by reference to FIG. 13 a communications system will be described in which the vehicle 10 parked in the garage 25 (the specific parking place) is connected by means of the DSRC by way of the home network 21 which is linked to a home security network directly or via a plurality of pieces of equipment. In this case, information from the on-board equipment or the various sensors can be uploaded to the home security network by way of the home network 21 and the equipment (the PC or the home server 22 or the like) which is connected thereto. In this embodiment, however, while the communicating means between the vehicle and the home is the DSRC, a connection by means of a wireless LAN (for exclusive use between the home 20 and the vehicle 10) or Bluetooth is also possible.

[When a Security Mode is Activated from the Vehicle Side]

When the vehicle is parked in the garage 25 (the specific parking position), information such as information from the various sensors of the body system, the engine system and the like of the vehicle 10, information from the various pieces of on-board equipment such as a supervisory image and the like are collected, and the information so collected is uploaded to the home security network (by way of the home network 21) within the home 20 from the vehicle 10 side via the DSRC base station 23, so as to be made use of for remote supervision from the home 20 side or the security network 40 side (there may be a case where the home network 21 doubles as the home security network). Alternatively, when abnormality is detected on the vehicle 10 side, the collected information is uploaded to the home security network (by way of the home network 21).

In addition, there may occur a case where in the event that abnormality occurs further on the vehicle side, a control signal which signal warning, key locking or the like is sent to the vehicle 10 side from the security center 40 side or the home 20 side by way of the home security network (the home network 21).

In addition, the remote supervision from the home 20 side may entrain a case where the information collected from the vehicle 10 side is uploaded to the PC or the home server 22 on the home network 21, so as to execute security abnormality detection software on the PC or the home server 22.

In these cases, an uploading timing will be described in detail below using FIG. 14 or FIG. 15.

Figure 14:
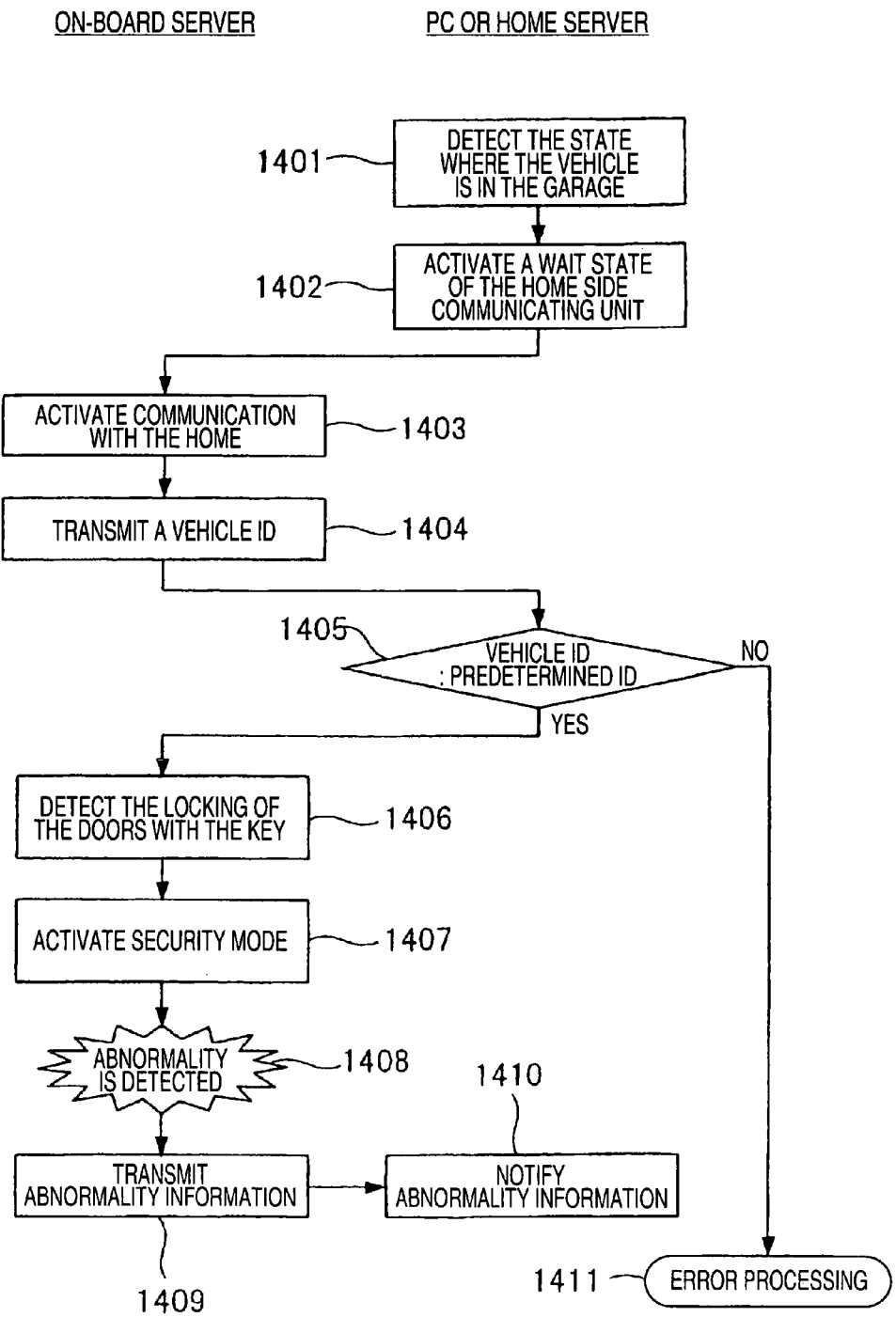
FIG. 14 is a flowchart illustrating an example of activation from the vehicle side under remote supervision in wireless communication, which explains the third embodiment of the invention.

FIG. 14 is a flowchart illustrating, in particular, an example of a request (mainly for uploading) from the vehicle side where the remote supervision is carried out when the communicating means between the home and the vehicle is the wireless communication (the DSRC). Firstly, whether or not the vehicle is in the garage is detected (step S1401). Next, if the entrance of the vehicle into the garage is detected, a communications base station (a communicating unit) on the home side enters the wait state, enabling communication (step S1402). The initiation of communication in this state is triggered by detection of a manual operation within the vehicle or the stop of the engine or removal of the key. When communication is initiated (step S1403), an on-board server 13 transmits a vehicle ID (step S1404), and an ID authentication is carried out in the PC or the home server 22 in which the transmitted vehicle ID is confirmed to coincide with a predetermined ID (step s1405). Next, when the locking of doors of the vehicle with a key thereto (key locking) is detected (step S1406), the equipment within the vehicle and a security mode of a sensor are activated (step S1407). Then, when the sensor or the like detects abnormality (step S1408), communication is started up for transmission of abnormality information (step S1409), so that the security center is notified of the abnormality (step S1410). Note that in the event that the ID of the vehicle does not coincide with the predetermined ID, an error processing follows (step s1411).

In this example, while the authentication of the ID in step S1405 is made to constitute part of the flow, it is considered that there is no authentication. In addition, an infrared sensor, a warning communicating unit or a weighing scale for the vehicle can be considered to be used to detect the entrance of the vehicle into the garage. Furthermore, although it is presumed that the communications base station (the communicating unit) on the home side doubles as the warning communicating unit (namely, it is still within the scope of the invention which is claimed for patent under the subject patent application even in the event that the communications base station (the communicating unit) on the home side is in the wait state at all times. In this case, steps S1401, S1402 become unnecessary). Note that it can also be considered as the trigger that the doors are locked with the key thereto by removal thereof.

In addition, although this example is an example in which steps S1401, 1402 are handled on the home side, those steps can be handled on the vehicle side. Namely, it is also possible to adopt a method in which whether or not the vehicle is in the garage is detected by the vehicle side (step S1401), and next, if the entrance of the vehicle into the garage is detected, a signal (an infrared ray) is transmitted from the vehicle side, so as to cause the communications base station (the communicating unit) on the home side to enter the wait state, whereby communication is enabled (step S1402). In this case, the detection of the entrance of the vehicle into the garage can also be implemented by virtue of the confirmation of the position of the vehicle by means of GPS or confirmation by the driver.

Figure 15:
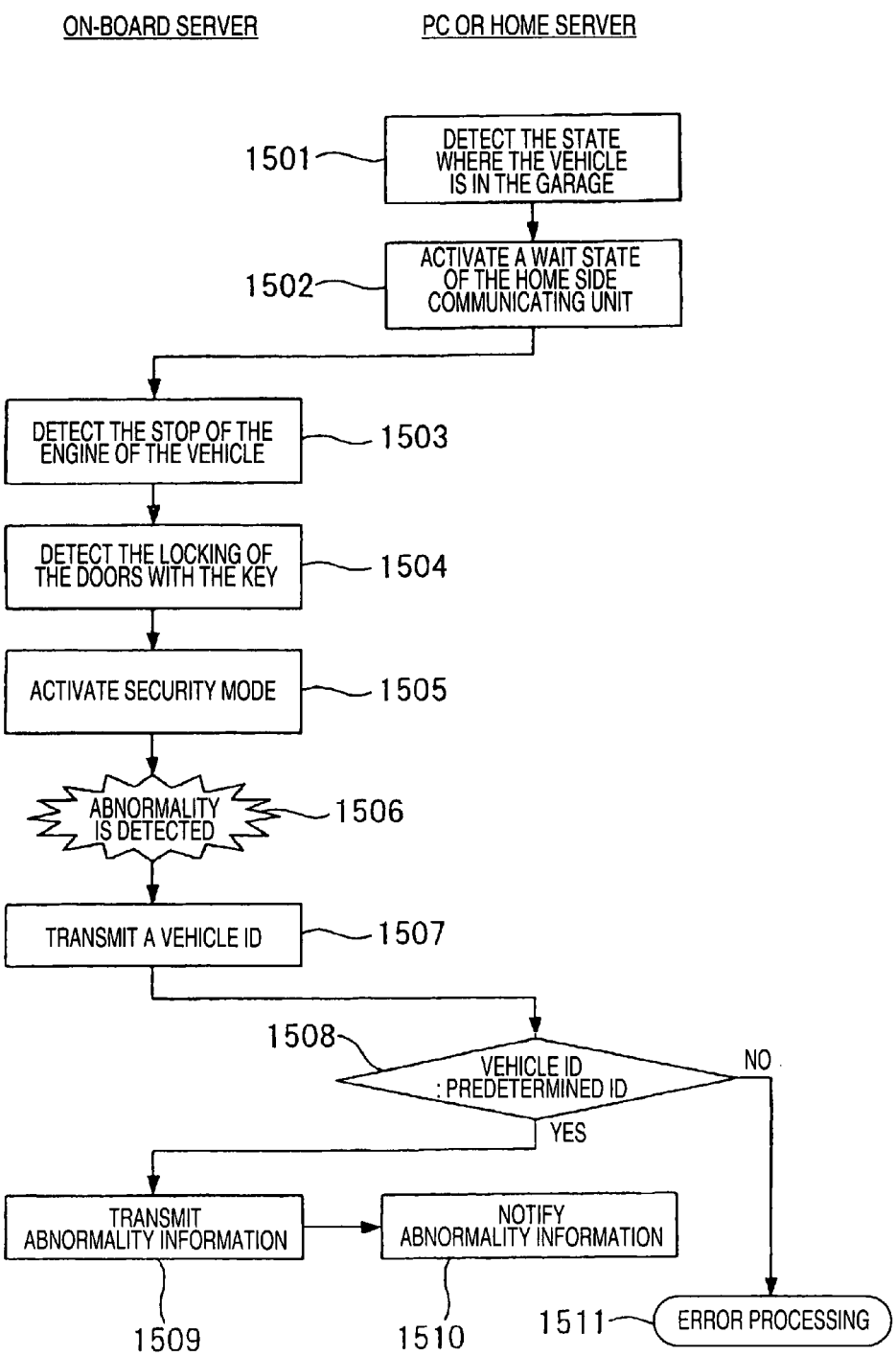
FIG. 15 is a flowchart illustrating an example of activation from the vehicle side under remote supervision in the wireless communication, which explains the third embodiment of the invention.

FIG. 15 is a flowchart illustrating, in particular, another example of a request (mainly for uploading) from the vehicle side where the remote supervision is carried out when the communicating means between the home and the vehicle is the wireless communication (the DSRC). In this case, firstly, whether or not the vehicle is in the garage is detected (step S1501). Next, if the entrance of the vehicle into the garage is detected, the communications base station (the communicating unit) on the home side enters the wait state, enabling communication (step S1502). Then, when the stop of the engine or the removal of the key is detected (step S1503) and the locking of the doors with the key (key locking) is detected (step S1504), the equipment inside the vehicle and the security mode of the sensor are activated (step S1505). As a trigger for initiation of communication in this state, when the sensor or the like detects abnormality (step S1506), communication is initiated, and a vehicle ID is transmitted (step S1507). Then, after an ID authentication is carried out in the PC or the home server 22 in which the transmitted vehicle ID is confirmed to coincide with the a predetermined ID (step S1508), abnormality information is transmitted (step S1509), so that the security center is notified of the abnormality (step S1510). Note that in the event that the ID of the vehicle does not coincide with the predetermined-ID, an error processing follows (step s1511). This example constitutes an example where the ID authentication is executed when a transmission is implemented for notification of abnormality when it occurs with no ID authentication implemented in advance.

In addition, although this example is an example in which steps S1501, 1502 are handled on the home side, those steps can be handled on the vehicle side. Namely, it is also possible to adopt a method in which whether or not the vehicle is in the garage is detected by the vehicle side (step S1501), and next, if the entrance of the vehicle into the garage is detected, a signal (an infrared ray) is transmitted from the vehicle side, so as to cause the communications base station (the communicating unit) on the home side to enter the wait state, whereby communication is enabled (step S1502). In this case, the detection of the entrance of the vehicle into the garage (step S1501) can also be implemented by virtue of the confirmation of the position of the vehicle by means of GPS or confirmation by the driver. Furthermore, it is anticipated that the communications base station (the communicating unit) on the home side doubles as the warning communicating unit (namely, it is still in the scope of the invention which is claimed for patent under the subject patent application even in the event that the communications base station (the communicating unit) is in the wait state at all times. In this case, steps S1501, S1502 are unnecessary).

While this example is the example where the vehicle ID is transmitted from the on-board server 13 side to the PC or the home server 22 in step S1507, and after the vehicle ID is authenticated in step S1508, the abnormality information is transmitted from the on-board server 13 side to the PC or the home server 22 in step S1509, so that the communication of the abnormality information is executed in step S1510, an example can also easily be surmised in which the abnormality information and the vehicle ID are transmitted altogether from the on-board server 13 side to the PC or the home server 22, and after the vehicle ID is authenticated, the abnormality is notified.

[When the Security Mode is Activated from the Home Side or the Center Side]

When the vehicle is parked in the garage 25 (the specific parking position), in response to a request from the home 20 side or the security center 40 side, information such as information from the various sensors of the body system, the engine system and the like of the vehicle 10, information from the various pieces of on-board equipment such as a supervisory image and the like are collected, and the information so collected is uploaded to the home security network (by way of the home network 21) within the home 20 via the DSRC base station 23, so as to be made use of for remote supervision from the home 20 side or the security network 40 side (there may be a case where the home network 21 doubles as the home security network). In addition, when abnormality is detected on the vehicle 10 side, the collected information is uploaded to the home security network (by way of the home network 21).

In addition, there may occur a case where in the event that abnormality occurs further on the vehicle 10 side, a control signal which signal warning, key locking or the like is sent to the vehicle 10 side from the security center 40 side or the home 20 side by way of the home security network (the home network 21).

In addition, the remote supervision from the home 20 side may entrain a case where the information collected from the vehicle 10 side is uploaded to the PC or the home server 22 on the home network 21, so as to execute security abnormality detection software on the PC or the home server 22.

In these cases, an uploading timing will be described in detail below using FIG. 16.

Figure 16:
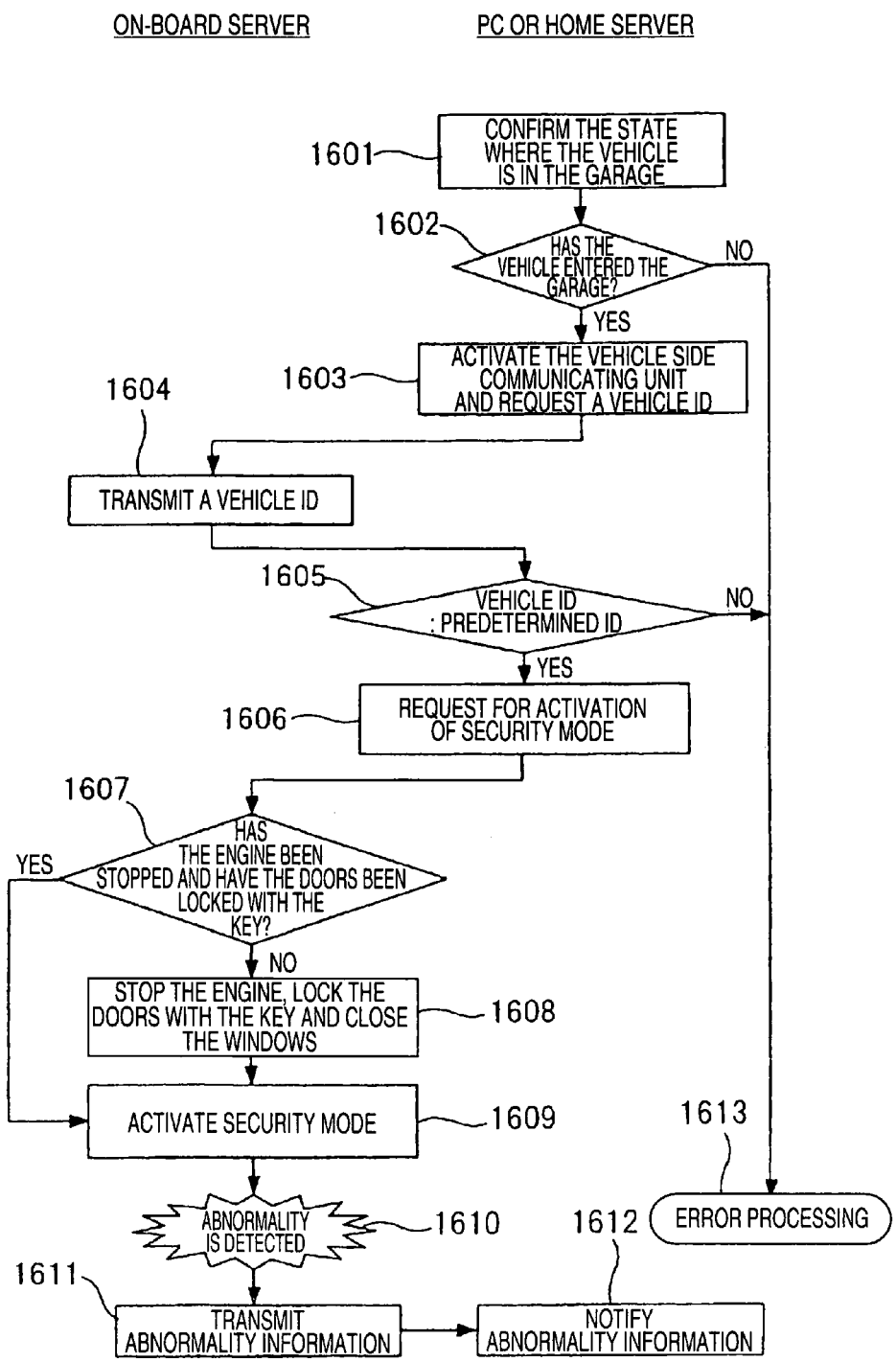
FIG. 16 is a flowchart illustrating an example of activation from the home side under remote supervision in the wireless communication, which explains the third embodiment of the invention.

FIG. 16 is a flowchart illustrating, in particular, an example of a request (mainly for uploading) from the vehicle side where the remote supervision is carried out when the communicating means between the home and the vehicle is the wireless communication (the DSRC). Firstly, whether or not the vehicle is in the garage is detected (step S1601). Next, if the entrance of the vehicle into the garage is detected (step S1602), the communications base station (the communicating unit) on the home side enters the wait state, and a request for a vehicle ID is made to the vehicle side (step S1603). In this state, the initiation of communication is triggered by a manual operation from the PC or the home server 22 or a reserved time for communication set in the PC or the home server 22 (the reserved time may be set as desired or periodically). When communication is started up, the on-board server 13 transmits a vehicle ID (step S1604), and an ID authentication is carried out in the PC or the home server 22 in which the transmitted vehicle ID is confirmed to coincide with the a predetermined ID (step s1605), a request for activation of the security mode being made (step S1606). When the stop of the engine or the locking of the doors with the key (key locking) is detected (step S1607), the equipment within the vehicle and the security mode of the sensor are activated (step S1609). In addition, in the event that the stop of the engine or the locking of the doors with the key (key locking) is not detected, the engine is stopped, the doors are locked with the key, and windows of the vehicle are closed (step S1608), whereby the security mode is activated (step S1609). Next, polling is implemented at intervals of a constant period of time from the PC or the home server 22 side, and when the sensor or the like detects abnormality during the polling (step S1610), abnormality information is transmitted (step S1611), so that the security center is notified of the abnormality (step S1612). Note that in the event that the ID of the vehicle does not coincide with the predetermined ID, an error processing follows (step s1613).

In this example, while the authentication of the ID in step S1605 is made to constitute part of the flow, it is considered that there is no authentication. In addition, an infrared sensor or a weighing scale for the vehicle can be considered to be used to detect the entrance of the vehicle into the garage in step S1601. In addition, it is possible to adopt a method in which after the entrance of the vehicle into the garage is confirmed once, the state of the vehicle is supervised in the PC or the home server 22, so that the state of the garage is confirmed using the supervisory information. In addition, as the periodical setting of the reservation for communication, there are also methods in which (1) communication is started up at a set time every day, (2) communication is started up at a set time on a set day of the week every week, and (3) communication is started up at a set time on a set day every month. In addition, the communication does not have to be executed only by the PC or the home server 22, and it is considered that direct polling is executed from the security center.

According to this embodiment, since the communication is implemented at the specific parking position such as the garage 25 of the residential place of the user where the vehicle is parked for a long period of time, there is no limitation on communication time, and bulk communication becomes possible. In addition, since the communication is implemented within a specifically limited range such as inside the garage by means of the DSRC communication or the communication is initiated when the ID of the vehicle is detected to coincide with the predetermined ID, not only the confidentiality of communication can be secured but also the security can be strengthened. In addition, the communications system can be configured by utilizing the existing infrastructure such as the home network 21, the initial cost and the running cost can be reduced, and the wasteful movement of the vehicle for inspection or the like can be eliminated.

Figure 17:
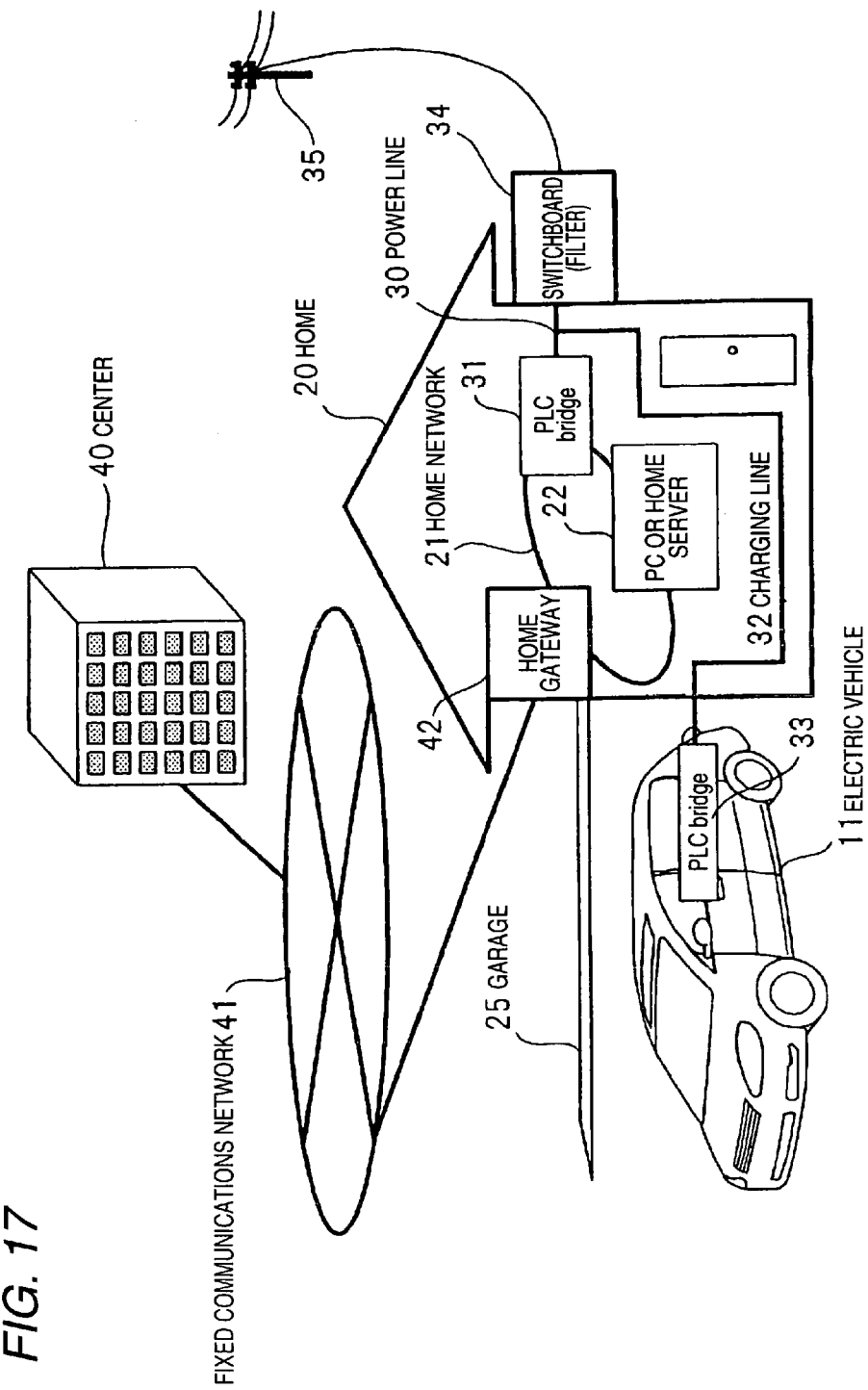
FIG. 17 is a diagram showing a schematic configuration of a communications system between a vehicle and a home, which explains a fourth embodiment of the invention.

FIG. 17 is a diagram showing a schematic configuration of a communications system between a vehicle, a home and a center, which explains a fourth embodiment of the invention. This embodiment constitutes a communications system in which a home network 21 linked to a plurality of pieces of equipment and an electric vehicle 11 parked in a garage 25 (a parking place) are connected to each other by means of a power supply line (a power line 30, a charging line 32), and the home network 21 is connected to a third party's center 40 (a car manufacturer, a car dealer, an on-board equipment manufacturer, a security center and the like) through a gateway 42 and by way of a fixed communications network 41. Note that the home network 21 is not limited to what is shown in FIG. 17 and there may occur a case where the home network 21 is configured by power lines. Furthermore, it is considered that a PC or a home server 22 is connected directly to a public line (the fixed communications network 41) without the home network 21 and the gateway 42 being interposed therebetween.

In addition, as the fixed communications network 41, there are a telephone network, a power network, a cable TV network, a governmental or municipal network (a private line), a satellite communications network and the like. Firstly, a case will be described where a map, various information on sightseeing or service and maintenance of equipment of the vehicle and software or contents on the maintenance of the vehicle are downloaded to on-board equipment or various pieces of equipment (an on-board server and the like) of the electric vehicle 11 from the third party's center 40 by way of the home network 21 and equipment (the PC or the home server 22) connected thereto. A communicating means between the home 20 and the electric vehicle 11 is made up of a PLC bridge 31 provided at a home 20 end of the charging line 32 and a PLC bridge 33 provided on an electric vehicle 11 end of the charging line 32. In this case, there are operations that are carried out from the on-board equipment side and the in-home equipment side.

[When Information Distributed to the Home Side is Downloaded in Response to a Request from the Vehicle Side]

Information (various information, software, contents, maintenance software and the like) that is to be downloaded from the third party's center 40 is distributed in advance to a storage unit 24 of the PC or the home server 22 by way of the fixed communications network 41, and when the electric vehicle 11 is parked in the garage 25 (a specific parking position) and a plug of the charging line is inserted, the information so distributed is downloaded in response to a request from the electric vehicle 11 side. In this case, the information that is to be downloaded from the third party's center 40 has information on a final distribution destination (the equipment on the home side 20, the equipment on the electric vehicle 11 side or the like).

In addition, there may be a case where the information (various information, software, contents, maintenance software and the like) that is to be downloaded from the third party's center 40 is downloaded to the storage unit 24 of the PC or the home server 22 on the home side in response to a request therefrom, instead of distributing the information to the storage unit 24 of the PC or the home server 22.

[When Downloading from the Center is Implemented Directly to the Vehicle Side]

When the electric vehicle 11 is parked in the garage 25 (the specific parking position) and the plug of the charging line is inserted, information (various information, software, contents, maintenance software and the like) that is to be downloaded to the electric vehicle 11 from the third party's center 40 is downloaded to the on-board equipment by way of the home network 21 (to which the PC or the home server 22 or the like are connected), the fixed communications network 41 from the on-board equipment of the electric vehicle 11.

In these cases, a downloading timing is similar to the downloading timing described in the second embodiment by reference to FIG. 10.

[When Information that is Distributed to the Home Side is Downloaded in Response to a Request from the Home Side]

Information (various information, software, contents, maintenance software and the like) that is to be downloaded from the third party's center 40 is distributed in advance to a storage unit 24 of the PC or the home server 22 by way of the fixed communications network 41, and when the electric vehicle 11 is parked in the garage 25 (the specific parking position) and the plug of the charging line is inserted, the information so distributed is downloaded from the PC or the home server 22 to the on-board equipment (in response to a request from the home 20 side). In this case, too, the information that is to be downloaded from the third party's center 40 has information on the final distribution destination (the equipment on the home side 20, the equipment on the electric vehicle 11 side or the like).

In addition, there may be a case where the information (various information, software, contents, maintenance software and the like) that is to be downloaded from the third party's center 40 is downloaded to the storage unit 24 of the PC or the home server 22 on the home side in response to a request therefrom, instead of distributing the information to the storage unit 24 of the PC or the home server 22.

[When Downloading is Implemented from the Center Directly to the Vehicle Side]

When the electric vehicle 11 is parked in the garage 25 (the specific parking position) and the plug of the charging line is inserted, information (various information, software, contents, maintenance software and the like) that is to be downloaded from the third party's center 40 is distributed to the equipment on the electric vehicle 11 side by way of the fixed communications network 41 and by way of the home network 21 (to which the PC or the home server 22 or the like is connected and). In this case, too, the information that is to be downloaded from the third party's center 40 has information having a final distribution destination (the equipment on the home side 20, the equipment on the electric vehicle 11 side, or the like).

In these cases, a downloading timing is similar to the download timing described in the second embodiment by reference to FIG. 12.

Next, a case will be described where information on the running condition, fuel, failure, warning of the electric vehicle 11, or failure/in-use condition of equipment, information sent from various sensors and the like are uploaded from the on-board equipment or various pieces of equipment (the on-board server or the lie) of the electric vehicle 11 to the third party's center 40 (a car manufacturer, a car dealer, an on-board equipment manufacturer, a security center or the like) by way of the home network 21 and the equipment (the PC or the home server or the like) connected thereto. In this case, too, there are operations that are carried out from the on-board equipment side and the in-home equipment side.

[When Information is Uploaded Temporarily from the Vehicle Side to the Home Side and is then Uploaded to the Center in Response to a Request from the Center Side for Inspection of the Vehicle]

Information when the vehicle is running, information from various sensors of a body system, an engine system and the like of the vehicle, information on various pieces of equipment installed on the vehicle and the like are collected by the on-board equipment on the electric vehicle 11 side so as to be stored in a storage unit 14, and when the electric vehicle 11 is parked in the garage 25 (the specific parking position) and the plug of the charging line is inserted, the information stored in the storage unit 14 of the on-board equipment is uploaded to the equipment (the PC or the home server 22 or the like) on the home network 21 within the home 20 from the electric vehicle 11 side, so as to store the information so uploaded in the storage unit 24 on the home side 20. Then, the information stored in the storage unit 24 on the home side 20 is uploaded to the third party's center 40 by way of the fixed communications network 41 in response to a request from the third party's center 40. Then, vehicle inspection software in a processing unit of the third party's center 40 is executed from the various information of the electric vehicle 11 which is stored in a storage unit of the third party's center 40 for inspection of the electric vehicle 11.

[When Information is Uploaded Temporarily from the Vehicle Side to the Home Side and a Vehicle Inspection is Carried Out on the Center Side in Response to a Request from the Home Side]

Information when the vehicle is running, information from the various sensors of the body system, the engine system and the like of the vehicle, information on the various pieces of equipment installed on the vehicle and the like are collected by the on-board equipment on the electric vehicle 11 side so as to be stored in the storage unit 14, and when the vehicle 10 is parked in the garage 25 (the specific parking position) and the plug of the charging line is inserted, the information stored in the storage unit 14 of the on-board equipment of the electric vehicle 11 is uploaded to the equipment (the PC or the home server 22 or the like) on the home network 21 within the home 20 from the electric vehicle 11 side, so as to store the information so uploaded in the storage unit 24 on the home side 20. Then, the information stored in the storage unit 24 on the home side 20 is uploaded from the equipment (the PC or the home server 22 or the like) on the home network 21 to the third party's center 40 by way of the fixed communications network 41. Then, the vehicle inspection software in the processing unit of the third party's center 40 is executed from the various information of the electric vehicle 11 which is stored in the storage unit of the third party's center 40 for inspection of the electric vehicle 11.

[When the Result of the Vehicle Inspection Carried Out by Uploading the Information from the Vehicle Side to the Home Side is Uploaded to the Center Side]

Information when the vehicle is running, information from the various sensors of the body system, the engine system and the like of the vehicle, information on the various pieces of equipment installed on the vehicle and the like are collected by the on-board equipment on the electric vehicle 11 side so as to be stored in the storage unit 14, and when the electric vehicle 11 is parked in the garage 25 (the specific parking position) and the plug of the charging line is inserted, the information stored in the storage unit 14 of the on-board equipment of the electric vehicle 11 is uploaded to the equipment (the PC or the home server 22 or the like) on the home network 21 within the home 20 from the electric vehicle 11 side, so as to store the information so uploaded in the storage unit 24 on the home side 20. Then, vehicle inspection software on the PC or the home server 22 is executed from the various information on the electric vehicle 11 which is stored in the storage unit 24 for inspection of the electric vehicle 11, and the result of the inspection is then uploaded to the third party's center 40 from the equipment (the PC or the home server 22 or the like) on the home network 21 by way of the fixed communications network 41.

[When Direct Uploading to the Center is Implemented from the Vehicle Side for Inspection of the Vehicle]

When the electric vehicle 11 is parked in the garage 25 (the specific parking position) and the plug of the charging line is inserted, information when the vehicle is running, information from the various sensors of the body system, the engine system and the like of the vehicle, information on the various pieces of equipment installed on the vehicle and the like are uploaded to the third party's center 40 from the on-board equipment of the electric vehicle 11 side by way of the fixed communications network 41 and the home network 21 (to which the PC or the home server 22 or the like is connected) within the home 20. Then, the vehicle inspection software is executed in the processing unit of the third party's center 40 from the various information on the electric vehicle 11 which is stored in the storage unit of the third party's center 40 for inspection of the electric vehicle 11.

In addition, there may occur a case where the result of the inspection is confirmed further from the on-board equipment side in response to a request from the electric vehicle 11 parked in the garage 25 (the specific parking position).

In these cases, an upload timing is similar to the upload timing described in the second embodiment by reference to FIG. 9.

[When the Information Temporarily Uploaded in Response to the Request from the Home Side is Uploaded in Response to a Request from the Center Side for Inspection of the Vehicle]

Information when the vehicle is running, information from the various sensors of the body system, the engine system and the like of the vehicle, information on the various pieces of equipment installed on the vehicle and the like are collected by the on-board equipment on the electric vehicle 11 side so as to be stored in the storage unit 14, and when the electric vehicle 11 is parked in the garage 25 (the specific parking position) and the plug of the charging line is inserted, the information stored in the storage unit 14 of the on-board equipment of the electric vehicle 11 is uploaded to the equipment (the PC or the home server 22 or the like) on the home network 21 within the home 20 in response to a request from the home 20 side, so as to store the information so uploaded in the storage unit 24 on the home side 20. Then, the information stored in the storage unit 24 on the home side 20 is uploaded to the third party's center 40 by way of the fixed communications network 41 in response to a request from the third party's center 40. Then, the vehicle inspection software in the processing unit of the third party's center 40 is executed from the various information on the electric vehicle 11 which is stored in the storage unit of the third party's center 40 for inspection of the electric vehicle 11.

[When Information is Uploaded in Response to a Request from the Home Side for Inspection of the Vehicle on the Center Side]

Information when the vehicle is running, information from the various sensors of the body system, the engine system and the like of the vehicle, information on the various pieces of equipment installed on the vehicle and the like are collected by the on-board equipment on the electric vehicle 11 side so as to be stored in the storage unit 14, and when the electric vehicle 11 is parked in the garage 25 (the specific parking position) and the plug of the charging line is inserted, the information stored in the storage unit 14 of the on-board equipment of the electric vehicle 11 is uploaded to the equipment (the PC or the home server 22 or the like) on the home network 21 within the home 20 in response to a request from the home 20 side, so as to store the information so uploaded in the storage unit 24 on the home side 20. Then, the information stored in the storage unit 24 on the home side 20 is uploaded from the equipment (the PC or the home server 22 or the like) on the home network 21 to the third party's center 40 by way of the fixed communications network 41. Then, the vehicle inspection software in the processing unit of the third party's center 40 is executed from the various information on the electric vehicle 11 which is stored in the storage unit of the third party's center 40 for inspection of the electric vehicle 11.

[When the Result of the Vehicle Inspection Carried Out by Uploading the Information from the Vehicle Side in Response to the Request from the Home Side is Uploaded to the Center Side]

Information when the vehicle is running, information from the various sensors of the body system, the engine system and the like of the vehicle, information on the various pieces of equipment installed on the vehicle and the like are collected by the on-board equipment on the electric vehicle 11 side so as to be stored in the storage unit 14, and when the electric vehicle 11 is parked in the garage 25 (the specific parking position) and the plug of the charging line is inserted, the information stored in the storage unit 14 of the on-board equipment of the electric vehicle 11 is uploaded to the equipment (the PC or the home server 22 or the like) on the home network 21 within the home 20 in response to a request from the home 21 side, so as to store the information so uploaded in the storage unit 24 on the home side 20. Then, the vehicle inspection software on the PC or the home server 22 is executed from the various information on the electric vehicle 11 stored in the storage unit 24 for inspection of the electric vehicle 11, and the result of the inspection is uploaded to the third party's center 40 from the PC or the home server 22 on the home network 21 by way of the fixed communications network 41.

[When Direct Uploading is Implemented in Response to a Request from the Center Side for Inspection of the Vehicle 10]

When the electric vehicle 11 is parked in the garage 25 (the specific parking position) and the plug of the charging line is inserted, information when the electric vehicle 11 is running, information from the various sensors of the body system, the engine system and the like of the vehicle, information on the various pieces of equipment installed on the vehicle and the like are uploaded to the third party's center 40 by way of the fixed communications network 41 and the home network 21 (to which the PC or the home server 22 is connected) within the home 20 in response to a request from the third party's center 40. Then, the vehicle inspection software is executed in the processing unit of the third party's center 40 from the various information on the electric vehicle 11 which is stored in the storage unit of the third party's center 40 for inspection of the electric vehicle 11.

In these cases, an upload timing is similar to the uploading timing described in the second embodiment by reference to FIG. 11.

Next, by reference to FIG. 17 a communications system will be described in which the electric vehicle 11 parked in the garage 25 (the parking place) is connected by means of the charging line 32 by way of the home network 21 which is linked to the home security network directly or via a plurality of pieces of equipment, whereby information from the on-board equipment or the various sensors is uploaded to the home security network by way of the home network 21 and the equipment (the PC or the home server 22 or the like) connected thereto.

[When a Security Mode is Activated from the Vehicle Side]

When the electric vehicle 11 is parked in the garage 25 (the specific parking position) and the plug of the charging line 32 is inserted, information such as information from the various sensors of the body system, the engine system and the like of the electric vehicle 11, information from the various pieces of on-board equipment such as a supervisory image and the like are collected, and the information so collected is uploaded to the home security network (by way of the home network 21) within the home 20 from the electric vehicle 11 side, so as to be made use of for remote supervision from the home 20 side or the security network 40 side. Alternatively, when abnormality is detected on the electric vehicle 11 side, the collected information is uploaded to the home security network (by way of the home network 21).

In addition, there may occur a case where in the event that abnormality occurs further on the electric vehicle 11 side, a control signal which signal warning, key locking or the like is sent to the electric vehicle 11 side from the security center 40 side or the home 20 side by way of the home security network (the home network 21).

In addition, the remote supervision from the home 20 side may entrain a case where the information collected from the electric vehicle 11 side is uploaded to the PC or the home server 22 on the home network 21 within the home 20, so as to execute security abnormality detection software on the PC or the home server 22.

In these cases, an uploading timing will be described in detail below using FIG. 18 or FIG. 19.

Figure 18:
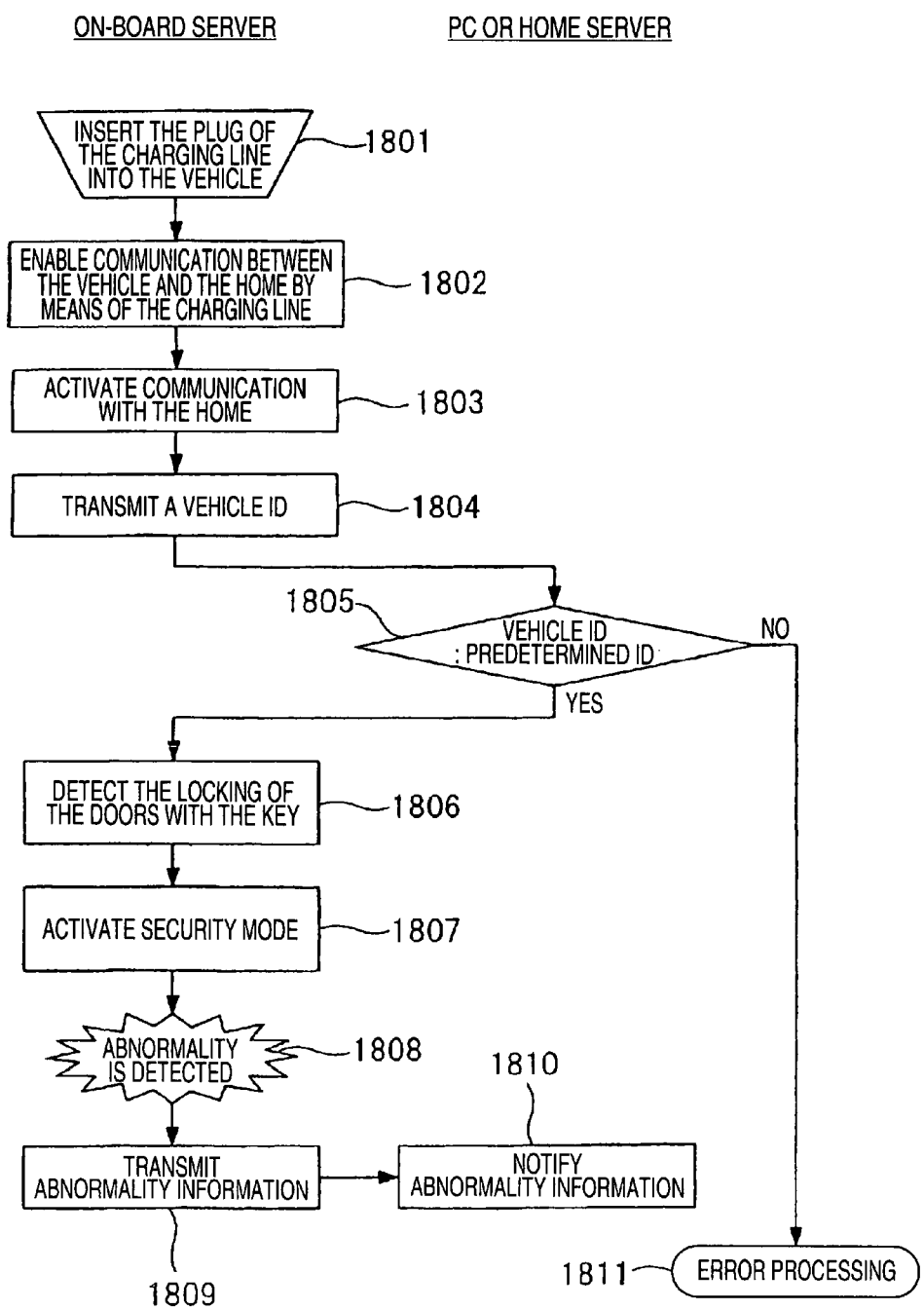
FIG. 18 is a flowchart illustrating an example of activation from the home side under remote supervision in a charging line, which explains the fourth embodiment of the invention.

FIG. 18 is a flowchart illustrating, in particular, an example of a request (mainly for uploading) from the vehicle side where the remote supervision is carried out when the communicating means between the home and the vehicle is the charging line. Firstly, when the vehicle enters the garage and the plug of the charging line 32 is inserted (step S1801), a state results where communication is enabled (step S180). The initiation of communication in this state is triggered by detection of a manual operation within the vehicle or the stop of the engine or removal of the key. When communication is initiated (step S1803), the on-board server 13 transmits a vehicle ID (step S1804), and an ID authentication is carried out in the PC or the home server 22 in which the transmitted vehicle ID is confirmed to coincide with a predetermined ID (step s1805). Next, when the locking of doors of the vehicle with a key thereto (key locking) is detected (step S1806), the equipment within the vehicle and a security mode of a sensor are activated (step S1807). Then, when the sensor or the like detects abnormality (step S1808), abnormality information is transmitted (step S1809), so that the security center is notified of the abnormality (step S1810). Note that in the event that the ID of the vehicle does not coincide with the predetermined ID, an error processing follows (step S1811). In this example, while the authentication of the ID in step S1805 is made to constitute part of the flow, it is considered that there is no authentication. In addition, the removal of the key to the doors to lock the doors is considered as the trigger. Alternatively, although there may occur a case where the manual operation in the vehicle is executed before the plug of the charging line 32 is inserted, this can easily be anticipated.

Figure 19:
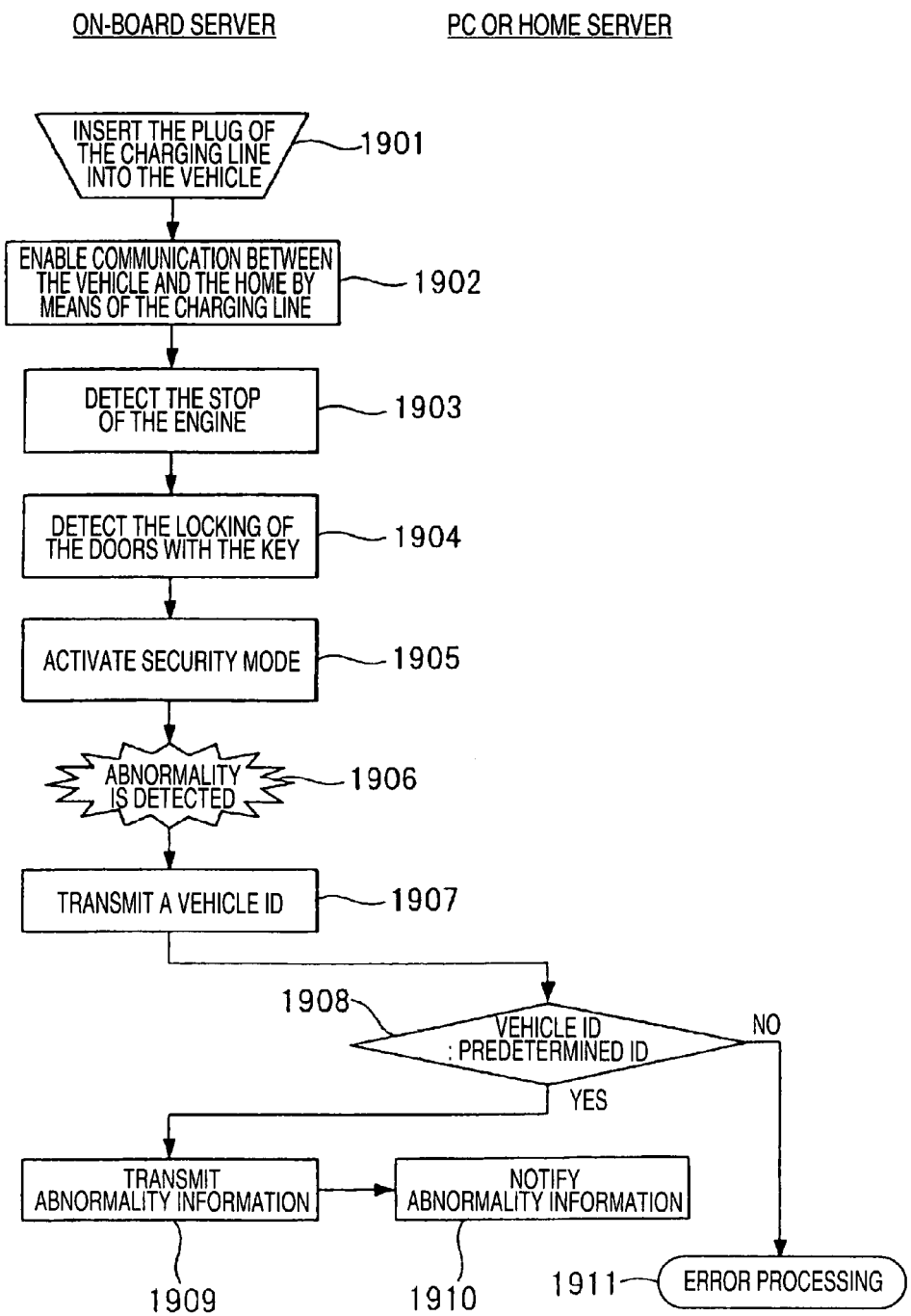
FIG. 19 is a flowchart illustrating an example of activation from the home side under remote supervision in the charging line, which explains the fourth embodiment of the invention.

FIG. 19 is a flowchart illustrating, in particular, another example of a request (mainly for uploading) from the vehicle side where the remote supervision is carried out when the communicating means between the home and the vehicle is the charging line. Firstly, when the vehicle enters the garage and the plug of the charging line 32 is inserted (step S1901), a state results where communication is enabled (step S1902). Next, the stop of the engine or the removal of the key is detected (step S1903). Then, when the locking of the doors with the key thereto is detected (key locking) (step S1904), the equipment inside the vehicle and the security mode of the sensor are activated (step S1905). When the sensor or the like detects abnormality (step S1906), a vehicle ID is transmitted (step S1507), after an ID authentication is carried out in the PC or the home server 22 in which the transmitted vehicle ID is confirmed to coincide with the a predetermined ID (step S1908), abnormality information is transmitted (step S1909), so that the security center is notified of the abnormality (step S1910). Note that in the event that the ID of the vehicle does not coincide with the predetermined ID, an error processing follows (step s1911). This example constitutes an example where the ID authentication is executed when a transmission is implemented for notification of abnormality when it occurs with no ID authentication implemented in advance.

While this example is the example where the vehicle ID is transmitted from the on-board server 13 side to the PC or the home server 22 in step S1907, and after the vehicle ID is authenticated in step S1908, the abnormality information is transmitted from the on-board server 13 side to the PC or the home server 22 in step S1909, so that the communication of the abnormality information is executed in step S1910, an example can also easily be surmised in which the abnormality information and the vehicle ID are transmitted altogether from the on-board server 13 side to the PC or the home server 22, and after the vehicle ID is authenticated, the abnormality is notified.

[When the Security Mode is Activated from the Home Side or the Center Side]

When the electric vehicle 11 is parked in the garage 25 (the specific parking position) and the plug of the charging line 32 is inserted, in response to a request from the home 20 side or the security center 40 side, information such as information from the various sensors of the body system, the engine system and the like of the electric vehicle 11, information from the various pieces of on-board equipment such as a supervisory image and the like are collected, and the information so collected is uploaded to the home security network (by way of the home network 21) within the home 20, so as to be made use of for remote supervision from the home 20 side or the security network 40 side. In addition, when abnormality is detected on the electric vehicle 11 side, the collected information is uploaded to the home security network (by way of the home network 21).

In addition, there may occur a case where in the event that abnormality occurs further on the electric vehicle 11 side, a control signal which signal warning, key locking or the like is sent to the electric vehicle 11 side from the security center 40 side or the home 20 side by way of the home security network (the home network 21).

In addition, the remote supervision from the home 20 side may entrain a case where the information collected from the electric vehicle 11 side is uploaded to the PC or the home server 22 on the home network 21, so as to execute security abnormality detection software on the PC or the home server 22.

In these cases, an uploading timing will be described in detail below using FIG. 20.

Figure 20:
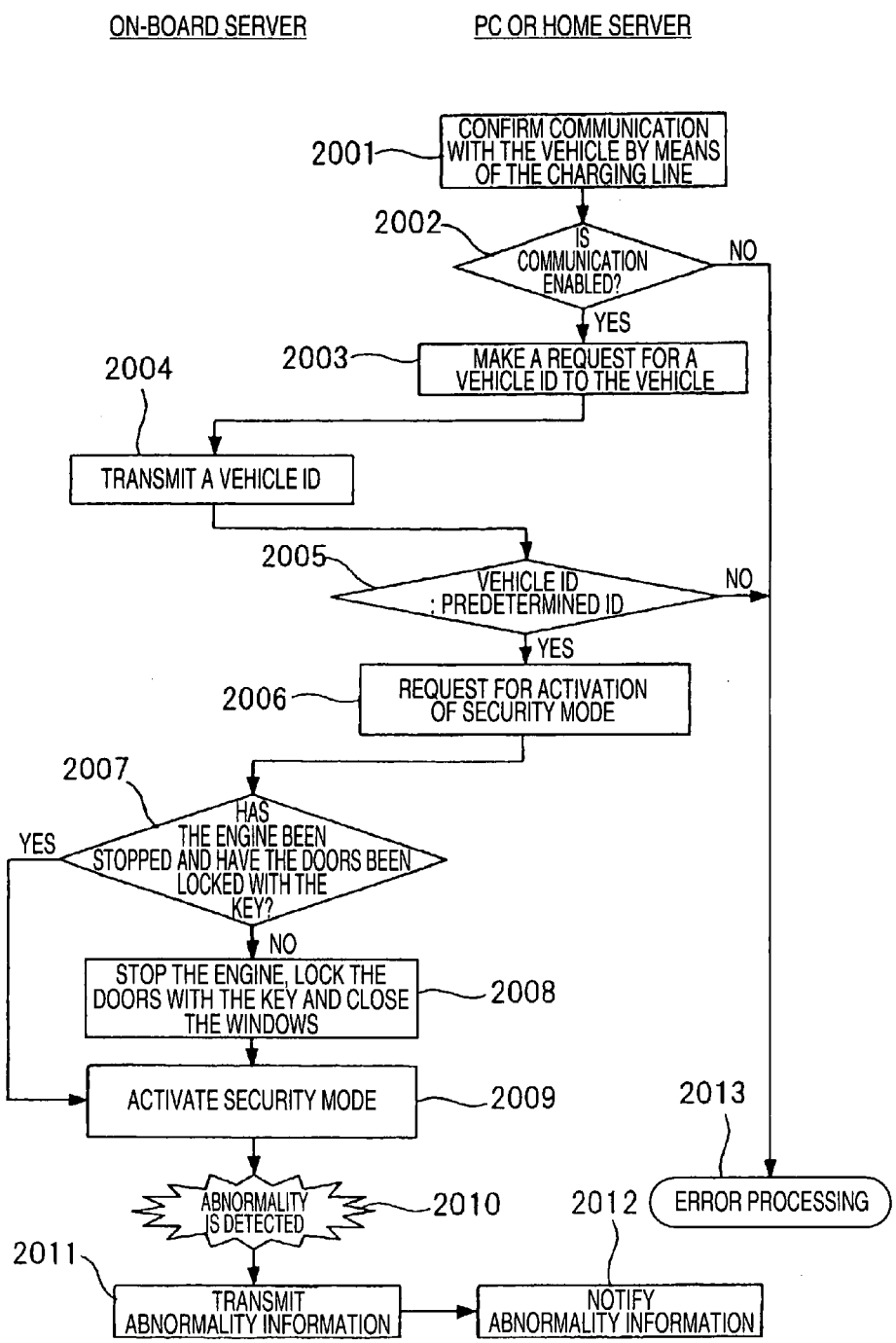
FIG. 20 is a flowchart illustrating an example of activation from the home side under remote supervision in the charging line, which explains the third embodiment of the invention.

FIG. 20 is a flowchart illustrating, in particular, an example of a request (mainly for uploading) from the home side where the remote supervision is carried out when the communicating means between the home and the vehicle is the charging line. Firstly, it is confirmed that the electric vehicle 11 is in the garage and the plug of the charging line 32 is inserted, so as to establish communication with the vehicle by means of the charging line 32 (step S2001), and whether or not the communication is enabled is determined (step S2002). In this state, the initiation of communication is triggered by a manual operation from the PC or the home server 22 or a reserved time for communication set in the PC or the home server 22 (the reserved time may be set as desired or periodically). When communication is started up, the on-board server 13 transmits a vehicle ID (step S2004), and an ID authentication is carried out in the PC or the home server 22 in which the transmitted vehicle ID is confirmed to coincide with the a predetermined ID (step S2005), a request for activation of the security mode being made (step S2006). When the stop of the engine or the locking of the doors with the key (key locking) is detected (step S2007), the equipment within the vehicle and the security mode of the sensor are activated (step S2009). Next, polling is implemented at intervals of a constant period of time from the PC or the home server 22 side, and when the sensor or the like detects abnormality during the polling (step S2010), abnormality information is transmitted (step S2011), so that the security center is notified of the abnormality (step S2012). In this example, while the authentication of the ID in step S2005 is made to constitute part of the flow, it is considered that there is no authentication. In addition, as the periodical setting of the reservation for communication, there are also methods in which (1) communication is started up at a set time every day, (2) communication is started up at a set time on a set day of the week every week, and (3) communication is started up at a set time on a set day every month. In addition, the communication does not have to be executed only by the PC or the home server 22, and it is considered that direct polling is executed from the security center.

According to this embodiment, since the communication is implemented at the specific parking position such as the garage 25 of the residential place of the user where the vehicle is parked for a long period of time, there is no limitation on communication time, and bulk communication becomes possible. In addition, since the wired communication is implemented at the specific position by means of the charging line or the communication is initiated when the ID of the vehicle is detected to coincide with the predetermined ID, the confidentiality of communication can be secured. In addition, the communications system can be configured by utilizing the existing infrastructure such as the home network 21, the initial cost and the running cost can be reduced, and the wasteful movement of the vehicle for inspection or the like can be eliminated.

Figure 21:
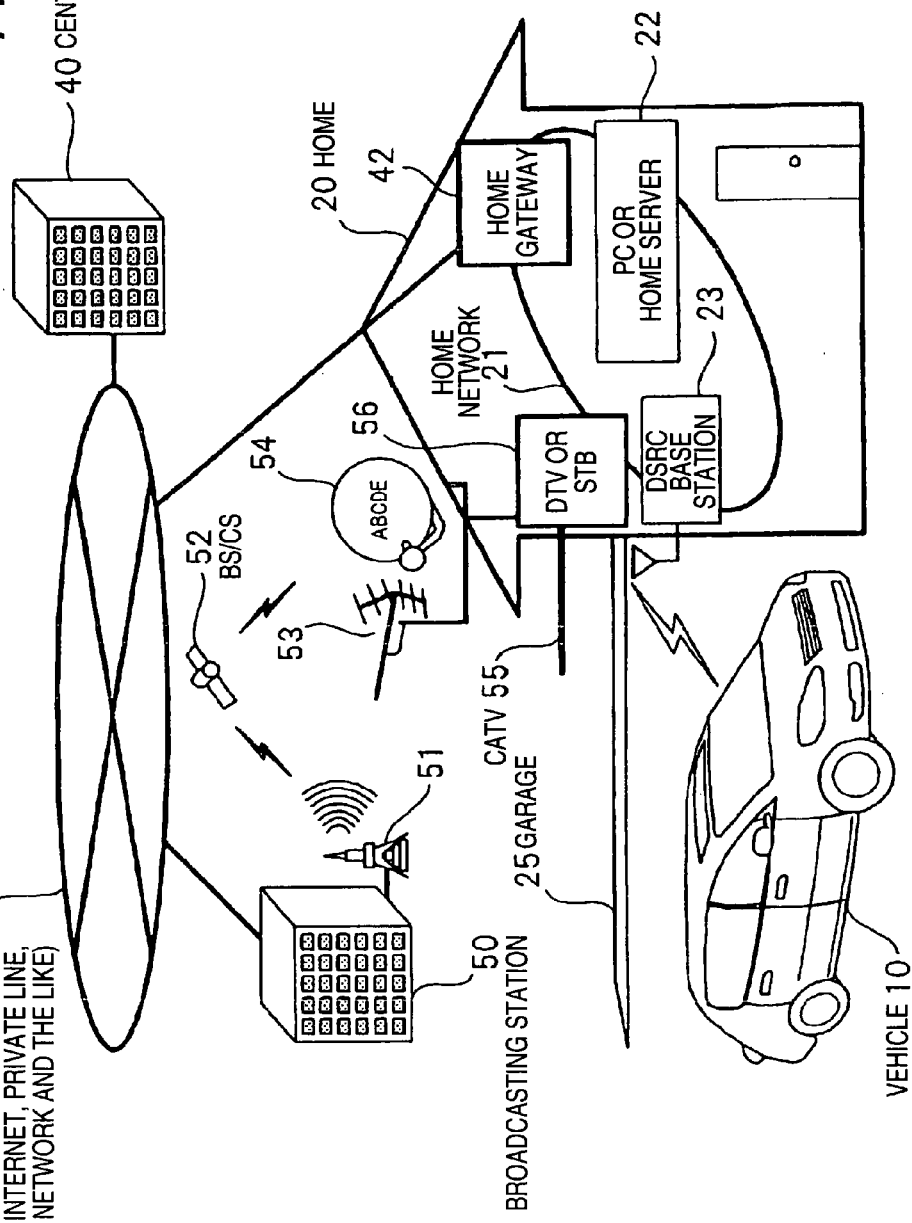
FIG. 21 is a diagram showing a schematic configuration of a communications system between a vehicle and a home, which explains a fifth embodiment of the invention.

FIG. 21 is a diagram showing a schematic configuration of a communications system between a vehicle, a home and a center, which explains a fifth embodiment of the invention. This embodiment constitutes a communications system in which a home network 21 linked to a plurality of pieces of equipment and a vehicle 10 parked in a garage 25 (a specific parking place) are connected to each other by means of a DSRC, and a DTV/STB (Digital TV/Set-top box) 56 or the like is connected to the home network 21. Note that while in this embodiment the DTV/STB 56 is illustrated as an example of a receiver unit, the system will remain the same even in the case of a digital sound broadcasting. Firstly, a case will be described where a third party (a car manufacturer, a car dealer, an on-board equipment manufacturer, a contents provider or the like) downloads a map, various information on sightseeing or service and maintenance of equipment of the vehicle and software or contents on the maintenance of the vehicle from a broadcasting (a satellite broadcasting 52 & 54, a ground wave broadcasting 51 & 53, a CATV 55 or the like) to on-board equipment or various pieces of equipment (an on-board server 13 and the like) of the vehicle 10 through the DTV/STB 56 by way of the home network 21 and equipment (a PC or a home server 22) connected thereto. A communicating means between the home 20 and the vehicle 10 is made up of a dedicated DSRC base station 23 which is placed on the home 20 side and a DSRC on-board equipment 12 which is placed on the vehicle 10 side. In this case, there are operations that are carried out from the on-board equipment side and the in-home equipment side. In this embodiment, however, while the communicating means between the vehicle and the home is the DSRC, a connection by means of a wireless LAN (for exclusive use between a home 20 and the vehicle 10) or Bluetooth or the like is possible. In addition, it can easily be surmised that the PC or the home server 22 and the DSRC base station 23 are connected by means of serial communications without being connected by way of the home network 21. While in the description of this embodiment, the description of uploading is omitted, uploading can also be implemented by utilizing a fixed communications system as with the embodiment described by reference to FIG. 13.

[When Information is Distributed to the Home Side and is Downloaded in Response to a Request from the Vehicle Side]

Information (various information, software, contents, maintenance software and the like) that is to be downloaded from a third party's center 40 is broadcast from a broadcasting station 50 by way of a fixed communications network 41 and is then distributed in advance to a storage unit 24 of the PC or the home server 22 through the DTV/STB 56 on the home network 21 by way of the satellite broadcasting 52 & 54, the ground wave broadcasting 51 & 53, the CATV 55 or the like, and when the vehicle 10 is parked in the garage 25 (the specific parking position), the information so distributed is downloaded in response to a request from the vehicle 10 side). In this case, the information that is to be downloaded from the third party's center 40 has information on a final distribution destination (the equipment on the home side 20, the equipment on the vehicle 10 side or the like).

In addition, this will be the case even when the information to be distributed is distributed not to the storage unit 24 of the PC or the home server 22 but to the DTV/STB 56.

In this case, a downloading timing will be similar to the downloading timing described in the first embodiment by reference to FIG. 5.

[When Information is Distributed to the Home Side and is then Downloaded in Response to a Request from the Home Side]

Information (various information, software, contents, maintenance software and the like) that is to be downloaded from the third party's center 40 is broadcast from the broadcasting station 50 by way of the fixed communications network 41 and is then distributed in advance to the storage unit 24 of the PC or the home server 22 through the DTV/STB 56 on the home network 21 by way of the satellite broadcasting 52 & 54, the ground wave broadcasting 51 & 53, the CATV 55 or the like, and when the vehicle 10 is parked in the garage 25 (the specific parking position), the information so distributed is downloaded to on-board equipment (in response to a request from the home 20 side) from the PC or the home server 22. In this case, the information that is to be downloaded from the third party's center 40 has information on a final distribution destination (the equipment on the home side 20, the equipment on the vehicle 10 side or the like).

In addition, this will be the case even when the information to be distributed is distributed not to the storage unit 24 of the PC or the home server 22 but to the DTV/STB 56.

[When Information is Distributed Directly to the Vehicle Side]

Information (various information, software, contents, maintenance software and the like) that is to be downloaded from the third party's center 40 is broadcast from a broadcasting station 50 by way of a fixed communications network 41 and is distributed to the equipment on the vehicle 10 side, when the vehicle 10 is parked in the garage 25 (the specific parking position), by way of the satellite broadcasting 52 & 54, the ground wave broadcasting 51 & 53, the CATV 55 or the like and by way of the equipment such as the DTV/STB 56 on the home network 21 and the PC and the home server 22. In this case, the information that is to be downloaded from the third party's center 40 has information on a final distribution destination (the equipment on the home side 20, the equipment on the vehicle 10 side or the like).

In these cases, a downloading timing will be similar to the downloading timing described in the first embodiment by reference to FIG. 7.

According to this embodiment, since the communication is implemented at the specific parking position such as the garage 25 of the residential place of the user where the vehicle is parked for a long period of time, there is no limitation on communication time, and bulk communication becomes possible. In addition, since the communication is implemented within a specifically limited range such as inside the garage by means of the DSRC communication or the communication is initiated when the ID of the vehicle is detected to coincide with the predetermined ID, the confidentiality of communication can be secured. In addition, the communications system can be configured by utilizing the existing infrastructure such as the home network 21, the initial cost and the running cost can be reduced, and the wasteful movement of the vehicle for inspection or the like can be eliminated.

Figure 22:
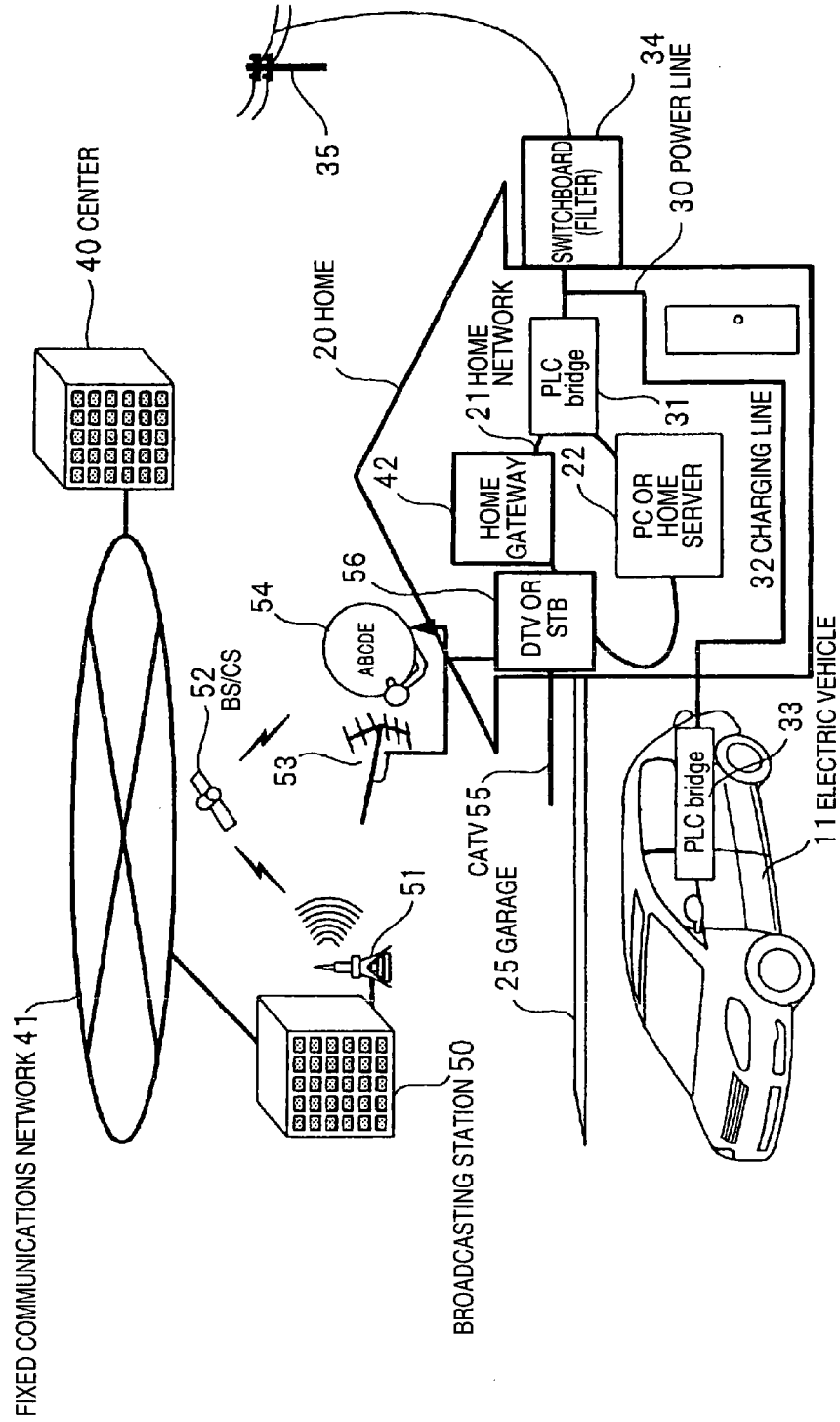
FIG. 22 is a diagram showing a schematic configuration of a communications system between a vehicle and a home, which explains a sixth embodiment of the invention.

FIG. 22 is a diagram showing a schematic configuration of a communications system between a vehicle, a home and a center, which explains a sixth embodiment of the invention. This embodiment constitutes a communications system in which a home network 21 linked to a plurality of pieces of equipment and an electric vehicle 11 parked in a garage 25 (a specific parking place) are connected to each other by means of a power supply line (a power line 30, a charging line 32), and a DTV/STB (Digital TV/Set-top box) 56 or the like is connected to the home network 21. Note that while in this embodiment the DTV/STB 56 is illustrated as an example of a receiver unit, the system will remain the same even in the case of a digital sound broadcasting. Firstly, a case will be described where a third party (a car manufacturer, a car dealer, an on-board equipment manufacturer, a contents provider or the like) downloads a map, various information on sightseeing or service and maintenance of equipment of the vehicle and software or contents on the maintenance of the vehicle from a broadcasting (a satellite broadcasting 52 & 54, a ground wave broadcasting 51 & 53, a CATV 55 or the like) to on-board equipment or various pieces of equipment (an on-board server 13 and the like) of the electric vehicle 11 through the DTV/STB 56 by way of the home network 21 and equipment (a PC or a home server 22) connected thereto. A communicating means between the home 20 and the electric vehicle 11 is made up of a PLC bridge 31 provided at a home 20 end of the charging line 32 and a PLC bridge 33 provided at an electric vehicle 11 end thereof. In this case, there are operations that are carried out from the on-board equipment side and the in-home equipment side. While in the description of this embodiment, the description of uploading is omitted, uploading can also be implemented by utilizing a fixed communications system as with the embodiment described by reference to FIG. 17.

[When Information is Distributed to the Home Side and is Downloaded in Response to a Request from the Vehicle Side]

Information (various information, software, contents, maintenance software and the like) that is to be downloaded from a third party's center 40 is broadcast from a broadcasting station 50 by way of a fixed communications network 41 and is then distributed in advance to a storage unit 24 of the PC or the home server 22 through the DTV/STB 56 on the home network 21 by way of the satellite broadcasting 52 & 54, the ground wave broadcasting 51 & 53, the CATV 55 or the like, and when the electric vehicle 11 is parked in the garage 25 (the specific parking position) and a plug of the charging line is inserted, the information so distributed is downloaded in response to a request from the electric vehicle 11 side). In this case, the information that is to be downloaded from the third party's center 40 has information on a final distribution destination (the equipment on the home side 20, the equipment on the electric vehicle 11 side or the like).

In addition, this will be the case even when the information to be distributed is distributed not to the storage unit 24 of the PC or the home server 22 but to the DTV/STB 56.

In this case, a downloading timing will be similar to the downloading timing described in the second embodiment by reference to FIG. 10.

[When Information is Distributed to the Home Side and is then Downloaded in Response to a Request from the Home Side]

Information (various information, software, contents, maintenance software and the like) that is to be downloaded from the third party's center 40 is broadcast from the broadcasting station 50 by way of the fixed communications network 41 and is then distributed in advance to the storage unit 24 of the PC or the home server 22 through the DTV/STB 56 on the home network 21 by way of the satellite broadcasting 52 & 54, the ground wave broadcasting 51 & 53, the CATV 55 or the like, and when the electric vehicle 11 is parked in the garage 25 (the specific parking position) and the plug of the charging line is inserted, the information so distributed is downloaded to on-board equipment (in response to a request from the home 20 side) from the PC or the home server 22. In this case, the information that is to be downloaded from the third party's center 40 has information on a final distribution destination (the equipment on the home side 20, the equipment on the electric vehicle 11 side or the like).

In addition, this will be the case even when the information to be distributed is distributed not to the storage unit 24 of the PC or the home server 22 but to the DTV/STB 56.

[When Information is Distributed Directly to the Vehicle Side]

Information (various information, software, contents, maintenance software and the like) that is to be downloaded from the third party's center 40 is broadcast from a broadcasting station 50 by way of a fixed communications network 41 and is distributed to the equipment on the electric vehicle 11 side, when the electric vehicle 11 is parked in the garage 25 (the specific parking position) and the plug of the charging line is inserted, by way of the satellite broadcasting 52 & 54, the ground wave broadcasting 51 & 53, the CATV 55 or the like and by way of the equipment such as the DTV/STB 56 on the home network 21 and the PC and the home server 22. In this case, the information that is to be downloaded from the third party's center 40 has information on a final distribution destination (the equipment on the home side 20, the equipment on the electric vehicle 11 side or the like).

In these cases, a downloading timing will be similar to the downloading timing described in the second embodiment by reference to FIG. 12.

According to this embodiment, since the communication is implemented at the specific parking position such as the garage 25 of the residential place of the user where the vehicle is parked for a long period of time, there is no limitation on communication time, and bulk communication becomes possible. In addition, since the wired communication is implemented in the specific position by means of the charging line or the communication is initiated when the ID of the vehicle is detected to coincide with the predetermined ID, the confidentiality of communication can be secured. In addition, the communications system can be configured by utilizing the existing infrastructure such as the home network 21, the initial cost and the running cost can be reduced, and the wasteful movement of the vehicle for inspection or the like can be eliminated.

Figure 23:
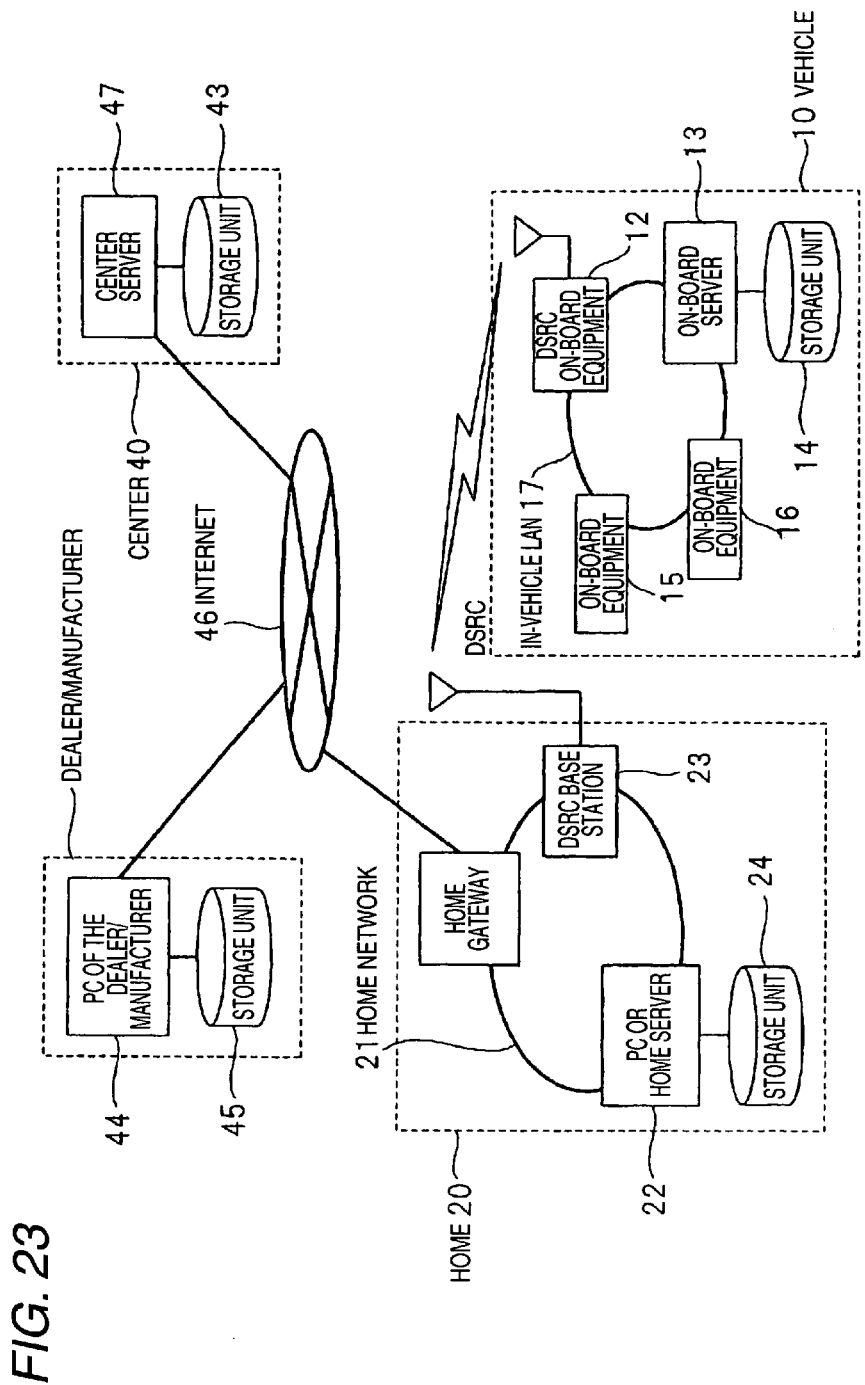
FIG. 23 is a diagram showing a schematic configuration of a communications system between a vehicle and a home, which explains a seventh embodiment of the invention.

FIG. 23 is a diagram showing a schematic configuration of a communications system between a vehicle, a home and a center, which explains a seventh embodiment of the invention. In this embodiment, an on-board server 13 of a vehicle 10, on which pieces of on-board equipment 15, 16 which are connected to each other via an in-vehicle LAN 17 are installed, includes a storage unit 14, a PC or a home server 22 of a home network 21 in a home 20 includes a storage unit 24, a center server 47 includes a storage unit 43, and a PC 44 of a dealer/manufacturer includes a storage unit 45. The on-board server 13 and the PC or the home server 22 are connected to each other via a DSRC base station 23 and DSRC on-board equipment 12, and the PC or the home server 22 and the PC 44 of the dealer/manufacturer and the center server 47 are connected via an internet 46. In this embodiment, however, while a communicating means between the vehicle and the home is the DSRC, a connection by means of a wireless LAN, Bluetooth, a power line or the like is similarly possible. In addition, a case can also be anticipated easily where the PC or the home server 22 and the DSRC base station 23 are connected by means of serial communications without being connected by way of the home network 21. Furthermore, a case is considered where the PC or the home server 22 is connected directly to a public line (a fixed communications network 41) without the home network 21 and a gateway 42 interposed therebetween, and a case is also considered where the dealer/manufacturer constitutes the center 40 or vice versa.

Communication of various information according to this embodiment will be described below using the drawings which occurs between the dealer/manufacturer and the vehicle in relation to failure diagnosis, maintenance and periodical inspection by law of the vehicle, distribution of various contents, collection of statistic data of driving, and the like.

Note that while in the following examples, one-way communications from the vehicle to the dealer/manufacturer and from the dealer/manufacturer to the vehicle will be described, a case will also be anticipated easily where a two-way or bi-directional communication is made possible by combining those one-way communications.

Figure 24:
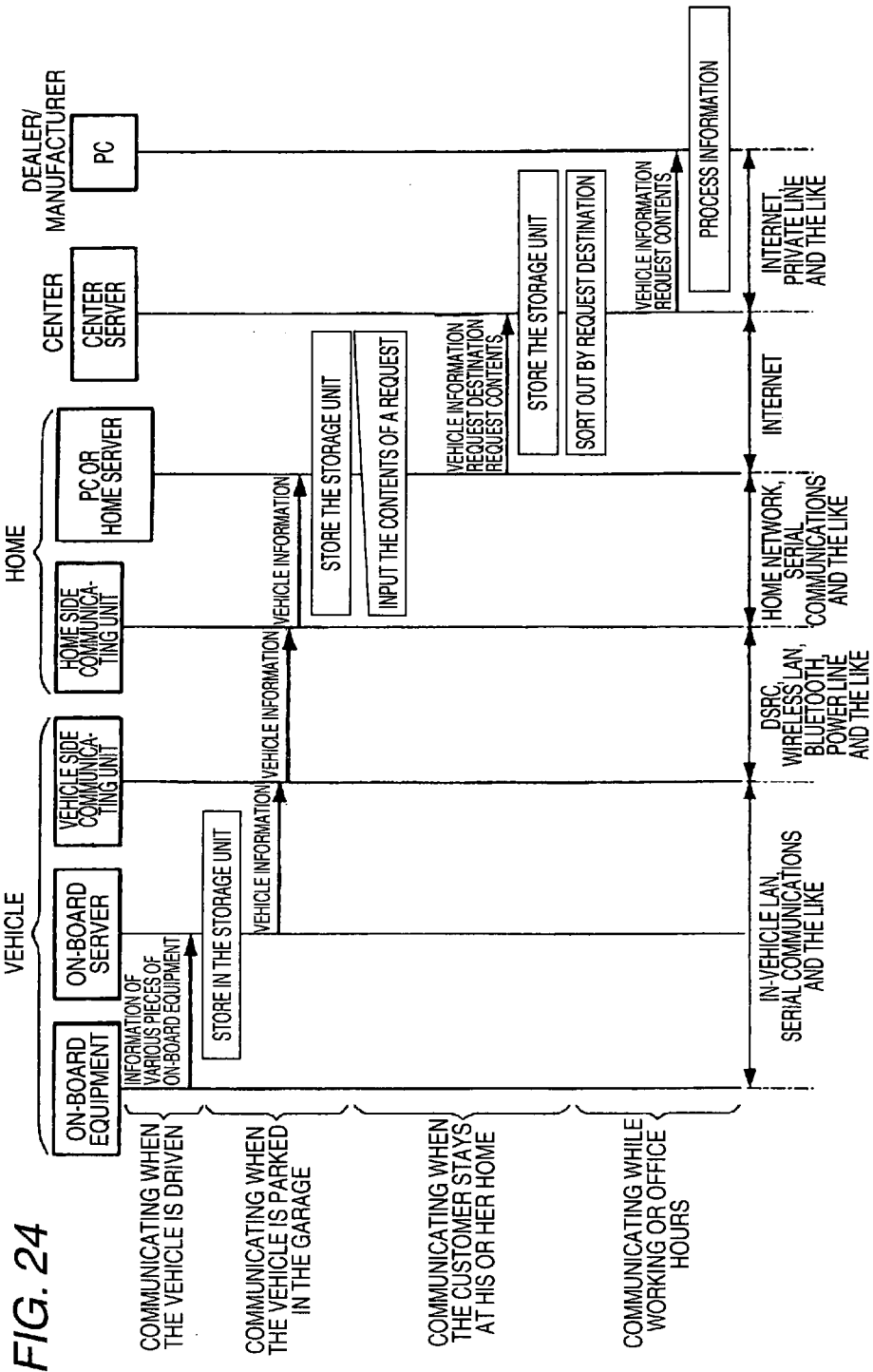
FIG. 24 is a sequence chart illustrating an example of a flow of information from the vehicle side to the center side, which explains the seventh embodiment of the invention.

FIG. 24 is a sequence diagram illustrating an example of a flow of vehicle information from the vehicle to the dealer/manufacturer in relation to the failure diagnosis, maintenance and the like of the vehicle, which is common over DSRC, wireless LAN, power line and the like when they constitute a communicating means between the home and the vehicle. As shown in FIG. 24, while the vehicle is being driven, information of the various pieces of on-board equipment is collected to the on-board server 13 by means of the in-vehicle LAN or the serial communication or the like, so as to be accumulate (stored) in the storage unit 14 of the on-board server 13. Next, when the vehicle enters the garage, communication is initiated between the home and the vehicle by any of the methods shown in FIGS. 4, 6, 9, 11 and the like, the vehicle information stored in the storage unit 14 of the on-board server 13 is transmitted to the PC or the home server 22 via a vehicle side communicating unit and a home side communicating unit while the vehicle is parked in the garage, so as to be accumulated (stored) in the storage unit 24. Next, the vehicle information stored in the storage unit 24 of the PC or the home server 22 is transmitted to the center server 47 based on the contents of a request inputted while the customer stays at his or her home or the like, so as to be accumulated (stored) in the storage unit 43 of the center server 47. Furthermore, the vehicle information stored in the storage unit 43 of the center server 47 is sorted out by destination where the request is sent, whereby the information so sorted out is then transmitted to the PC 44 of the dealer/manufacturer during their office hours, so that the information is processed based on the contents of the request, so as to be accumulated (stored) in the storage unit 45 of the PC 44 of the dealer/manufacturer. However, communication between the individual units, for example, between the pieces of on-board equipment 15, 16, and between the vehicle communicating unit and the on-board server 13, is implemented by the in-vehicle LAN, the serial communications or the like, communication between the vehicle side communicating unit and the home side communicating unit is implemented by means of the DSRC, wireless LAN, Bluetooth, power line or the like, communication between the home side communicating unit and the PC or the home server 22 is implemented by means of the home network, the serial communications or the like, communication between the PC or the home server 22 and the center server 40 is implemented by the internet, and communication between the center server 40 and the PC of the dealer/center is implemented by means of the internet, a private line or the like.

Figure 25:
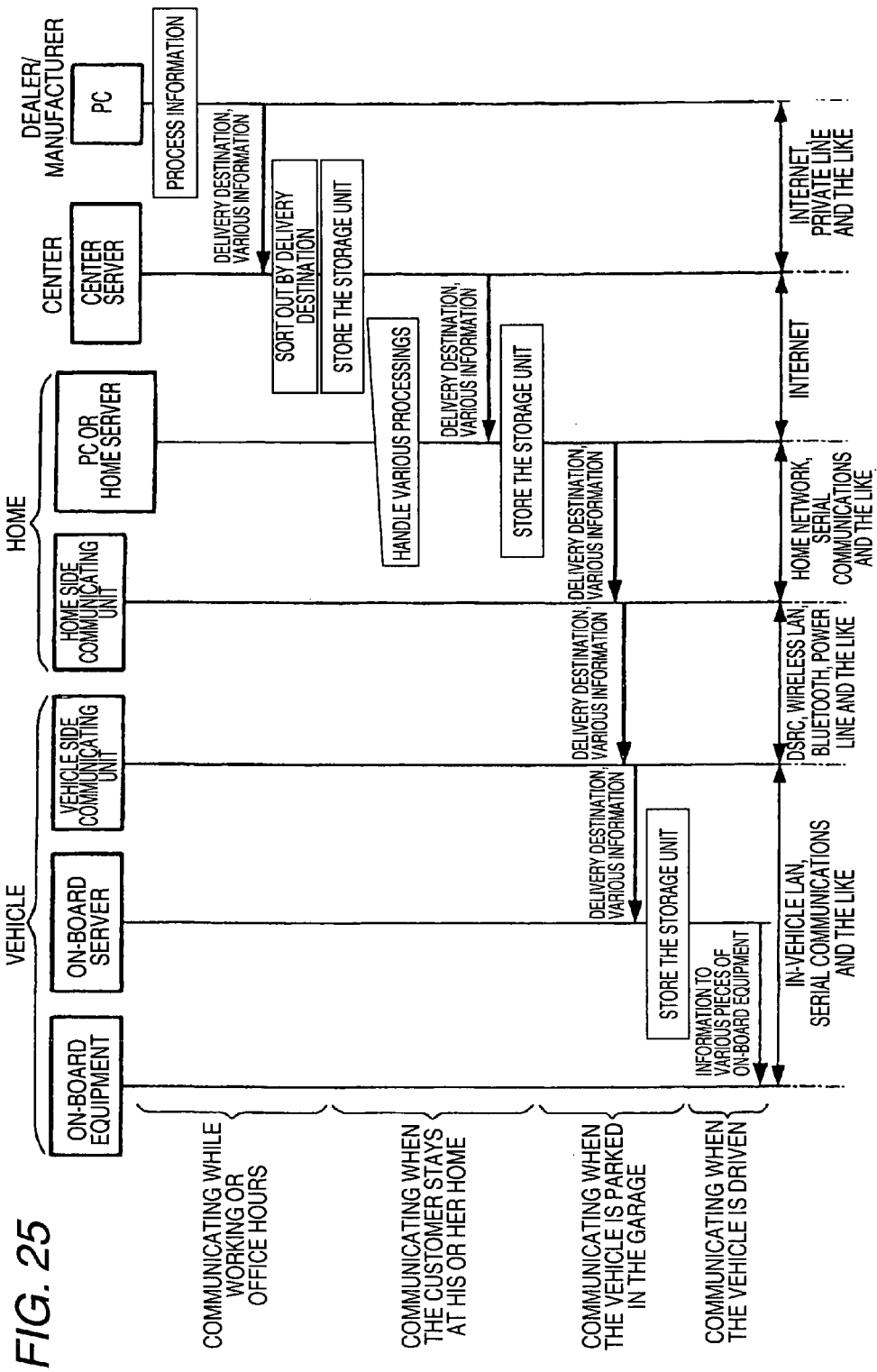
FIG. 25 is a sequence chart illustrating an example of a flow of information from the center side to the vehicle side, which explains the seventh embodiment of the invention.
Figure 26:
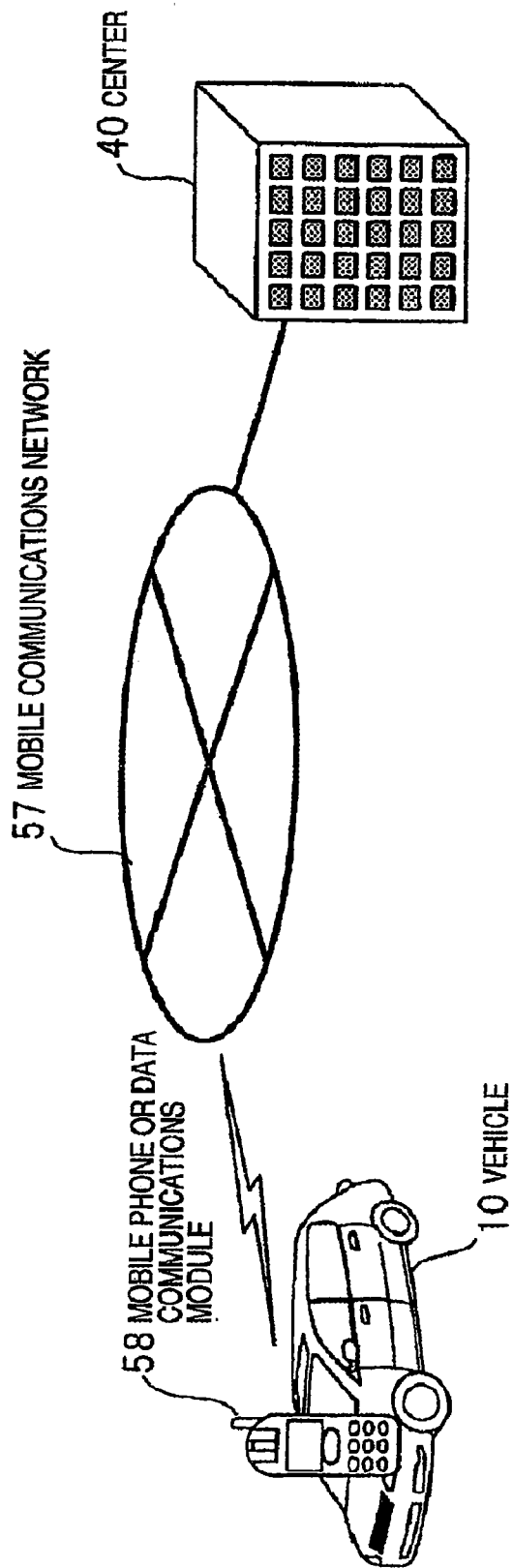
FIG. 26 is a diagram showing a schematic configuration of a conventional communications system between a vehicle and a home.
Figure 27:
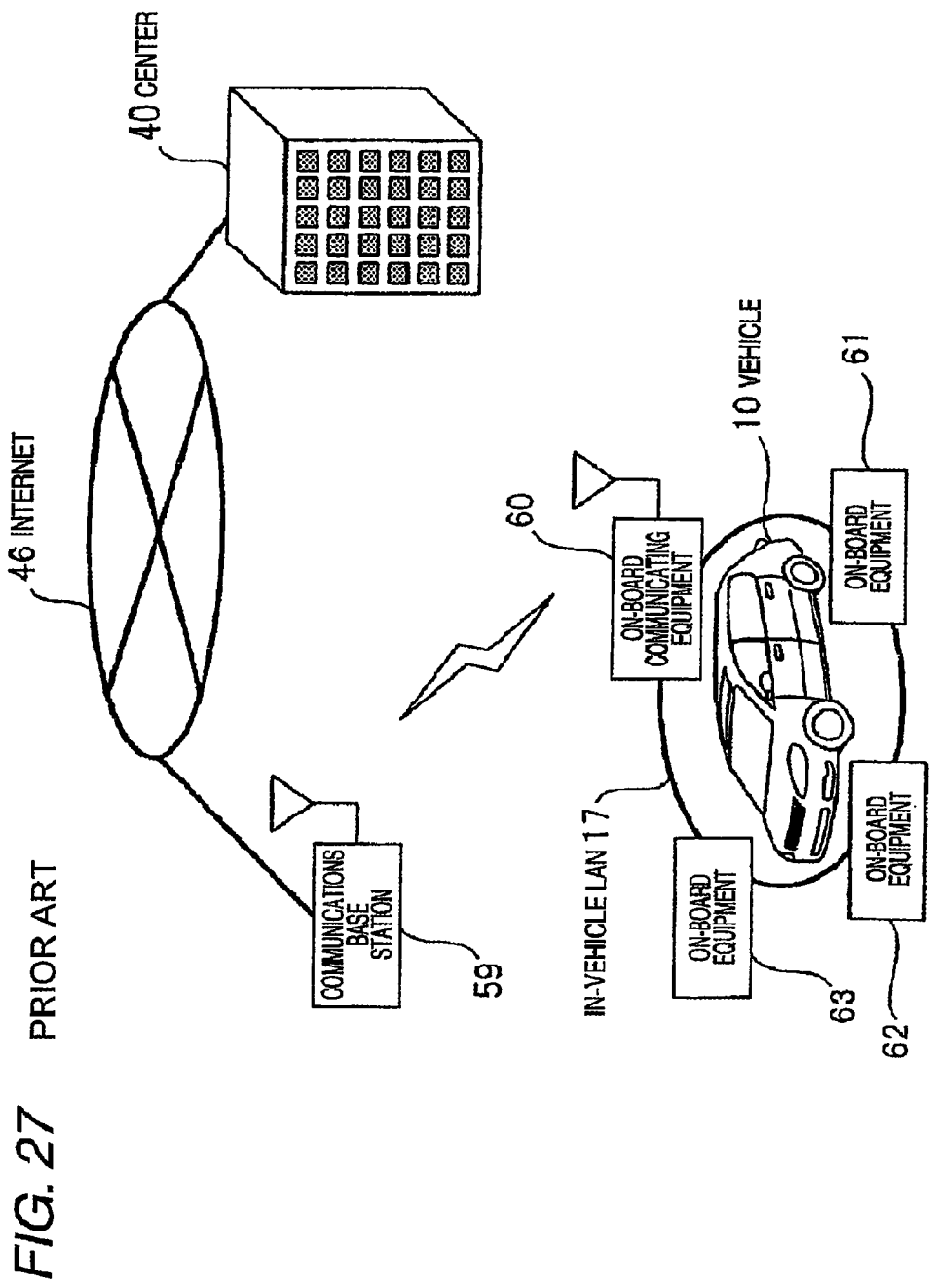
FIG. 27 is a diagram showing a schematic configuration of a conventional communications system between a vehicle and a home.

FIG. 25 is a sequence diagram illustrating an example of a flow of vehicle information from the dealer/manufacturer to the vehicle in relation to the failure diagnosis, maintenance and the like of the vehicle, which is common over DSRC, wireless LAN, power line and the like when they constitute a communicating means between the home and the vehicle. As shown in FIG. 25, the various information stored in the storage unit 45 of the dealer/manufacturer is transmitted to the center server 47 during, for example, the office hours of the dealer/manufacturer and is then sorted out by destination for delivery, so as to be accumulated (stored) in the storage unit 43. Next, the various information, which is sorted out by delivery destination and is stored in the storage unit 43 of the center server 47, is transmitted to the PC or the home server 22 by executing various processes while the customer stays at his or her home or the like, so as to be accumulated (stored) in the storage unit 24 of the PC or the home server 22. Next, communication is initiated between the home and the vehicle by any of the methods shown in FIGS. 5, 7, 10, 12 and the like while the vehicle is parked in the garage, so that the various information stored in the storage unit 24 of the PC or the home server 22 is transmitted for use to the on-board server 13 via the home side communicating unit and the vehicle side communicating unit while the vehicle is parked in the garage. However, communication between the individual units, for example, between the center server 40 and the PC of the dealer/center is implemented by means of the internet, a private line or the like, communication between the PC or the home server 22 and the center server 40 is implemented by the internet, communication between the home side communicating unit and the PC or the home server 22 is implemented by means of the home network, the serial communications or the like, communication between the vehicle side communicating unit and the home side communicating unit is implemented by means of the DSRC, wireless LAN, Bluetooth, power line or the like, and communication between the pieces of on-board equipment 15, 16, and between the vehicle communicating unit and the on-board server 13, is implemented by the in-vehicle LAN, the serial communications or the like.

Thus, according to this embodiment, since the information stored in the individual storage units 14, 24, 43, 45 is transmitted in a relayed fashion, there is imposed no limitation on communicating time, and bulk communication becomes possible. In addition, since the existing infrastructures are used, the communications system can be provided which reduces the initial cost and the running cost and imposes no limitation on time during which the customer receives service when he or she receives it.

Note that while in each of the embodiments that have been described heretofore, the key is made to constitute the trigger, a case can also be anticipated easily where a keyless entry system, an immobilizer, a driver's license card and the like are used as the trigger in place of the key. In addition, while in the embodiments, the PC (a note PC or the like) or the home server 22 is used as the main equipment on the home side, equipment can be considered which includes a CPU, a storage unit, a monitor and an input unit such as a keyboard. As the on-board server 13, equipment can be considered such as the car navigation system, on-board information terminal (IT terminal), on-board AV server, car PC and the like which include a CPU, a storage unit, a monitor and an input unit. The home network is not limited to the LAN, wireless LAN, power line network and the like, and a case is considered where IEEE1394, USB, serial communications and the like are used. As the fixed communications network 41, the telephone network, power network, cable TV network, governmental/municipal line network (private line), satellite communications network and the like are considered. In addition, while in the description of the embodiment, the example is shown in which the satellite broadcasting, ground wave broadcasting and the digital TV broadcasting such as CATV are used as the distributing means, the digital sound broadcasting, internet TV and the like can be considered.

Here, the immobilizer means a system in which an ID code of a transmitter (transponder) within the engine and a ID code which is registered in the electronic control unit residing in the vehicle main body are collated, and the engine cannot be started up unless they coincide with each other, and the collation of the ID codes is implemented from a transponder incorporated in the key. This can be used to serve as an anti-theft device. In addition, the keyless entry system means a system in which the doors can be locked and unlocked by means of a remote control, and the driver's license card means a driving license which incorporates therein an IC.

In the case of the communication by means of the charging line 32, there are cases where the PLC bridge 33 is provided on the plug side (the home side) and is provided on the socket side (the vehicle side). In the case of the former, the connection between the plug and the socket becomes two ways by the power supply line and the communications line. In addition, a case can also be anticipated easily where the home and the vehicle are connected by the communications line. The home means the inside of a house or building such as not only the residential place of the customer but also a flat, an office and the like. The garage means a specific parking place (parking position) which includes a garage without a roof.

INDUSTRIAL APPLICABILITY

The communications system, the vehicle information communicating apparatus and the indoor information processing apparatus of the invention have an advantage that there is no limitation on communicating time and bulk communication is enabled due to the communication being implemented in the garage or the like of the residential place of the user where the vehicle is parked for a long period of time and is useful as a communication technique between the vehicle, the home and the center.

The invention claimed is:

1. A communications system comprising:
   a primary information processing unit installed on a vehicle and a primary communications unit connected to the primary information processing unit;
   a secondary communications unit outside the vehicle which can communicate with the primary communications unit and a secondary information processing unit residing indoors which is connected to the secondary communications unit;
   a detection device located at a predetermined position outside the vehicle and configured to detect whether the vehicle resides at the predetermined position; and
   a communication activating device configured to start up the communication of information between the primary information processing unit and the secondary information processing unit by utilizing communicating means between the primary communications unit and the secondary communications unit according to a detection result of the detection device,
   wherein the detection device detects whether the vehicle resides at the predetermined position based on the detection of a physical or an electrical connection or based on the detection of the vehicle's access to the predetermined position optically.

2. A communications system as set forth in claim 1, wherein the primary information processing unit and the primary communications unit are connected to each other by means of an in-vehicle LAN.

3. A communications system as set forth in claim 1, wherein the secondary information processing unit and the secondary communications unit are connected to each other by means of an indoor network.

4. A communications system as set forth in claim 1, wherein the communicating means communicates by means of any of DSRC, wireless LAN, optical LAN, Bluetooth, mobile phone and PLC.

5. A communications system as set forth in claim 1, wherein the detection of the physical or the electrical connection includes detection of at least the insertion of a plug of a PLC.

6. A communications system as set forth in claim 1, further comprising authenticating means for authenticating that an ID of the vehicle is a predetermined ID.

7. A communications system as set forth in claim 1, wherein the detection device detects whether the vehicle resides at the predetermined position based on the detection of the physical or the electrical connection.

8. A communications system as set forth in claim 1, wherein the detection device detects whether the vehicle resides at the predetermined position based on the detection of the vehicle's access to the predetermined position optically.

9. A communications system comprising:
a primary information processing unit installed on a vehicle and a primary communications unit connected to the primary information processing unit;
a secondary communications unit outside the vehicle which can communicate with the primary communications unit and a secondary information processing unit residing indoors which is connected to the secondary communications unit;
a tertiary information processing unit residing inside an information center which can communicate with the secondary information processing unit by utilizing a fixed communication network;
a detection device located at a predetermined position outside the vehicle and configured to detect whether the vehicle resides at the predetermined position; and
a communication activating device configured to start up the communication of information between the primary information processing unit and the secondary information processing unit by utilizing communicating means between the primary communications unit and the secondary communications unit according to a detection result of the detection device, wherein:
the communication of information between the primary information processing unit or the secondary information processing unit and the tertiary information processing unit is implemented,
the communication of information between the primary information processing unit and the secondary information processing unit includes communication of information between the primary information processing unit and the secondary information processing unit that an abnormality has been detected by a security sensor of the vehicle, and
the detection device detects whether the vehicle resides at the predetermined position based on the detection of a physical or an electrical connection or based on the detection of the vehicle's access to the predetermined position optically.

10. A communications system as set forth in claim 9, wherein the primary information processing unit and the primary communications unit are connected to each other by means of an in-vehicle LAN.

11. A communications system as set forth in claim 9, wherein the secondary information processing unit and the secondary communications unit are connected to each other by means of an indoor network.

12. A communications system as set forth in claim 9, wherein the communicating means communicates by means of any of DSRC, wireless LAN, optical LAN, Bluetooth, mobile phone and PLC.

13. A communications system comprising:
a primary information processing unit installed on a vehicle and a primary communications unit connected to the primary information processing unit;
a secondary communications unit outside the vehicle which can communicate with the primary communications unit and a secondary information processing unit residing indoors which is connected to the secondary communications unit;
a receiver unit residing indoors which is connected to the secondary information processing unit;
a transmitter unit which can distribute information to the receiver unit and a tertiary information processing unit residing inside an information center which can communicate with the transmitter unit;
a detection device located at a predetermined position outside the vehicle and configured to detect whether the vehicle resides at the predetermined position; and
a communication activating device configured to start up the communication of information between the primary information processing unit and the secondary information processing unit by utilizing communicating means between the primary communications unit and the secondary communications unit according to a detection result of the detection device, wherein:
the distribution of information from the tertiary information processing unit to the primary information processing unit or the secondary information processing unit is by utilizing distribution means between the transmitter unit and the receiver unit,
the communication of information between the primary information processing unit and the secondary information processing unit includes communication of information between the primary information processing unit and the secondary information processing unit that an abnormality has been detected by a security sensor of the vehicle, and
the detection device detects whether the vehicle resides at the predetermined position based on the detection of a physical or an electrical connection or based on the detection of the vehicle's access to the predetermined position optically.

14. A communications system as set forth in claim 13, wherein the primary information processing unit and the primary communications unit are connected to each other by means of an in-vehicle LAN.

15. A communications system as set forth in claim 13, wherein the secondary information processing unit, the secondary communications unit and the receiver unit are connected to one another by means of an indoor network.

16. A communications system as set forth in claim 13, wherein the communicating means communicates by means of any of DSRC, wireless LAN, optical LAN, Bluetooth, mobile phone and PLC.

17. A communications system as set forth in claim 13, wherein the distribution means implements the distribution of information by means of any of broadcasting via satellite, terrestrial broadcasting, CATV or interne.

18. A communications system as set forth in claim 13, wherein a communication between the tertiary information processing unit and the transmitter unit is implemented by means of a fixed communication network.

19. A communications system comprising:
a primary information processing unit installed on a vehicle and a primary communications unit connected to the primary information processing unit;
a secondary communications unit outside the vehicle which can communicate with the primary communications unit and a secondary information processing unit residing indoors which is connected to the secondary communications unit;
an on-board equipment installed on the vehicle which is connected to the primary information processing unit;
one or a plurality of quaternary information processing units which can communicate with a tertiary information processing unit;
primary to quaternary storage units for storing information collected, processed or distributed by the primary to quaternary information processing units, respectively;
a detection device located at a predetermined position outside the vehicle and configured to detect whether the vehicle resides at the predetermined position; and
a communication activating device configured to start up the communication of information between the primary information processing unit and the secondary information processing unit by utilizing communicating means between the primary communications unit and the secondary communications unit according to a detection result of the detection device, wherein:
the communication of information between the primary information processing unit and the secondary information processing unit by way of the primary storage unit, the communication of information between the secondary information processing unit and the tertiary information processing unit by way of the secondary storage unit and the communication of information between the tertiary information processing unit and the quaternary information processing unit by way of the tertiary storage means are implemented sequentially, and a one-way or two-way communication and processing of information between the on-board equipment and the quaternary information processing unit is implemented,
the communication of information between the primary information processing unit and the secondary information processing unit includes communication of information between the primary information processing unit and the secondary information processing unit that an abnormality has been detected by a security sensor of the vehicle, and
the detection device detects whether the vehicle resides at the predetermined position based on the detection of a physical or an electrical connection or based on the detection of the vehicle's access to the predetermined position optically.

20. A communications system as set forth in claim 19, wherein the on-board equipment is the primary information processing unit itself.

21. A communications system as set forth in claim 19, wherein the on-board equipment, the primary information processing unit and the primary communications unit are connected to one another by means of an in-vehicle LAN.

22. A communications system as set forth in claim 19, wherein the secondary information processing unit and the secondary communications unit are connected to each other by means of an indoor network.

23. A communications system as set forth in claim 19, wherein the communicating means communicates by means of any of DSRC, wireless LAN, optical LAN, Bluetooth, mobile phone and PLC.

24. A communications system as set forth in claim 19, wherein the tertiary information processing unit and the quaternary information processing unit are connected to each other by means of a fixed communication network.

25. A vehicle information communicating apparatus comprising:
a primary information processing unit installed on a vehicle and a primary communications unit which can communicate with a secondary communications unit outside the vehicle and which is connected to the primary information processing unit;
a detection device located at a predetermined position outside the vehicle and configured to detect whether the vehicle resides at the predetermined position; and
a communication activating device configured to start up the communication of information between the primary information processing unit and equipment residing outside the vehicle by utilizing communicating means between the primary communications unit and the secondary communications unit according to a detection result of the detection device,
wherein the detection device detects that the vehicle resides at the predetermined position based on the detection of a physical or an electrical connection or based on the detection of the vehicle's access to the predetermined position optically.

26. A vehicle information communicating apparatus as set forth in claim 25, wherein the primary information processing unit and the primary communications unit are connected to each other by means of an in-vehicle LAN.

27. A vehicle information communicating apparatus as set forth in claim 25, wherein the communicating means communicates by means of any of DSRC, wireless LAN, optical LAN, Bluetooth, mobile phone and PLC.

28. A vehicle information communicating apparatus as set forth in claim 25, wherein the detection of the physical or the electrical connection includes at least detection of the insertion of a plug of a PLC.

29. A vehicle information communicating apparatus as set forth in claim 25, further comprising authenticating means for authenticating that an ID of the vehicle is a predetermined ID.

30. An indoor information processing apparatus comprising:
a secondary information processing unit residing indoors for controlling a secondary communications unit outside a vehicle which can communicate with a primary communications unit connected to an on-board equipment;
a detection device located at a predetermined position outside the vehicle and configured to determine whether the vehicle resides at the predetermined position; and
a control device configured to control the secondary communications unit such that a communication between the primary communications unit and the secondary communications unit is started up according to a detection result of the detection device by utilizing communicating means between the primary communications unit and the secondary communications unit,
wherein the detection device detects whether the vehicle resides at the predetermined position based on the detection of a physical or an electrical connection or based on the detection of the vehicle's access to the predetermined position optically.

31. An indoor information processing system as set forth in claim 30, wherein the secondary information processing unit and the secondary communications unit are connected to each other by means of an indoor network.

32. An indoor information processing apparatus as set forth in claim 30, wherein the communicating means communicates by means of any of DSRC, wireless LAN, optical LAN, Bluetooth, mobile phone and PLC.

33. An indoor information processing apparatus as set forth in claim 30, wherein the detection of the physical or the electrical connection includes at least detection of the insertion of a plug of a PLC.

34. An indoor information processing apparatus as set forth in claim 30, further comprising authenticating means for authenticating that an ID of the vehicle is a predetermined ID.

35. A communications system comprising:
 a primary information processing unit installed on a vehicle and a primary communications unit connected to the primary information processing unit;
 a secondary communications unit outside the vehicle which can communicate with the primary communications unit and a secondary information processing unit residing indoors which is connected to the secondary communications unit;
 an insertion detection device configured to detect an insertion of a plug of a Power Line Communication ("PLC") into the vehicle; and
 a communication activating device configured to start up the communication of information between the primary information processing unit and the secondary information processing unit by utilizing communicating means between the primary communications unit and the secondary communications unit according to a detection result of the insertion detection device.

36. A communications system as set forth in claim 35, wherein the primary information processing unit and the primary communications unit are connected to each other by means of an in-vehicle LAN.

37. A communications system as set forth in claim 35, wherein the secondary information processing unit and the secondary communications unit are connected to each other by means of an indoor network.

38. A communications system as set forth in claim 35, wherein the communicating means communicates by means of PLC.

39. A communications system as set forth in claim 35, further comprising authenticating means for authenticating that an ID of the vehicle is a predetermined ID.

* * * * *